US012430675B2

(12) United States Patent
Gopalakrishnan et al.

(10) Patent No.: US 12,430,675 B2
(45) Date of Patent: Sep. 30, 2025

(54) COMPUTER-BASED PLATFORM FOR DEVELOPING AND IMPLEMENTING INDUSTRIAL TOOL SOLUTIONS (DCX PLATFORM)

(71) Applicant: Kennametal Inc., Latrobe, PA (US)

(72) Inventors: Dileep Gopalakrishnan, Latrobe, PA (US); Mitch Benko, Latrobe, PA (US); Dan Berlin, Latrobe, PA (US); Grzegorz Dewicki, Latrobe, PA (US); Vijay Jayaram, Latrobe, PA (US); Revanth Chowdary, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 429 days.

(21) Appl. No.: 17/832,419

(22) Filed: Jun. 3, 2022

(65) Prior Publication Data

US 2023/0196431 A1 Jun. 22, 2023

Related U.S. Application Data

(60) Provisional application No. 63/291,107, filed on Dec. 17, 2021.

(51) Int. Cl.
*G06Q 30/00* (2023.01)
*G06F 30/12* (2020.01)
(Continued)

(52) U.S. Cl.
CPC ......... *G06Q 30/0627* (2013.01); *G06F 30/12* (2020.01); *G06Q 30/0633* (2013.01); *G06Q 30/0643* (2013.01); *G06F 2111/20* (2020.01)

(58) Field of Classification Search
CPC ........... G06Q 30/0627; G06Q 30/0633; G06Q 30/0643; G06F 30/12; G06F 2111/20
(Continued)

(56) References Cited

U.S. PATENT DOCUMENTS

| | | | | |
|---|---|---|---|---|
| 6,850,900 B1 * | 2/2005 | Hare | ...................... | G06Q 40/04 705/26.8 |
| 12,094,361 B2 * | 9/2024 | Chaisy | ............... | G05B 19/4155 |

(Continued)

OTHER PUBLICATIONS

Wang et al., "Modular Design of Machine Tools to Facilitate Design for Disassembly and Remanufacturing," ScienceDirect.com, 6pgs; (Year: 2014).*

(Continued)

*Primary Examiner* — Robert M Pond
(74) *Attorney, Agent, or Firm* — Christopher J. Owens

(57) ABSTRACT

A computer-based system is provided for processing information associated with industrial tool solutions. The system may include a digital platform for executing the tasks of various functional modules that provide a virtual toolbox within the platform. In one aspect, a solutions module receives information associated with multiple configurations of different industrial tool solutions, and displays graphical representations associated with each of the industrial tool solutions. A machines module is programmed for receiving information associated with machines associated with use of the industrial tool solutions, and also can display a digital replica of each machine. A project module is programmed for receiving and displaying project information including the industrial tool solution information and machine information. Another module in the virtual toolbox is a workpiece features module which receives and displays parameters or attributes of a workpiece to be processed in association with a given industrial tool solution.

21 Claims, 103 Drawing Sheets

(51) Int. Cl.
*G06Q 30/0601* (2023.01)
*G06F 111/20* (2020.01)

(58) Field of Classification Search
USPC ........................................................ 705/26, 27
See application file for complete search history.

(56) References Cited

U.S. PATENT DOCUMENTS

| | | | | |
|---|---|---|---|---|
| 2003/0120472 | A1* | 6/2003 | Lind | G06F 30/20 703/22 |
| 2014/0181752 | A1* | 6/2014 | Kim | G06F 3/04817 715/835 |
| 2015/0019001 | A1 | 1/2015 | Benko et al. | |
| 2019/0087598 | A1* | 3/2019 | Adkins | H04L 9/3268 |
| 2020/0125068 | A1* | 4/2020 | Trounson, III | G05B 19/40938 |
| 2020/0226301 | A1 | 7/2020 | Siu | |
| 2020/0241506 | A1 | 7/2020 | Shi et al. | |
| 2023/0154346 | A1* | 5/2023 | Chaisy | G09B 5/02 |

OTHER PUBLICATIONS

International Preliminary Report on Patentability for International Application No. PCT/US2022/081905, mailed Jun. 27, 2024, 04 Pages.

International Search Report and Written Opinion for International Application No. PCT/US2022/081905, mailed Mar. 30, 2023, 6 Pages.

* cited by examiner

FIG. 10
Add to Cart
Add to Project
Connect Machine
Delete
Duplicate
Edit
Rename
Send Copy
Download CAD
Share With Collaboration Team

COMPUTER-BASED PLATFORM FOR DEVELOPING AND IMPLEMENTING INDUSTRIAL TOOL SOLUTIONS (DCX PLATFORM)

CROSS-REFERENCE TO RELATED APPLICATION/PRIORITY CLAIM

The present patent application is a non-provisional application claiming priority to U.S. Ser. No. 63/291,107, filed on Dec. 17, 2021, the entirety of which is incorporated by reference herein.

FIELD OF THE INVENTION

In various embodiments, the present invention generally relates to computer-based platforms, tools, devices, and processes for gathering, analyzing, exchanging, and displaying data associated with industrial tool solutions.

BACKGROUND

Industrial tools and machine tools are an important component of the products and services offered in the marketplace by many different commercial entities, including companies applying such tools in the manufacturing sector, the construction industry, the energy industry, the aerospace industry, and the transportation industry, among others.

There are a variety of metal working tools for cutting or shaping a metal work piece, for example. One such cutting tool is a rotating cutting tool that is generally employed in shaping or cutting a metallic work piece material. Such rotating cutting tools are commonly employed in machining geometries involving multiple planar surfaces, complex grooves, recesses, holes or curved surfaces. An important part of selecting a suitable machine tool is understanding how the tool will cooperate and interact with different machines and workpiece features. Determining a configuration for an appropriate cutting tool assembly for a particular machining operation requires understanding the relationships between and among the tool, the tool holder, the machine, and/or multiple other intermediary components which might be incorporated into a tool assembly. In addition, an industrial tool solution must consider the properties of the particular material to be machined, as well as the particular geometry of the workpiece. In view of the complexity of available options for different possible industrial tool solutions, it can be extremely challenging for users to configure and implement an optimum solution for a particular machining operation.

What are needed, therefore, are improved computer-implemented platforms, techniques, and tools that can more effectively gather, analyze, exchange, and display data associated with industrial tool solutions. Technology is also needed that can enhance the project management and other commercial aspects of developing and implementing industrial tool solutions.

SUMMARY

In various embodiments of the invention, a computer-based system is provided for processing information associated with industrial tool solutions including at least one industrial tool. In certain aspects, the system may include a digital platform comprising at least one computer processor programmed for executing the functions of various modules of the platform. In one aspect, a solutions module can be programmed for receiving information associated with multiple configurations of different industrial tool solutions, and displaying graphical representations associated with each of the industrial tool solutions. In another aspect, a machines module can be programmed for receiving information associated with at least one machine associated with use of the industrial tool solution, and displaying a digital replica of each machine. In another aspect, a project module can be programmed for receiving and displaying project information comprising at least a combination of industrial tool solution information and machine information. In another aspect, a workpiece features module can be programmed for receiving and displaying at least one parameter or attribute of a workpiece to be processed in association with a given industrial tool solution.

In combination, these various modules may be considered a virtual tool box for facilitating multiple technical and commercial interactions between and among industrial tool solution providers, their distributors, and the end users of their solutions. In various aspects, the computer-implemented tools and techniques described herein create a platform for gathering, analyzing, exchanging, and displaying both technical data and transactional data associated with different industrial tool solutions.

BRIEF DESCRIPTION OF THE FIGURES

While various embodiments of the invention are illustrated, the particular embodiments shown should not be construed to limit the claims wherein like numerals are used for like elements throughout. It is anticipated that various changes and modifications may be made without departing from the scope of the invention.

DESCRIPTION

In developing the various embodiments of the invention described herein, the inventors have created the fundamental components for a computer-based industrial tool solution platform for facilitating multiple technical and commercial interactions between and among industrial tool solution providers, their distributors, and the end users of their solutions. In various aspects, the computer-implemented tools and techniques described herein create an interface for gathering, analyzing, exchanging, and displaying both technical data and transactional data together within the platform. At times herein, the platform may be referred to as a digital customer experience or "DCX" platform. As applied herein, a "solution" may include an industrial tool, an adaptive item, an assembly of different components, a machine, or any reasonable combination thereof.

Figure 1A:
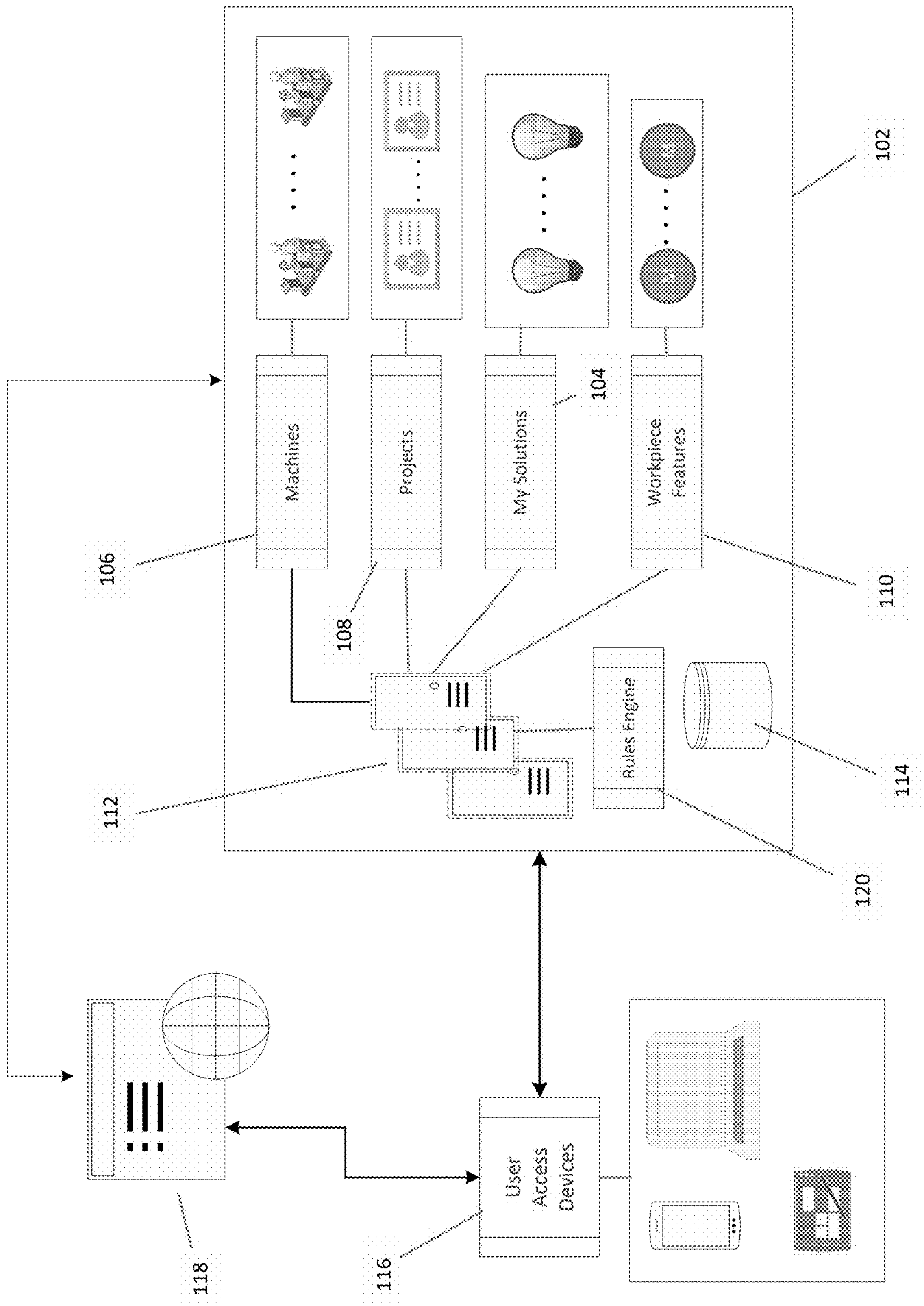
FIG. 1A schematically depicts a computer architecture diagram including an example of an industrial tool solution platform structured in accordance with various embodiments of the invention

In various embodiments, with reference to FIG. 1A, an industrial tool solution platform 102 can include a solutions module 104 for facilitating generation of multiple potential $-configurations of different industrial tool solutions and graphical representations associated with the solutions. In certain aspects, customers can access a machines module 106 to create and configure digital replicas of their own production and industrial environments within the platform, including modeling how machines will interact with different possible solutions to yield optimum performance results for the customer. In addition, projects can be created and managed through the platform by a project module 108. The project module 108 allows for collaboration involving multiple machines, different potential industrial tool solutions, and different interactions with a variety of personnel involved in both the technical and commercial components of developing and implementing solutions. In other aspects, a workpiece features module 110 facilitates specifying different parameters and attributes of materials to be processed in association with a given industrial tool solution. In combination, the modules 104, 106, 108, 110 provide a virtual toolbox to the user for generating and testing different industrial tool solutions which will meet the user's objectives.

In the example shown in FIG. 1A, the platform 102 may include a computing environment comprising computer processors or servers 112 programmed for executing the tasks of the various modules 104, 106, 108, 110. Different types of suitable electronic data storage media 114 may also be provided for storage and retrieval of data and other information processed through the platform 102. In certain aspects, various kinds of user access devices 116 (e.g., laptops, desktops, notebooks, smart phones, or other computing devices) may be used to access the platform 102. In one scenario, the platform 102 can be accessed through a web site via a web browser 118, for example.

Figure 1:
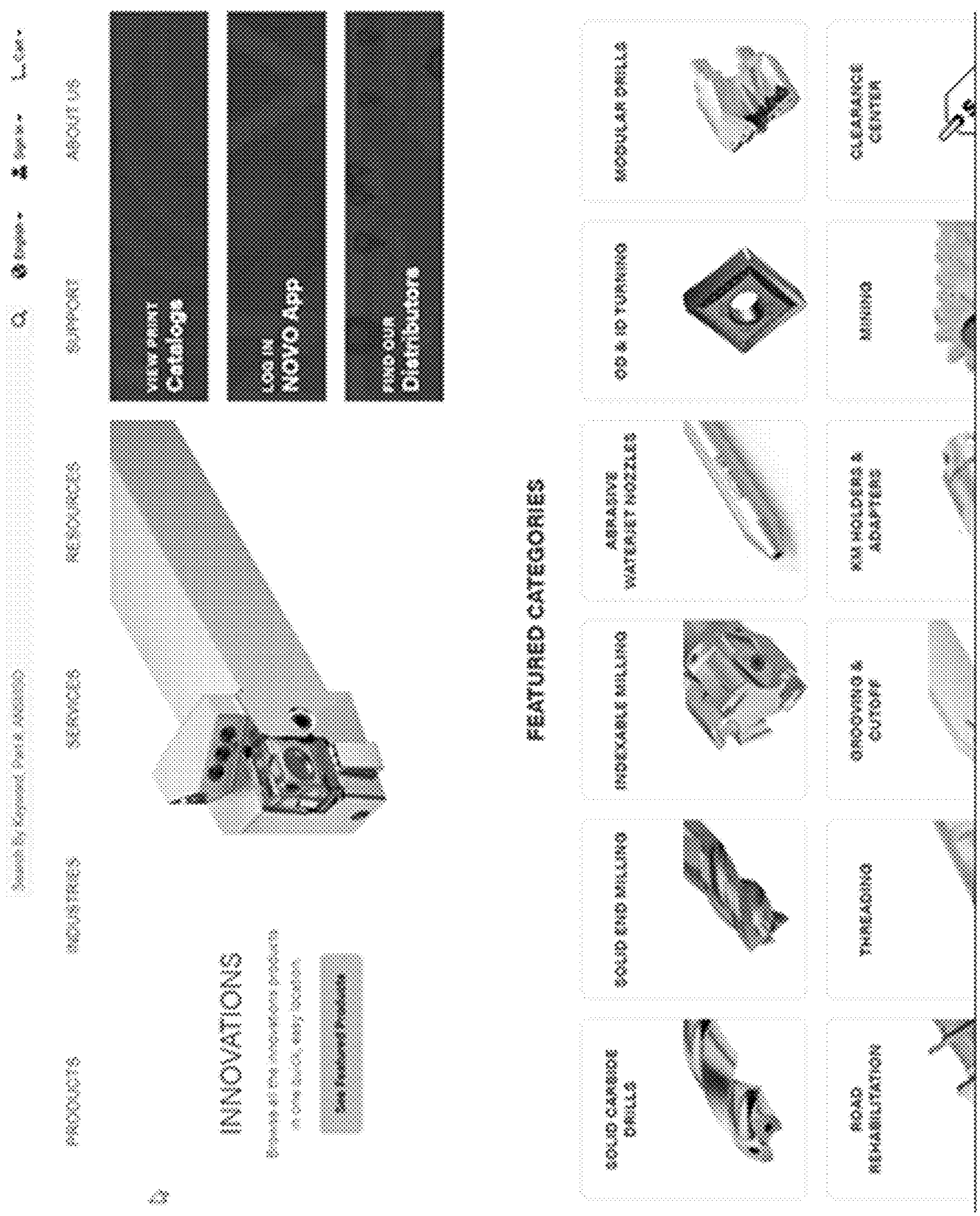
FIGS. 1 through 12 illustrate examples of screen displays and user interface tools which can be accessed through an industrial tool solution platform in association with creating solutions for processing by a solutions module.
Figure 2:
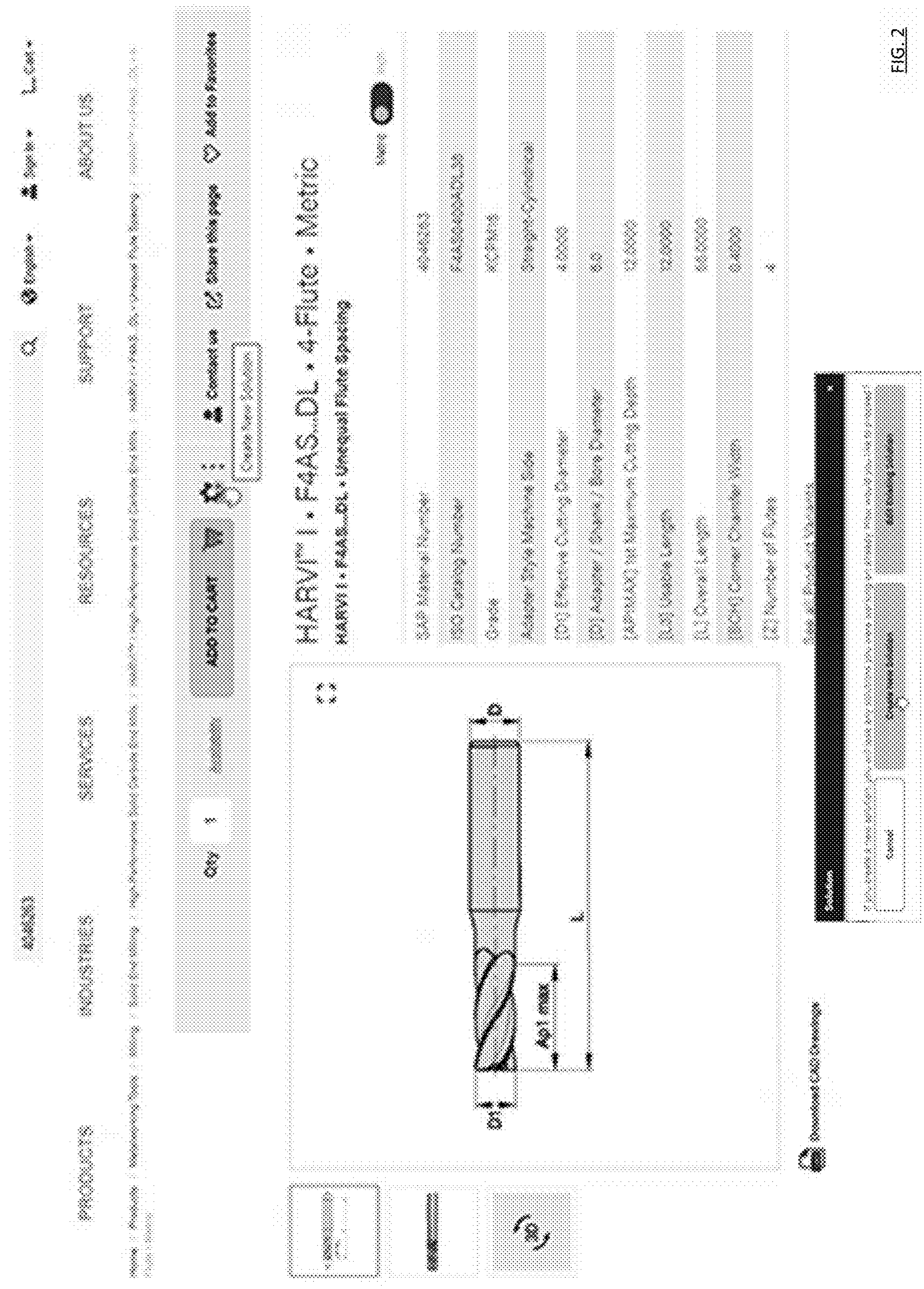

FIG. 1 illustrates an example of a home page or landing page for a website or cloud-based computing environment through which the platform can be accessed, such as by a user logging into the platform 102 through the web browser 118. FIG. 2 illustrates an example of a search capability which allows the user to search for a product, for example, and to initiate the process of developing an industrial tool solution.

Figure 3:
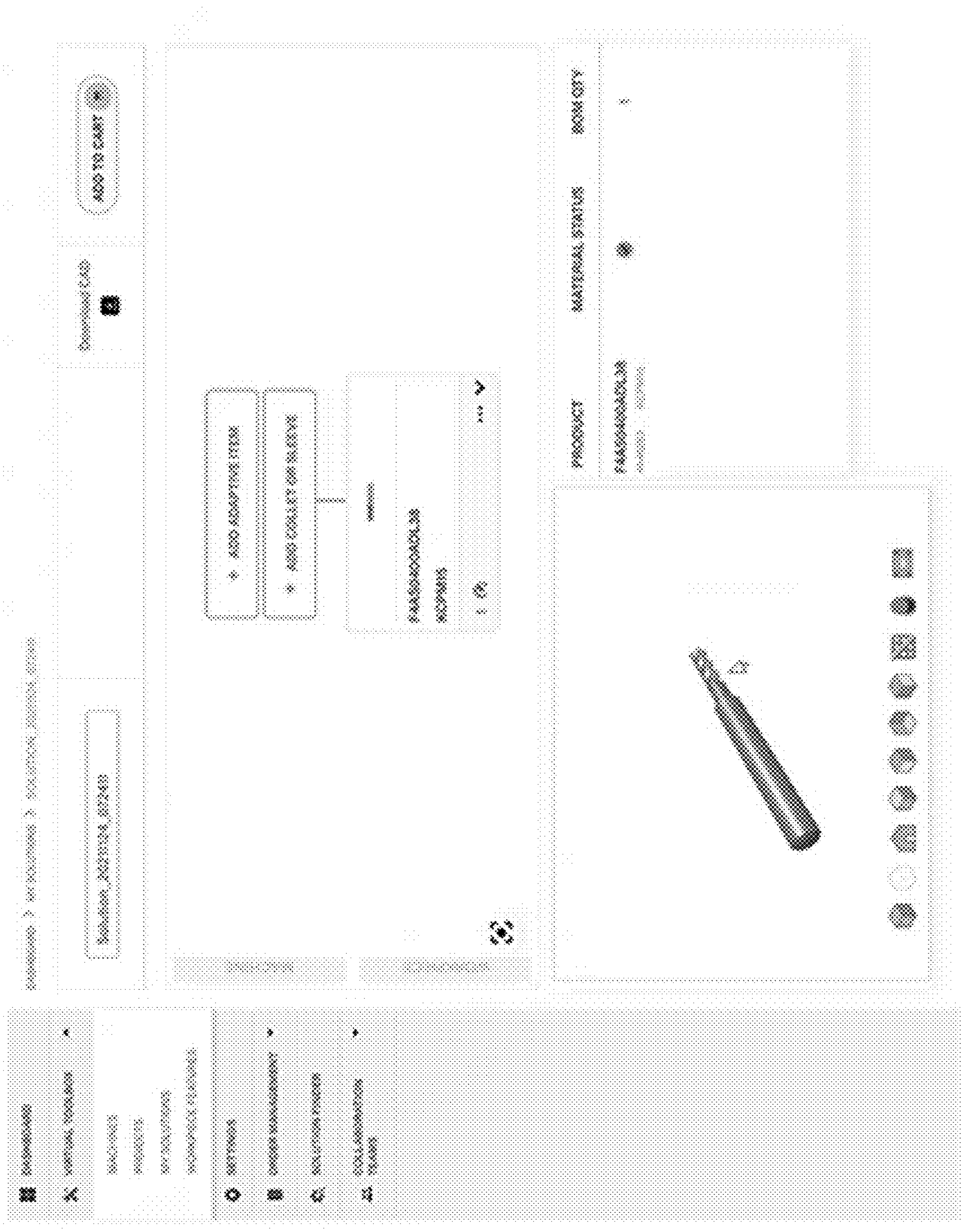
Figure 4:
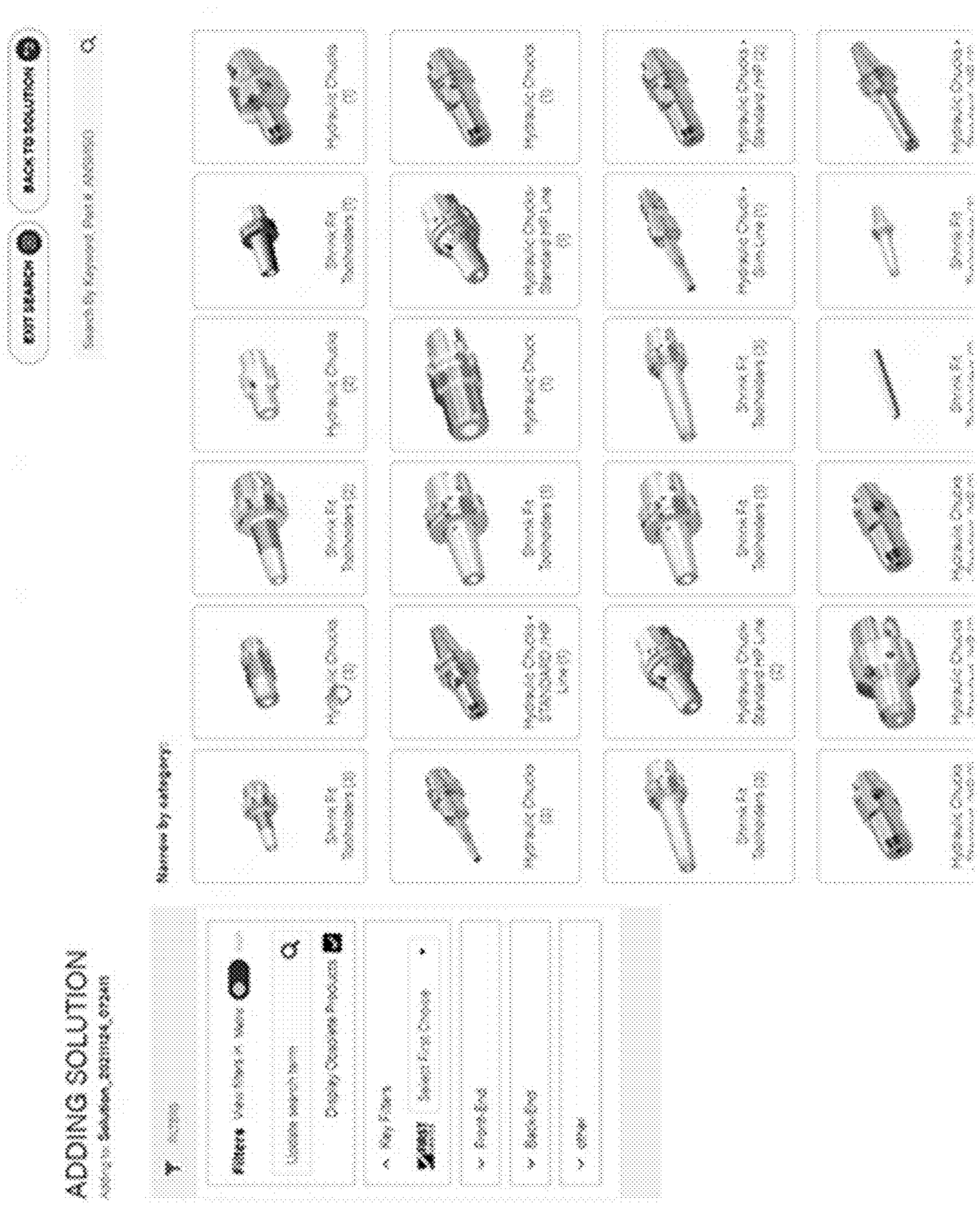
Figure 5:
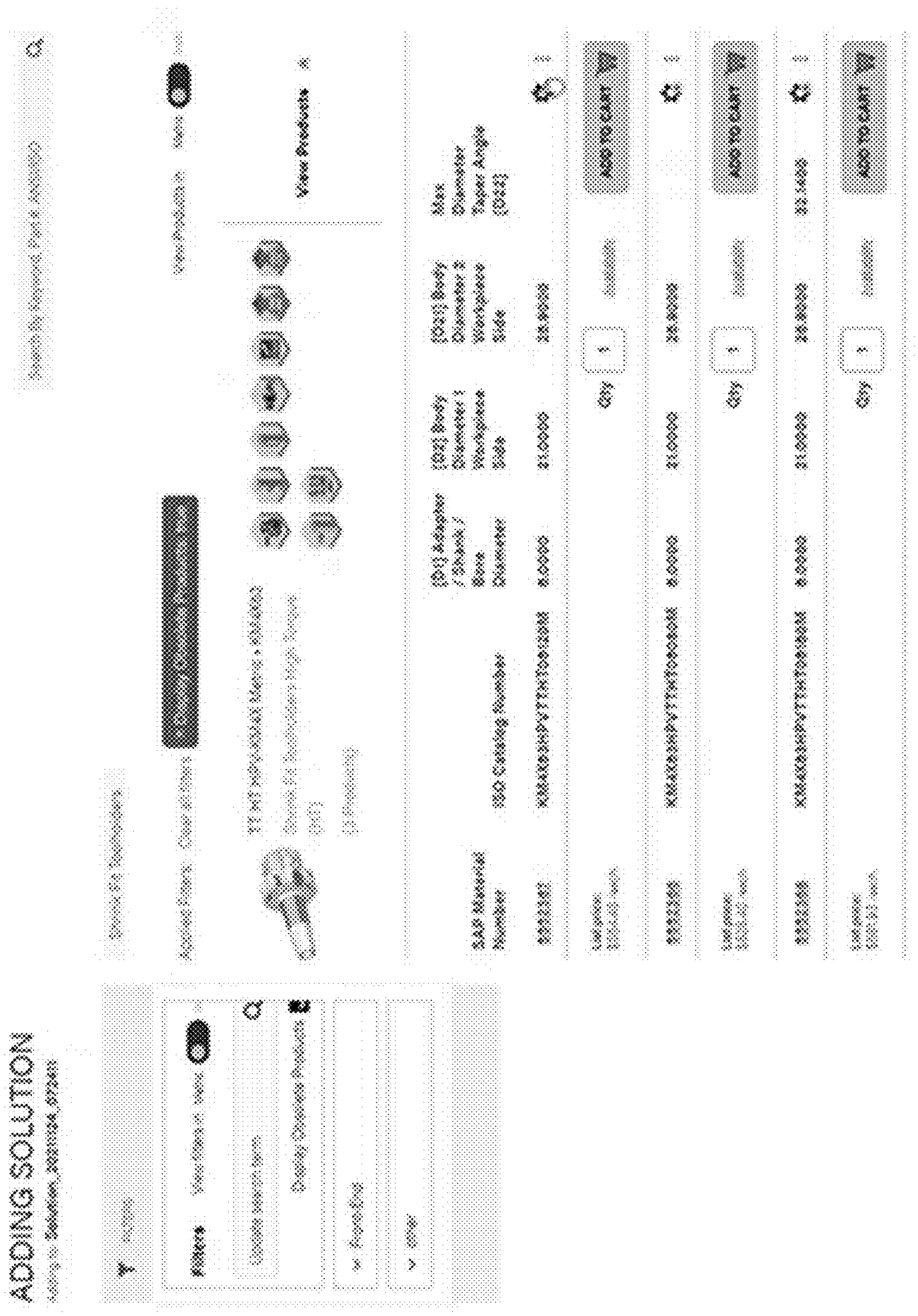
Figure 6:
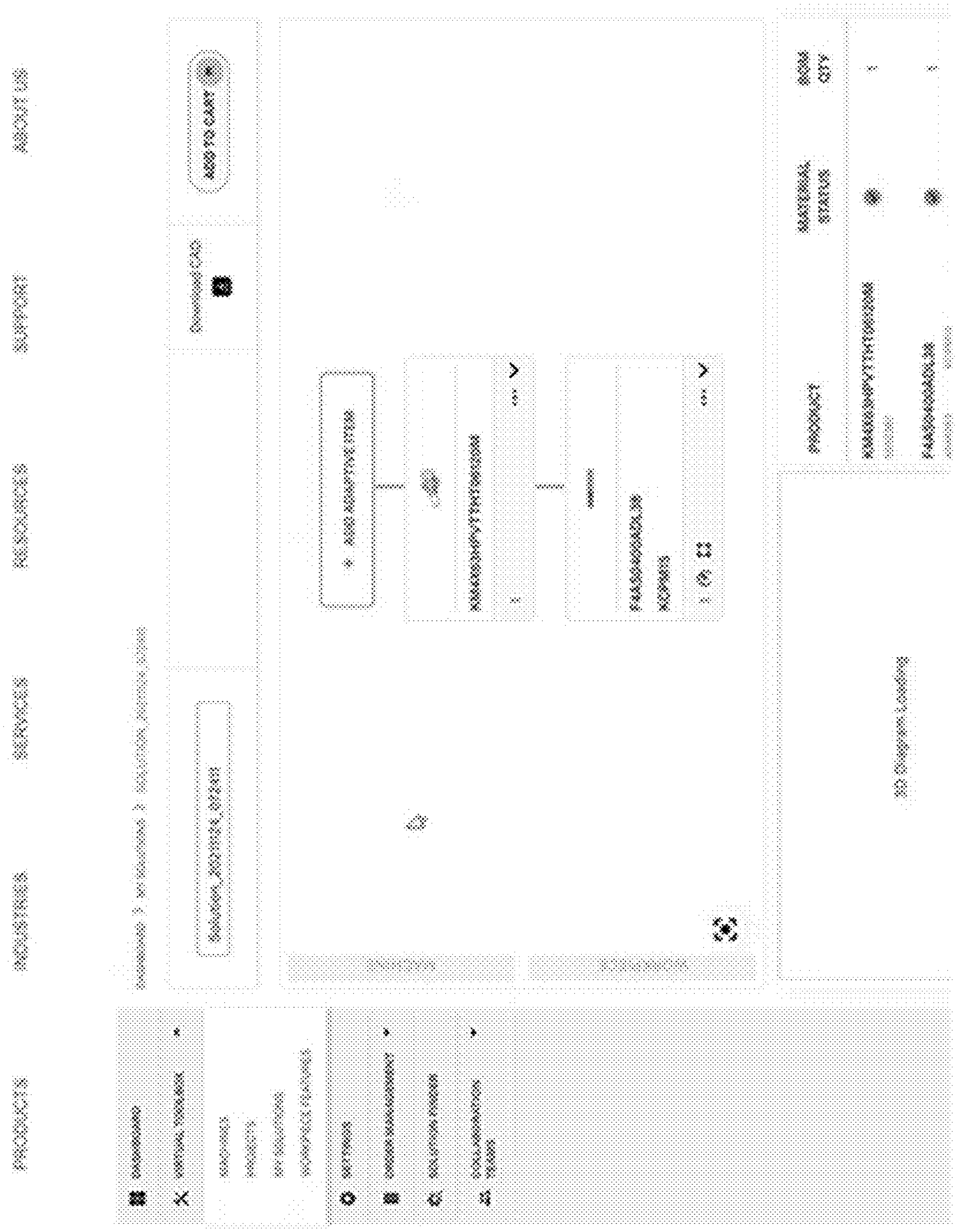

With reference to FIGS. 3 through 10, examples of different aspects of building a product assembly as an industrial tool solution are shown in connection with the solutions module 104 of the virtual toolbox. FIG. 3 illustrates an example of a user having selected a specific machine tool, along with the capability to select adaptive items (see FIG. 4), collets, or sleeves to create an assembly including the selected machine tool. It can be appreciated that a rules engine 120 may be provided as part of the platform 102 to execute one or more analysis algorithms which assess the suitability of the different parameters of a solution configuration (e.g., geometry, dimensions, part fit, mating conditions, etc.). Examples of different aspects of the processing of the rules engine 120 are described in U.S. Pat. Nos. 9,817,387 and 10,754,322, the entirety of which are incorporated herein by reference. FIG. 5 illustrates an example of a user navigating to a specific part, and FIG. 6 illustrates an example of adding the selected part to an overall assembly.

Figure 7:
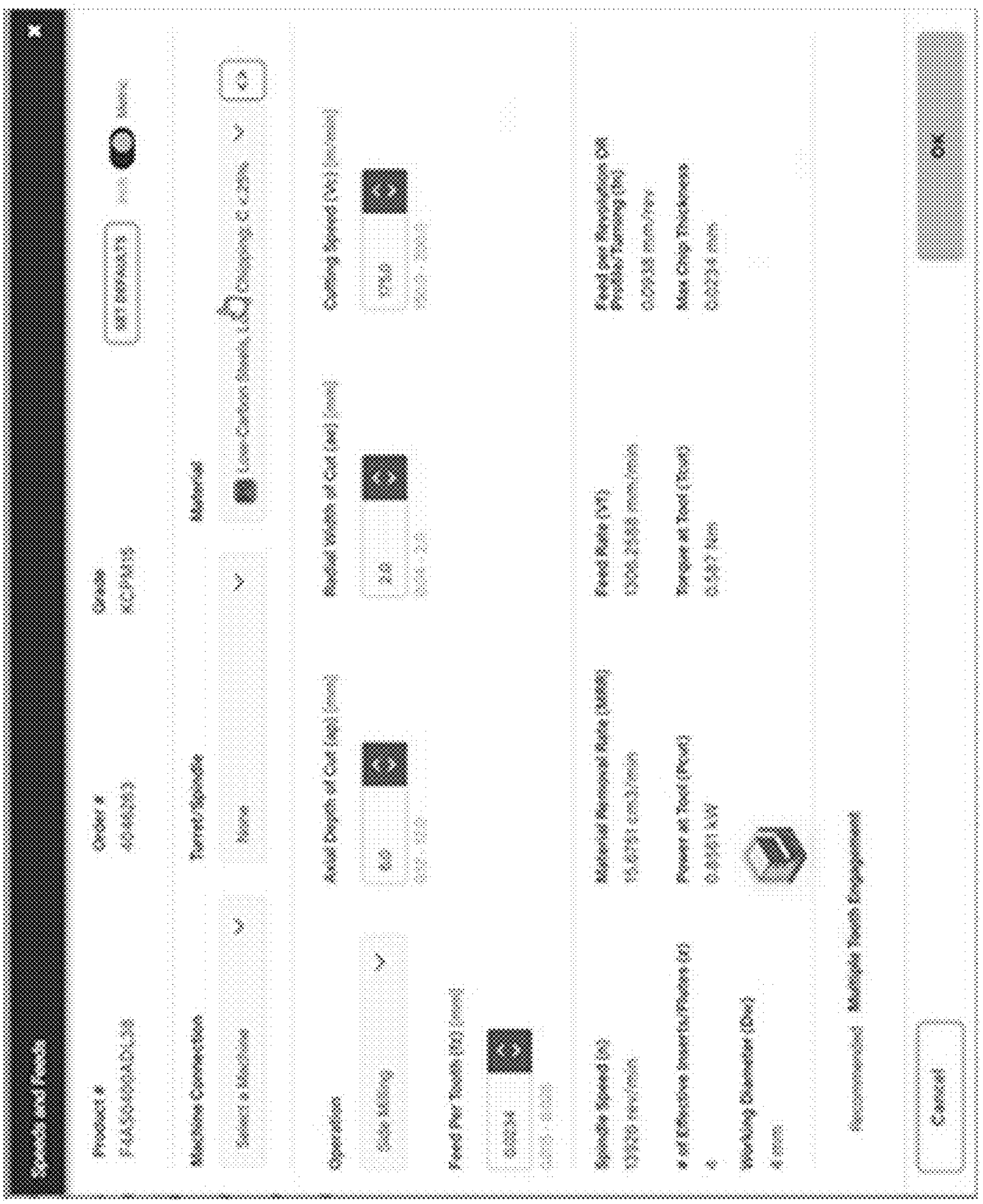
Figure 8:
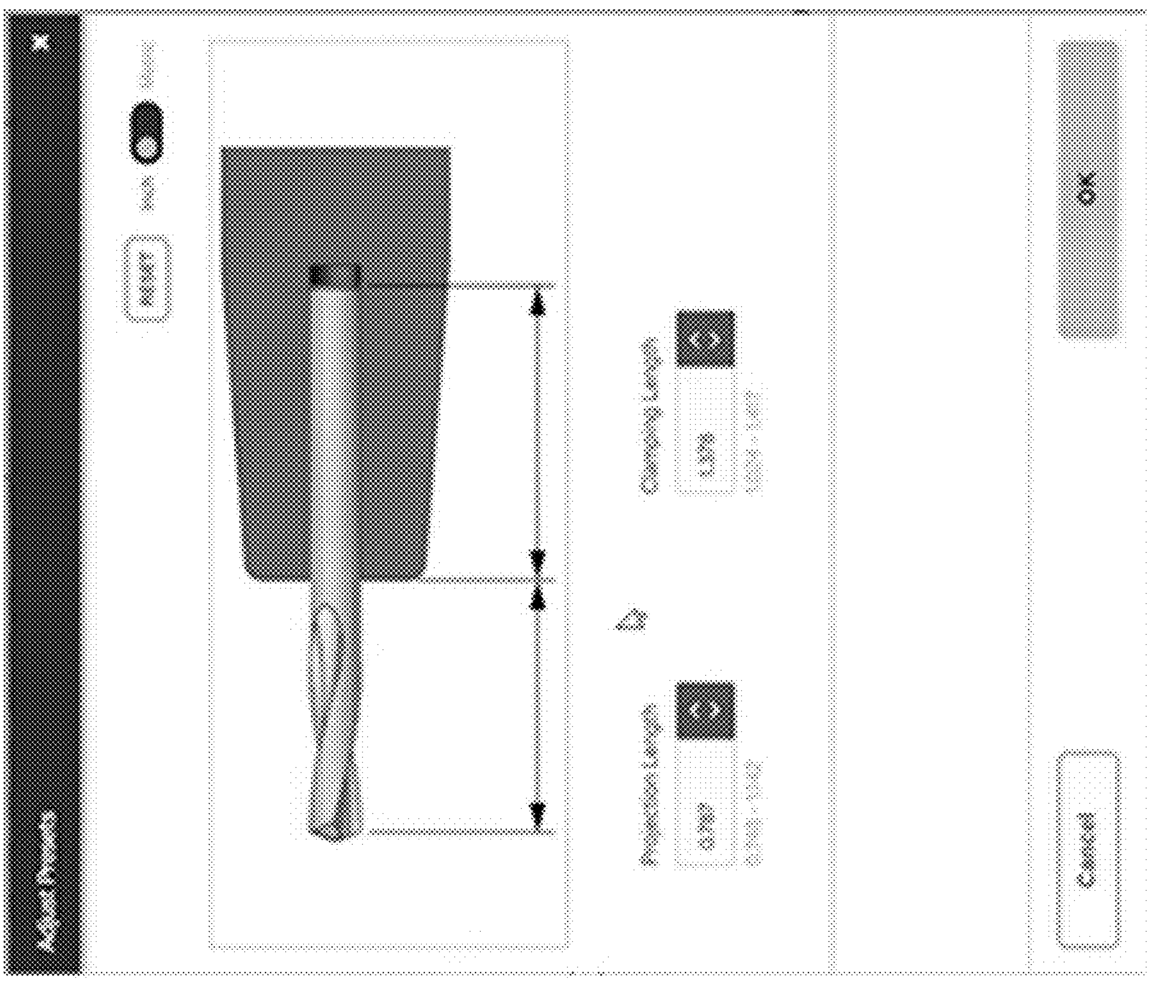
Figure 9:
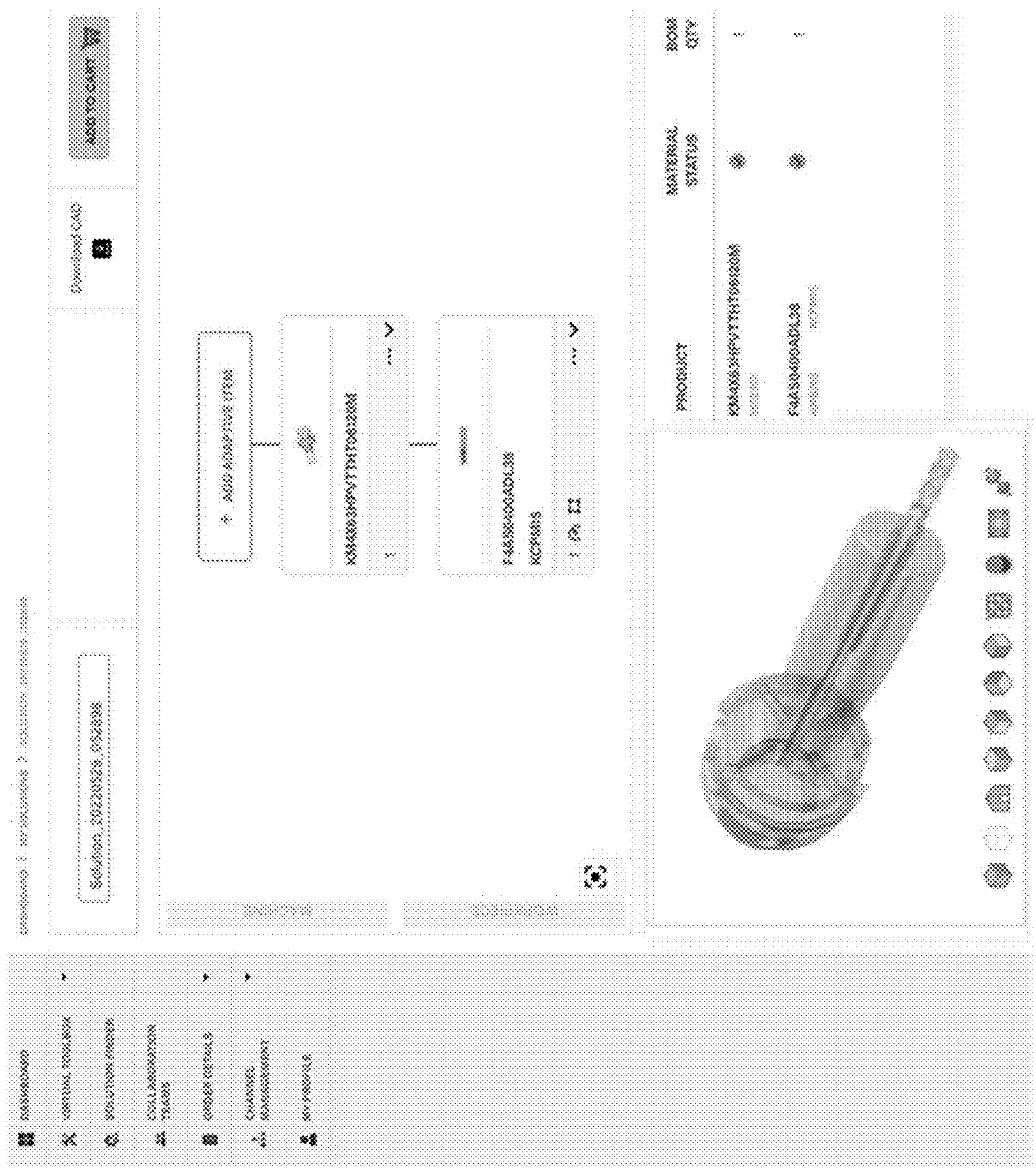
Figure 10:
Figure 11:
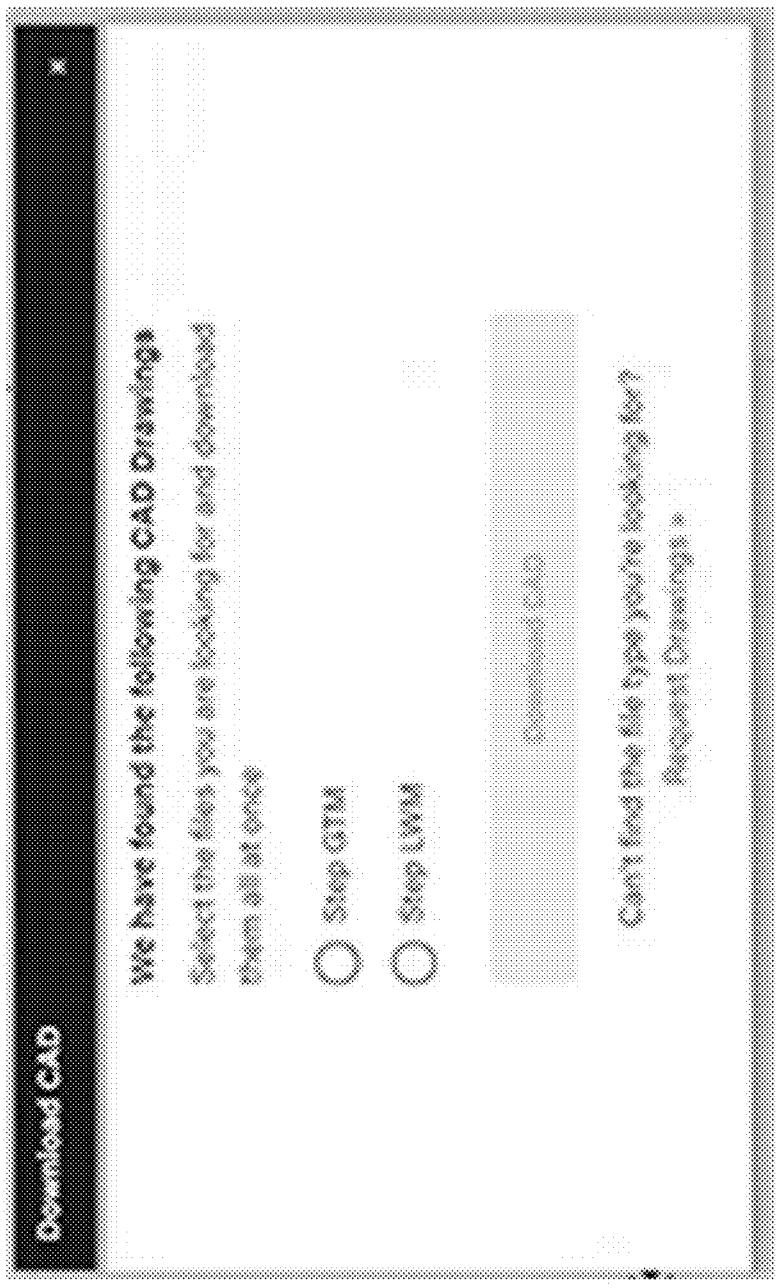

In other aspects of developing an industrial tool solution, FIG. 7 includes a screen display illustrating an example of setting feed and speed data for different aspects of the solution. FIG. 8 includes a screen display illustrating an example of adjusting presets for the tool selected for the solution. FIG. 9 includes a screen display illustrating an example of presenting a view of the tool assembly after an adapter has been added to the selected tool, along with a transparent three-dimensional rendering of the assembly, as shown. An "Add to Cart" function can also be provided for purposes of ordering the industrial tool solution that has now been created. In other aspects, with reference to FIGS. 10 and 11, various aspects of different solutions can be shared among different entities, such as different members of the same product development team. FIG. 11 illustrates an example of how two-dimensional and three-dimensional models or drawings can be generated and downloaded into other software packages or computer systems, such as for producing machine simulations, analyzing tooling packages, developing tooling strategies, and other tasks.

Figure 12:
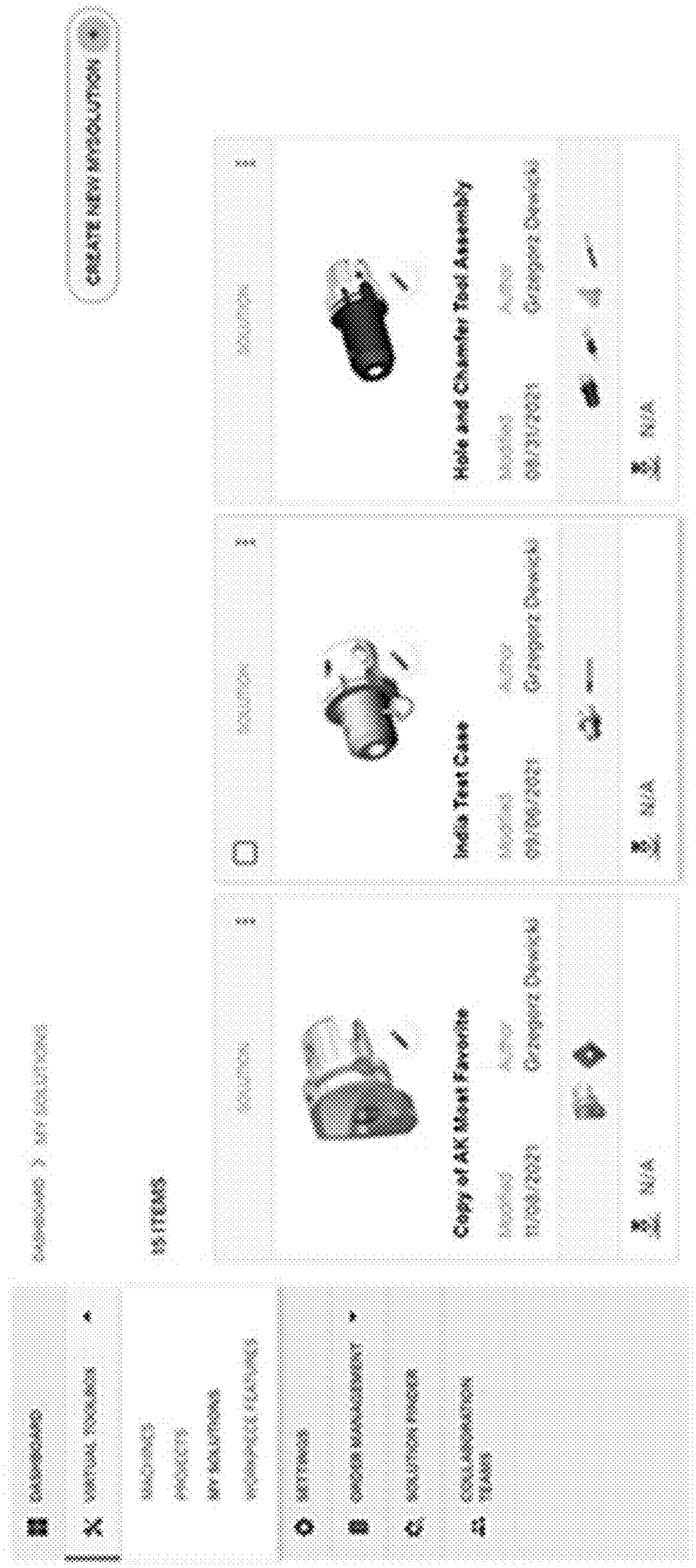

In various embodiments, FIG. 12 illustrates an example of how multiple industrial tool solutions generated through the platform 102 can be stored and processed by the solutions module 104. In this manner, it can be seen how these solutions can be shared or communicated among different entities or personnel for a variety of technical and commercial transactional purposes.

Figure 13:
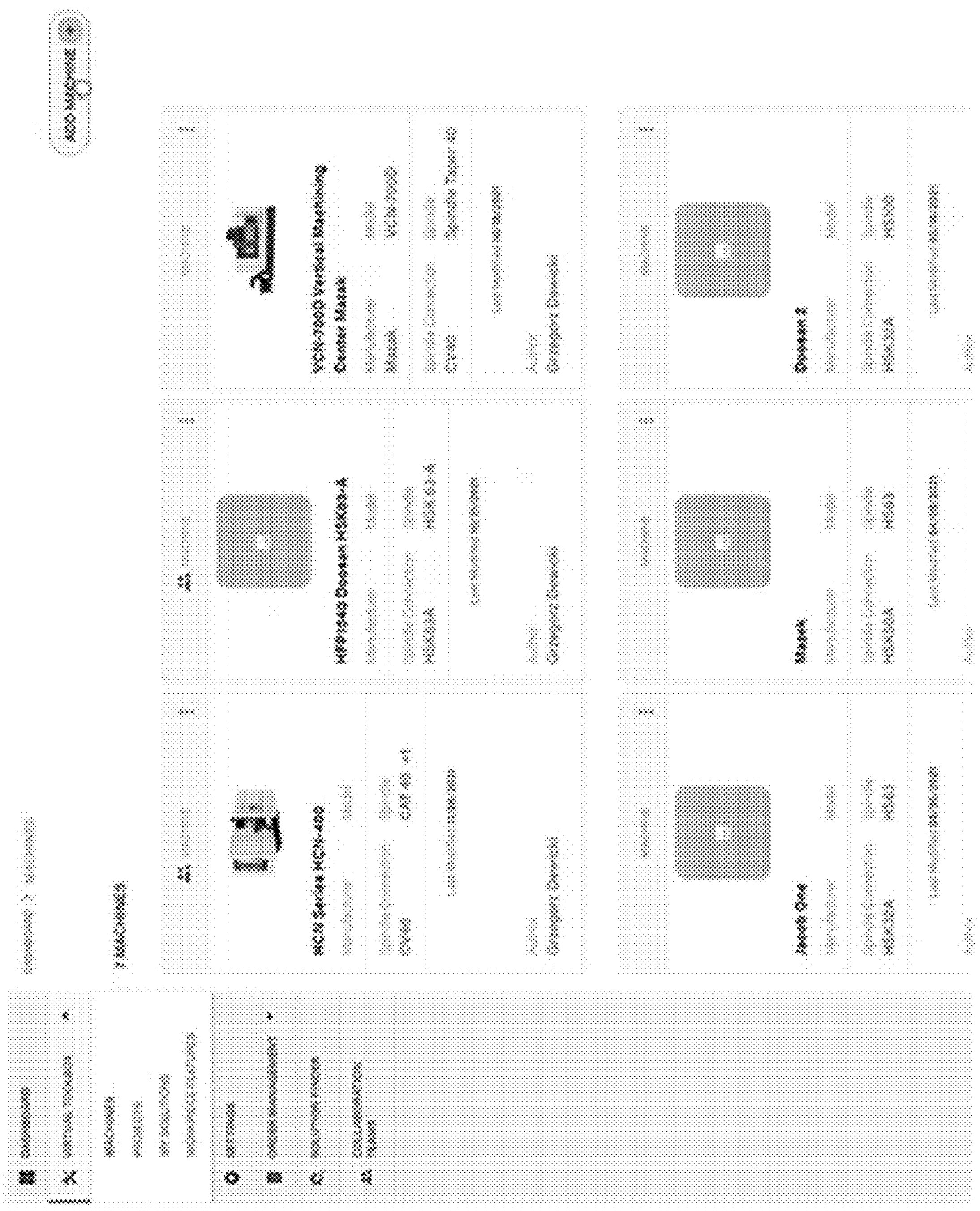
FIGS. 13 through 16 illustrate examples of screen displays and user interface tools which can be accessed through an industrial tool solution platform in association with processing machine information by a machines module.
Figure 14:
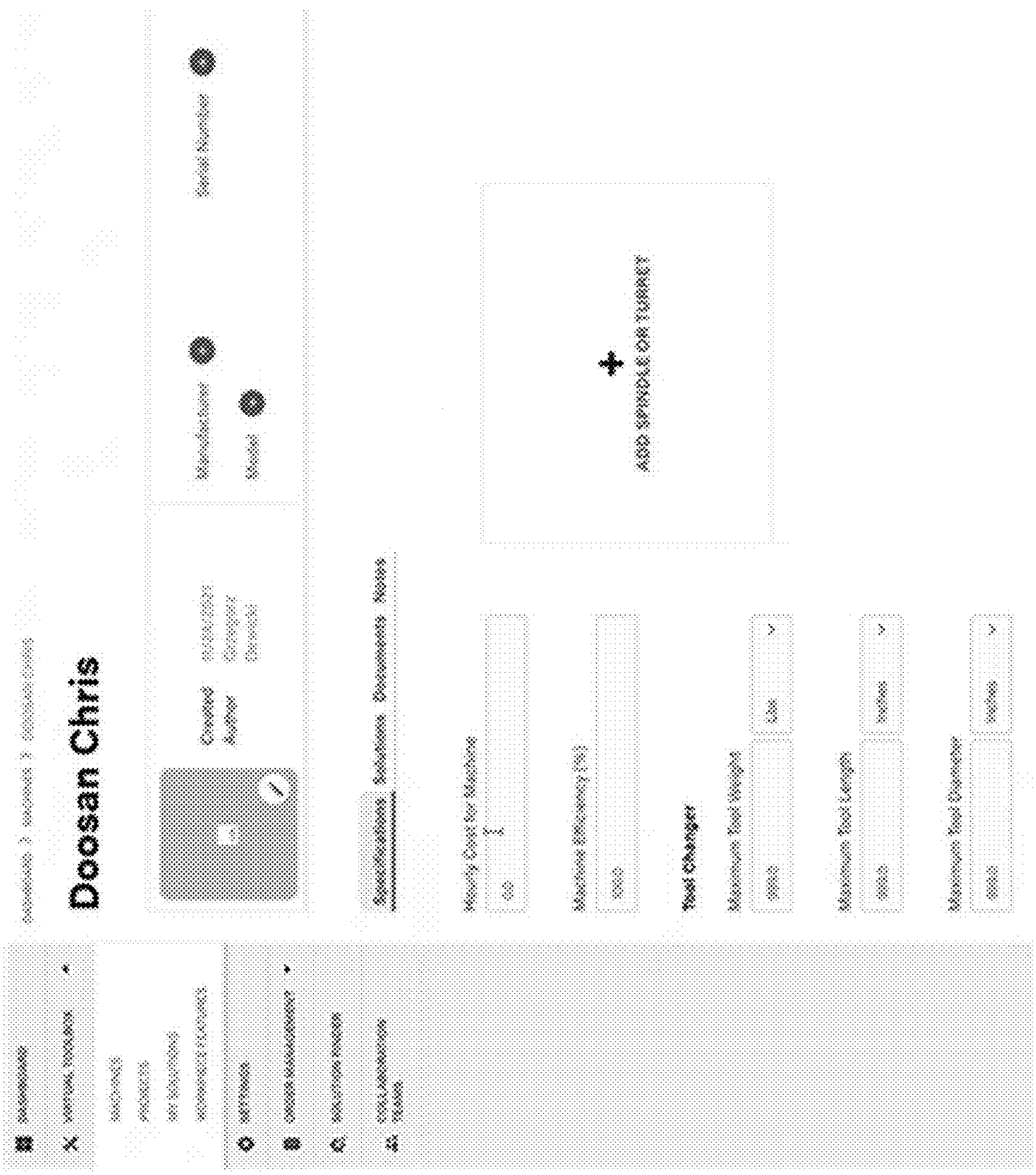
Figure 15B:
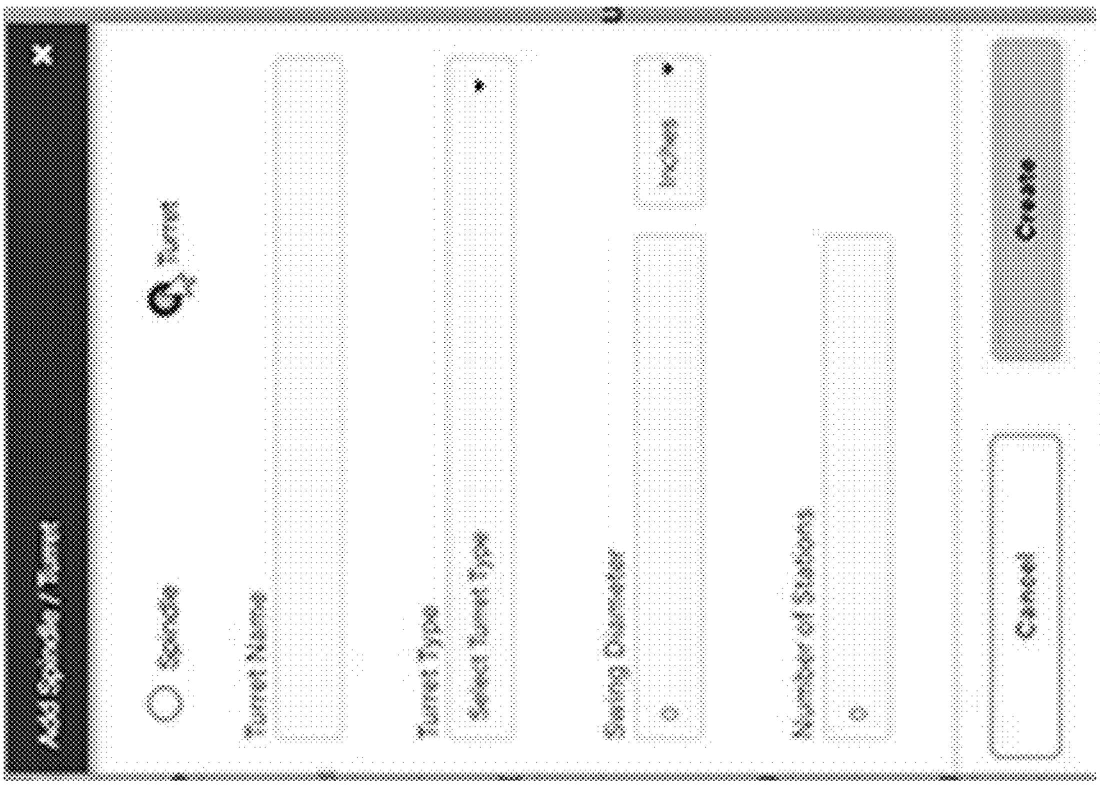
Figure 15A:
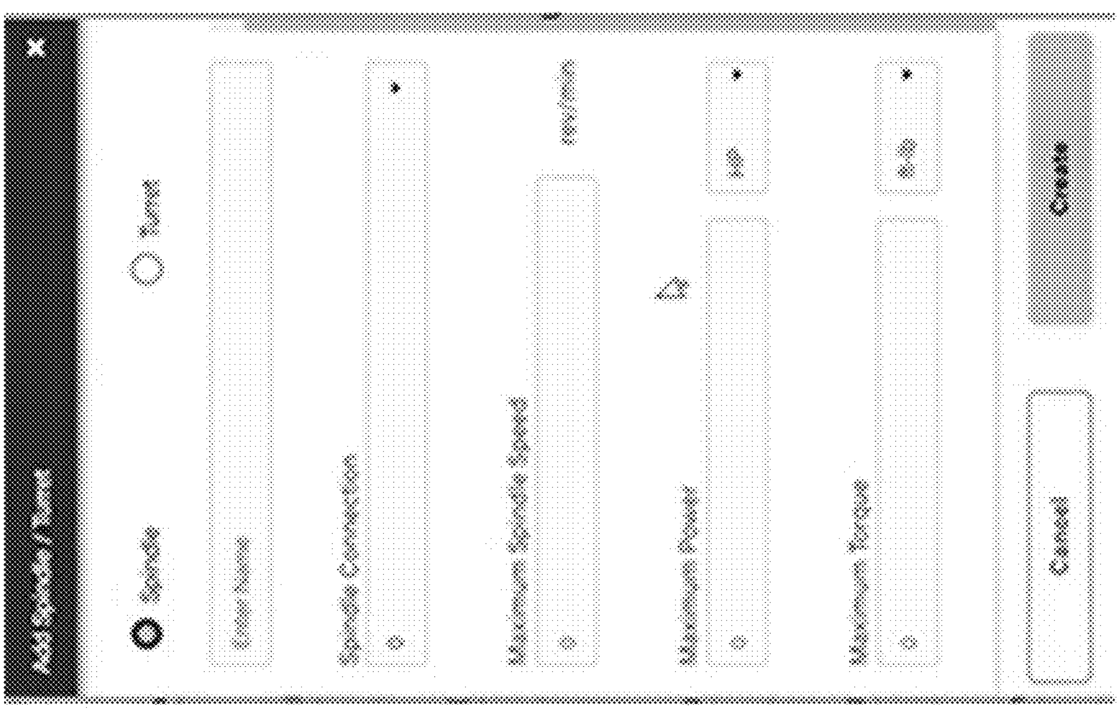
Figure 16A:
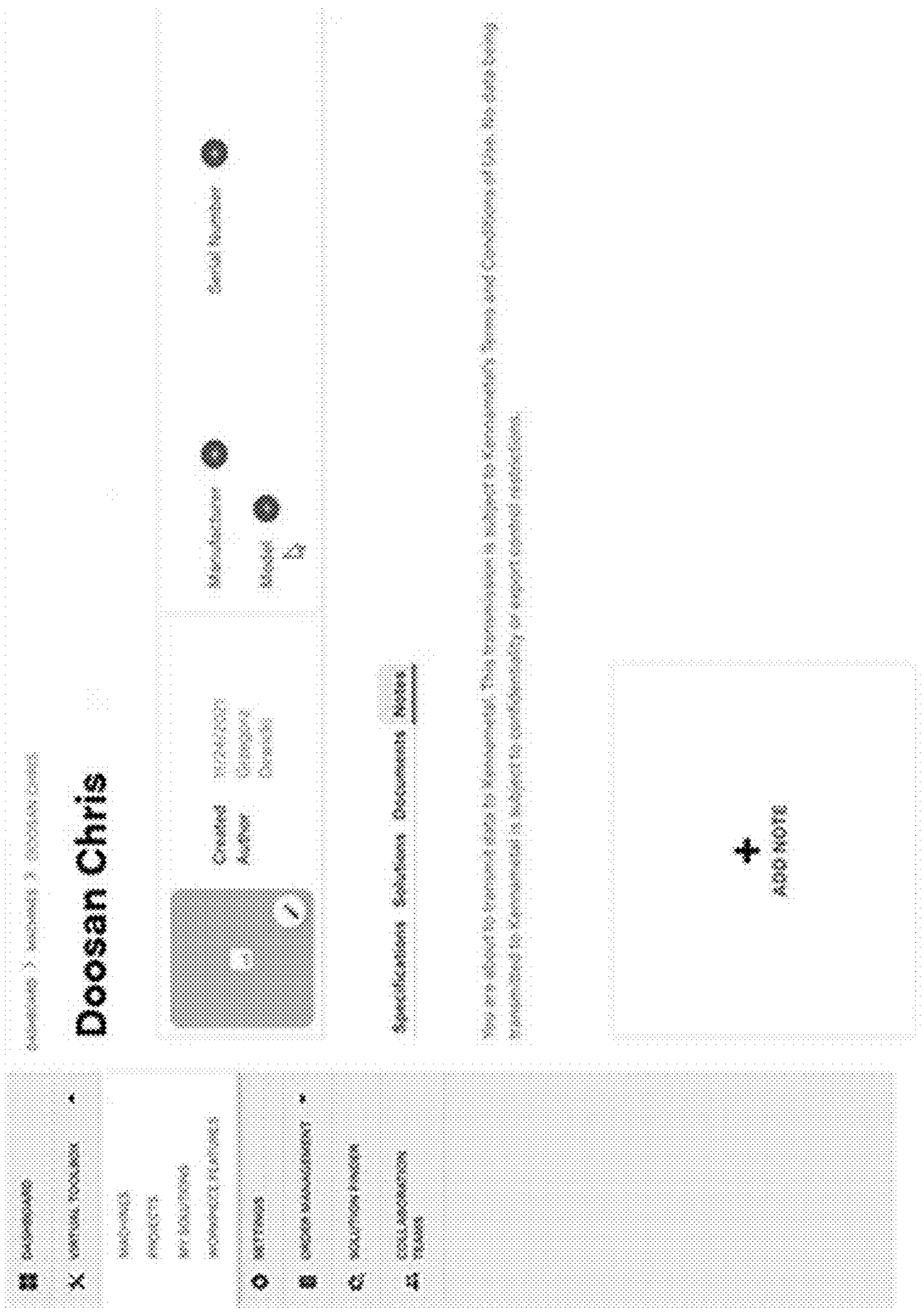
Figure 16B:
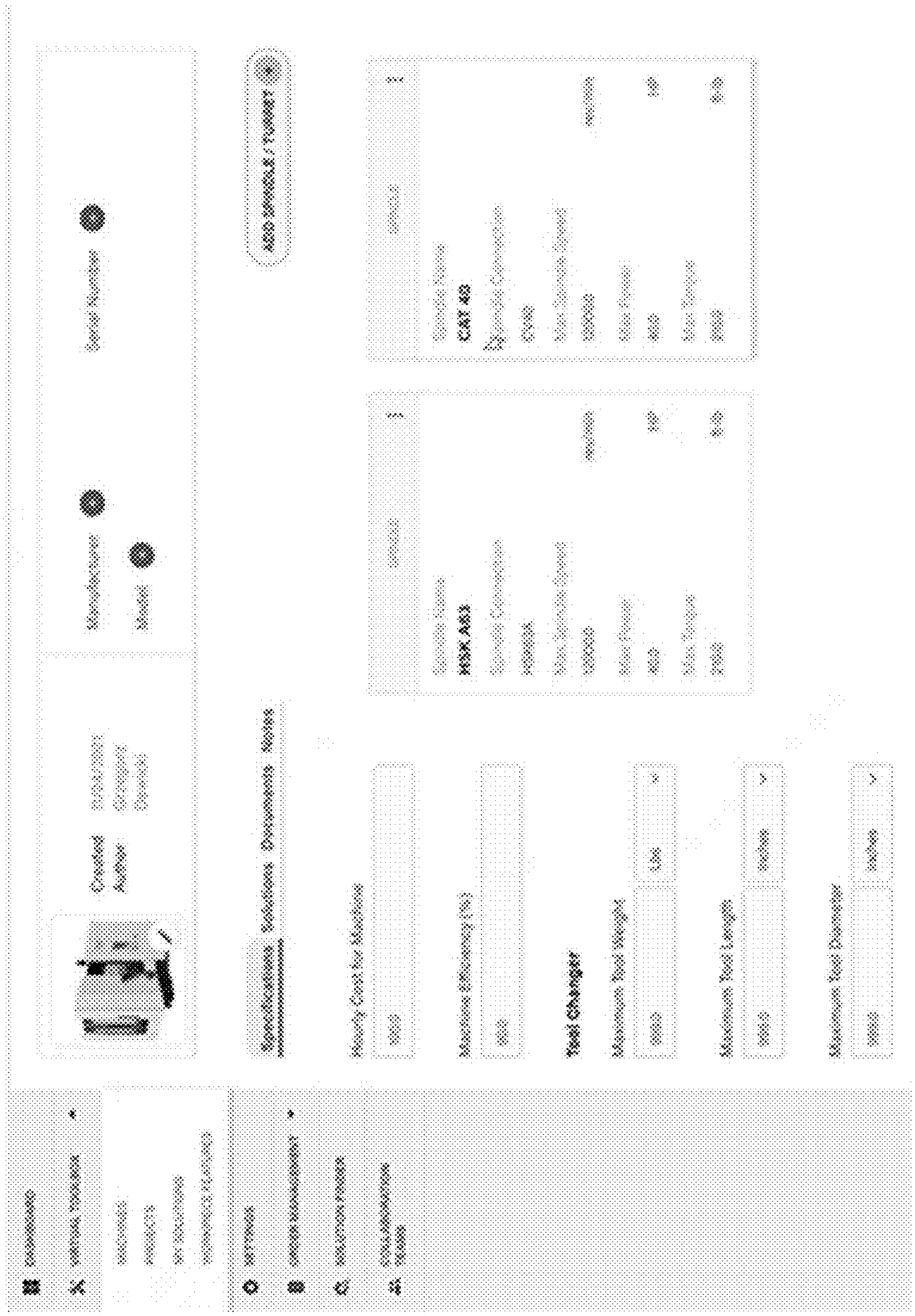

FIGS. 13 through 16 illustrate examples of screen displays and user interface tools which can be accessed through the platform 102 in association with processing machine information in connection with the machines module 106 of the virtual toolbox. FIG. 13 displays a set of machines that have been added by the machines module 106. This capability allows users to configure and specify information about heavy machines, for example, to be used by a customer in connection with an industrial tool solution. The user may select from pre-configured machines supplied by the platform 102, or can customize machine information to meet particular specifications or machine parameters. FIG. 14 illustrates an example of creating a "Doosan Chris" machine, including customizing various specifications for the machine, including information about costs, operations, machine parameters, and the type of tools the machine can use. With reference to FIGS. 15A and 15B, the type of spindle or a turret the machine possesses and associated parameters can be specified, as shown. With reference to FIGS. 16A and 16B, the machine module 106 can be programmed to associate certain information with each machine, including specification information (see FIG. 16B), the particular solutions associated with the machine (e.g., components or assemblies), relevant documentation (e.g., information received from a customer about the machine), and other notes (e.g., manufacturer, model, and serial number, etc.).

Figure 17:
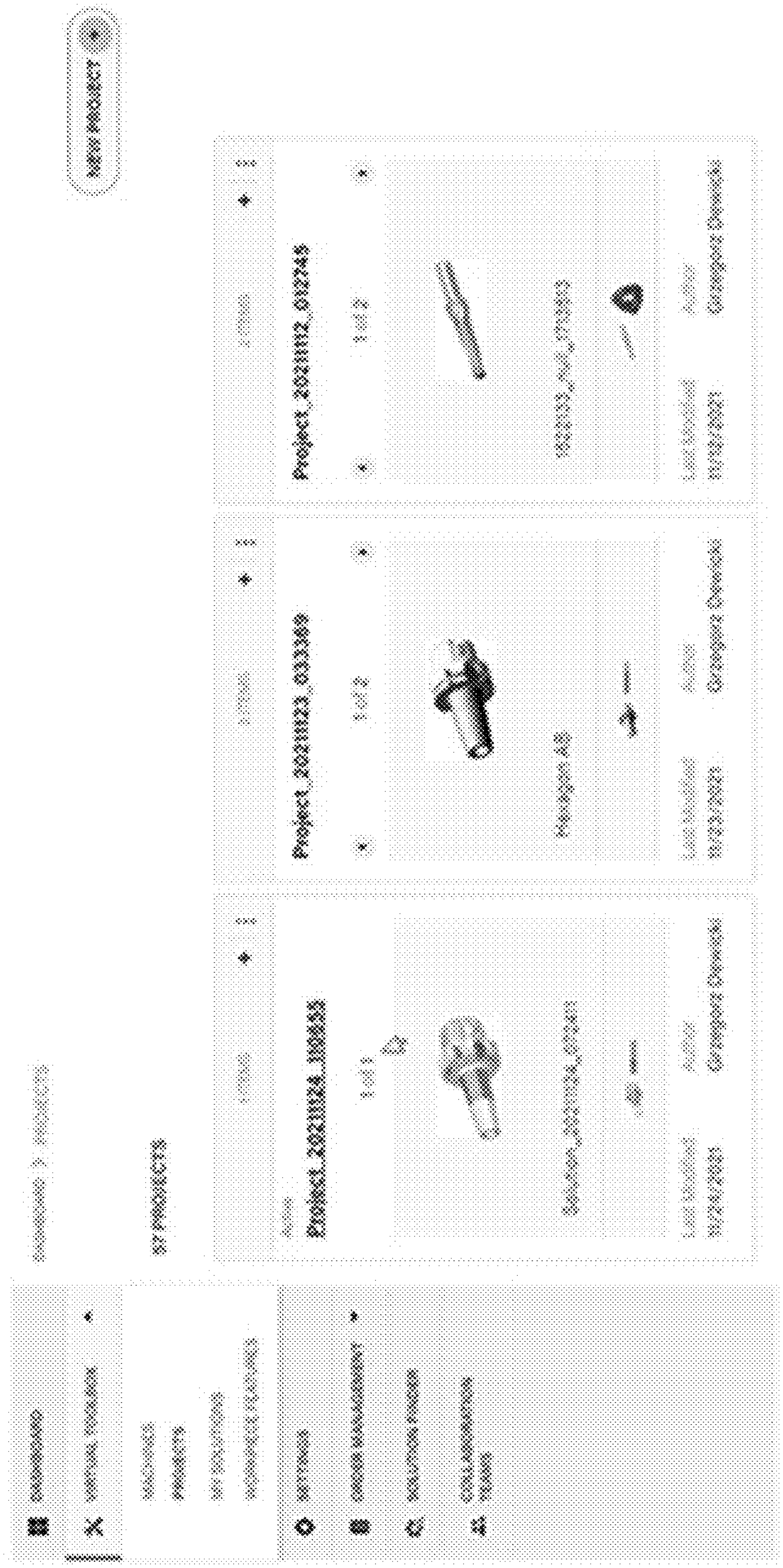
FIGS. 17 and 18 illustrate examples of screen displays and user interface tools which can be accessed through an industrial tool solution platform in association with processing project information by a projects module.
Figure 18:
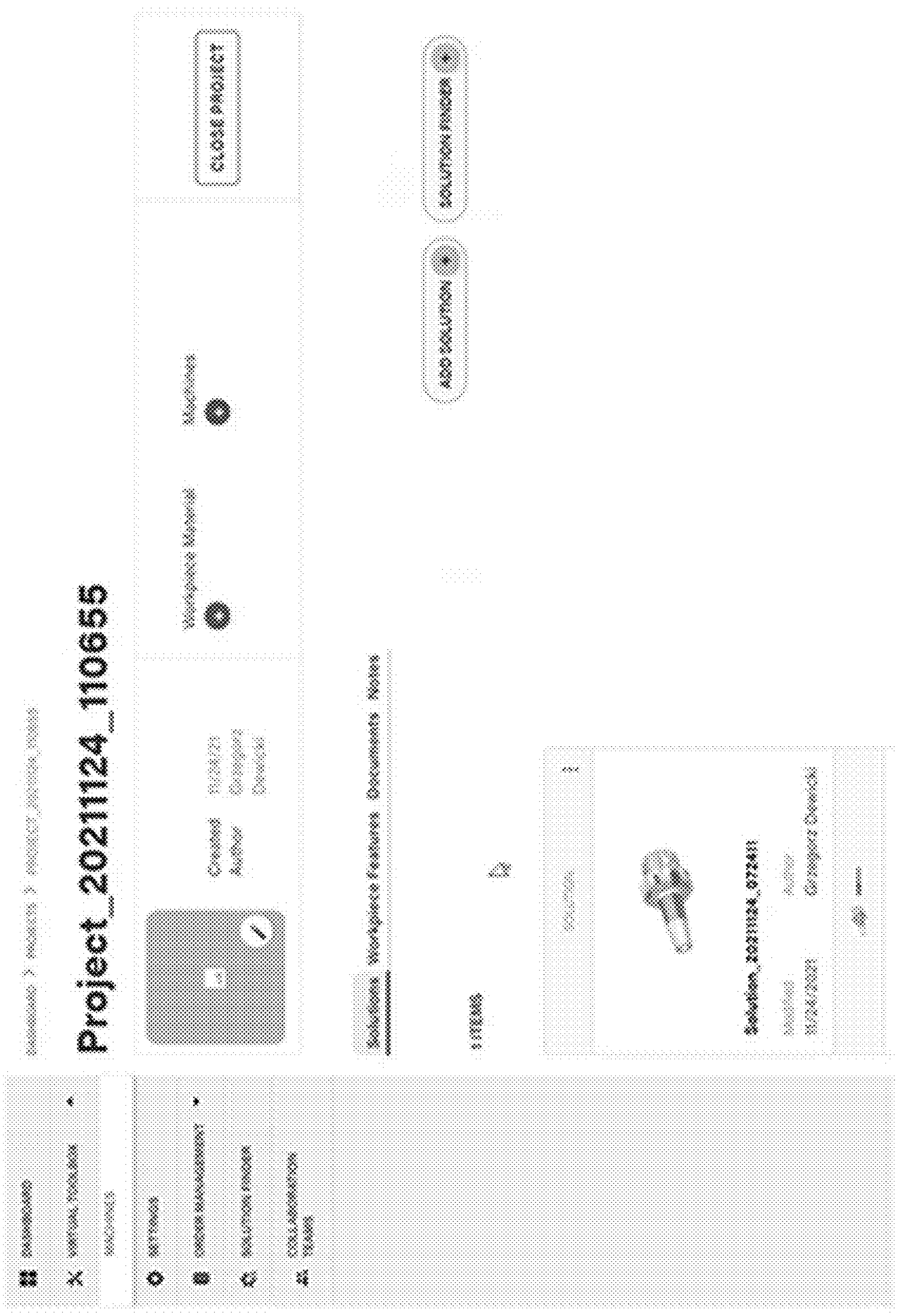

FIGS. 17 and 18 illustrate examples of screen displays and user interface tools which can be accessed through the platform 102 in association with processing project information by the projects module 108 of the virtual toolbox. With reference to FIG. 17, in the project module 108 section of the virtual toolbox, users can work on multiple machines, multiple solutions, and/or multiple projects. This can facilitate collaboration between and among customers and industrial tool solution providers, for example. With reference to FIG. 18, project information can be created and connected to different kinds of solutions. In certain aspects, solution information can be added from a list of pre-existing solutions and/or from user customized solutions.

Figure 19:
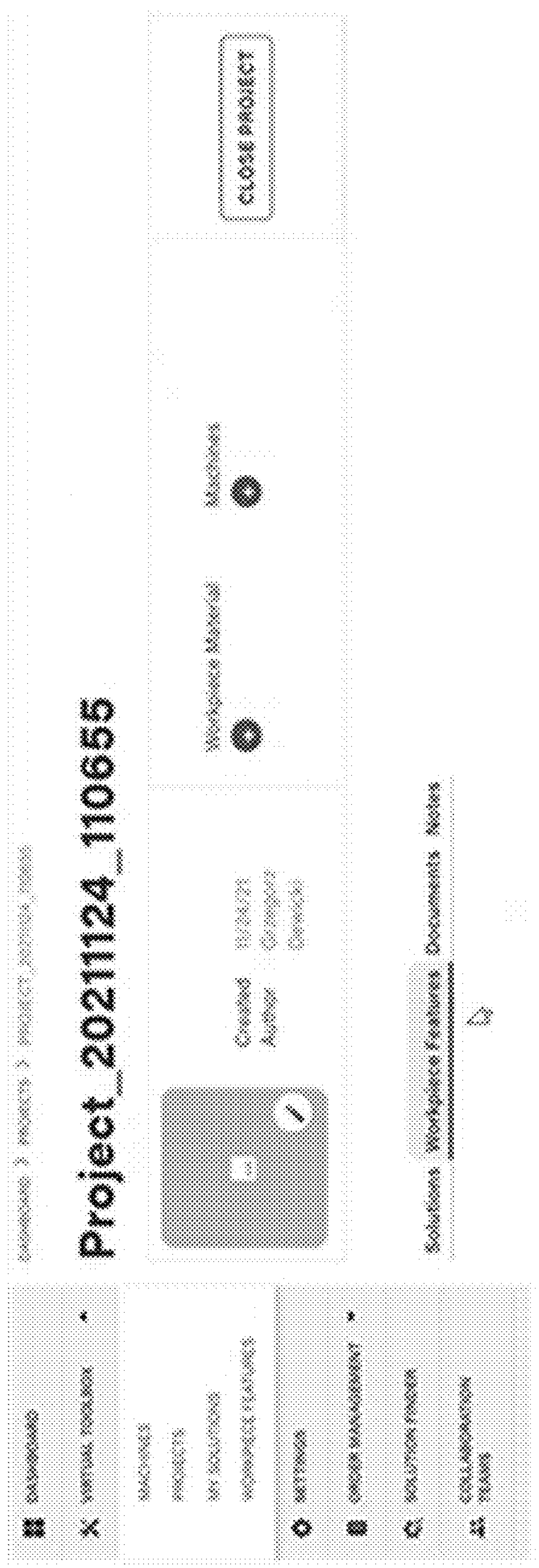
FIG. 19 includes a screen display illustrating an example of a user interface tool which can be accessed through an industrial tool solution platform in association with processing workplace features information by a workpiece features module.

FIG. 19 includes a screen display illustrating an example of a user interface tool which can be accessed through the platform in association with processing workplace features information by the workpiece features module 110. In connection with the workpiece features module 110, information can be entered about the workpiece to which the tool is to be applied. Such workpiece feature information might include material type (e.g., steel or iron), geometric configuration, physical dimensions, and/or other characteristics of the workpiece.

Figure 20:
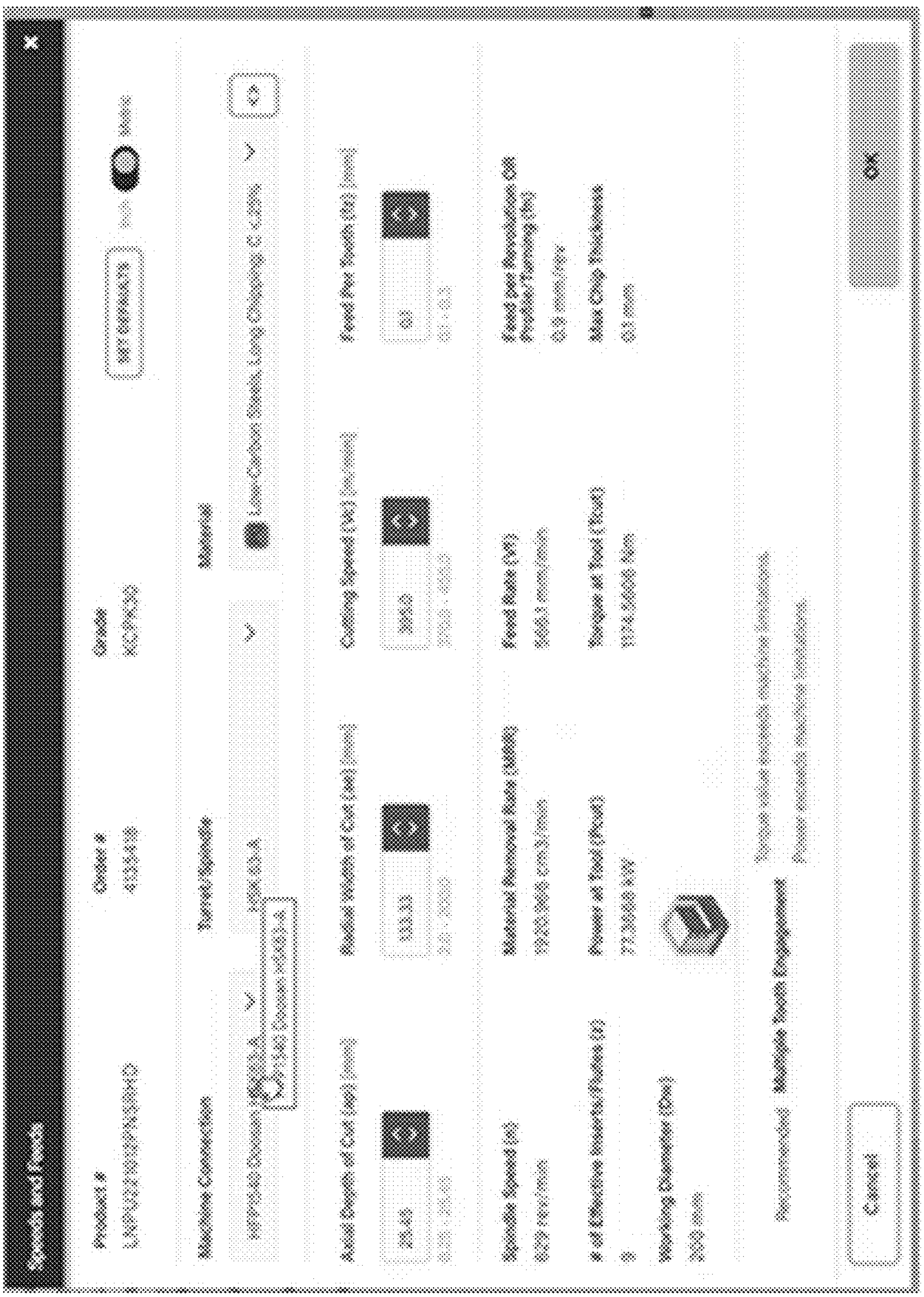
FIGS. 20 through 22 include various screen displays illustrating an example of confirming solution parameters for an industrial tool solution.
Figure 21:
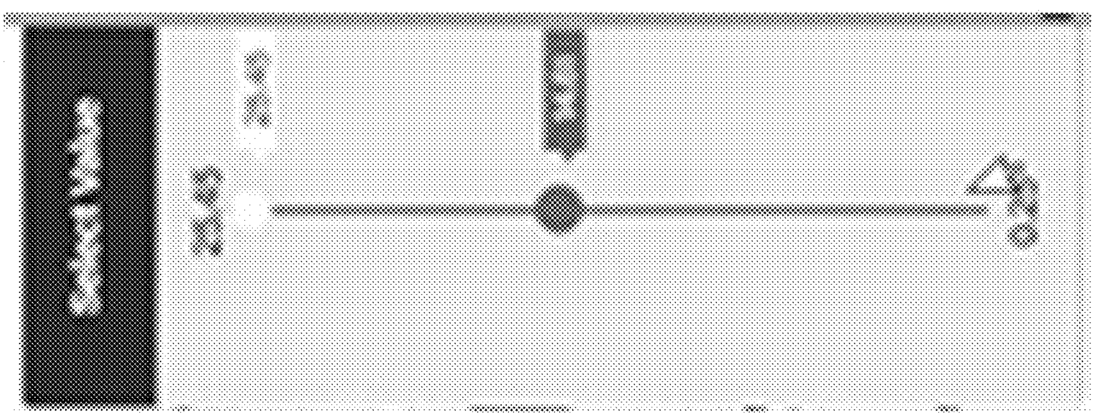
Figure 22:
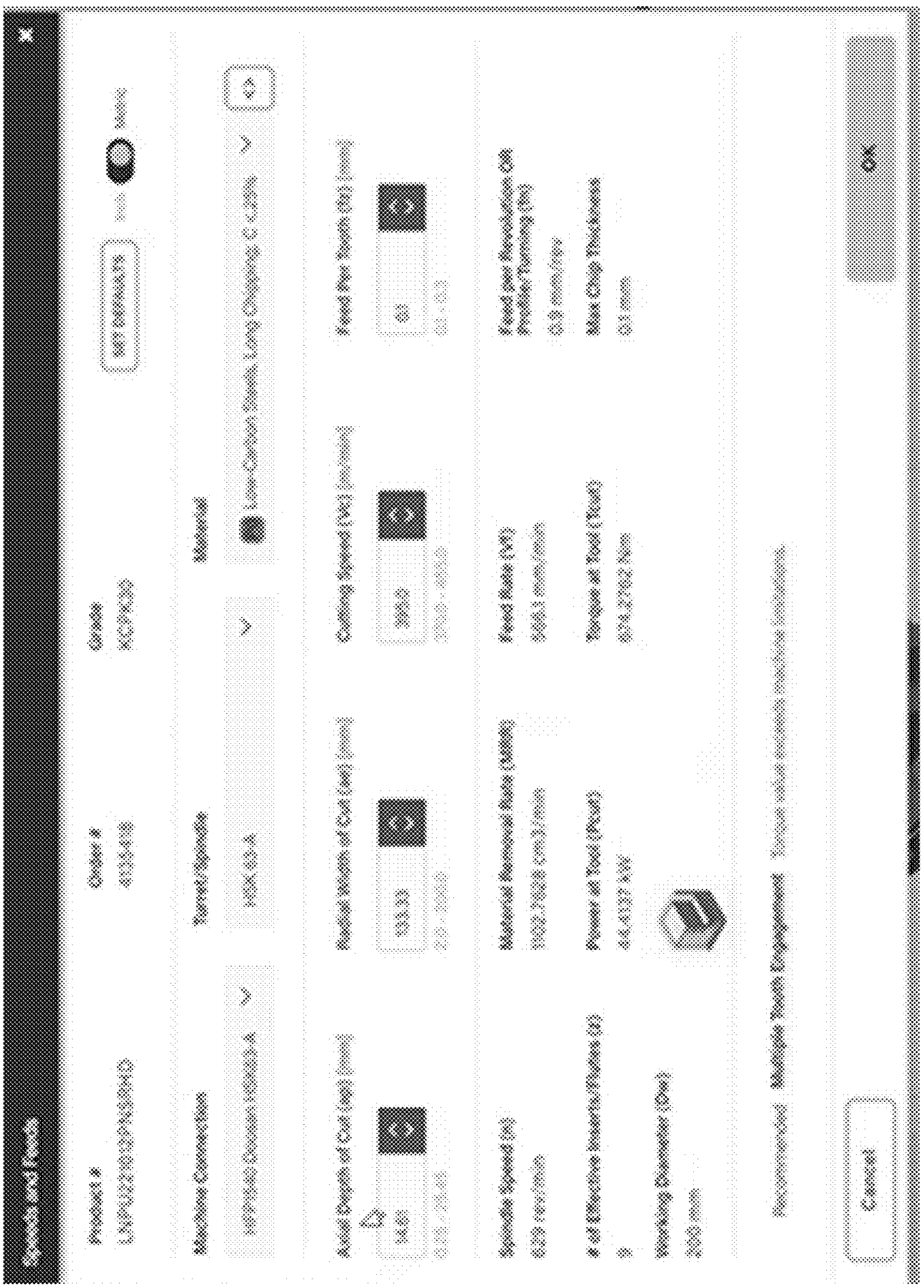

In other embodiments of the invention, FIGS. 20 through 22 include various screen displays illustrating an example of confirming solution parameters and whether the solution will be capable of being implemented on a given machine. As shown in FIG. 20, processing by the rules engine 120 of the platform 102 may conclude that there are issues with respect to multiple tooth engagement associated with the solution. In particular, the torque value and power values associated with the solution may exceed machine limitations. FIG. 21 depicts an example of a tool that can be used to adjust an axial depth of cut parameter, and this results in removal of the power-related issue (as shown in FIG. 22).

Figure 23:
FIGS. 23 and 24 include screen displays illustrating examples of incorporating certain commercial transactions associated with the technical solutions derived from an industrial tool solution platform.
Figure 24:
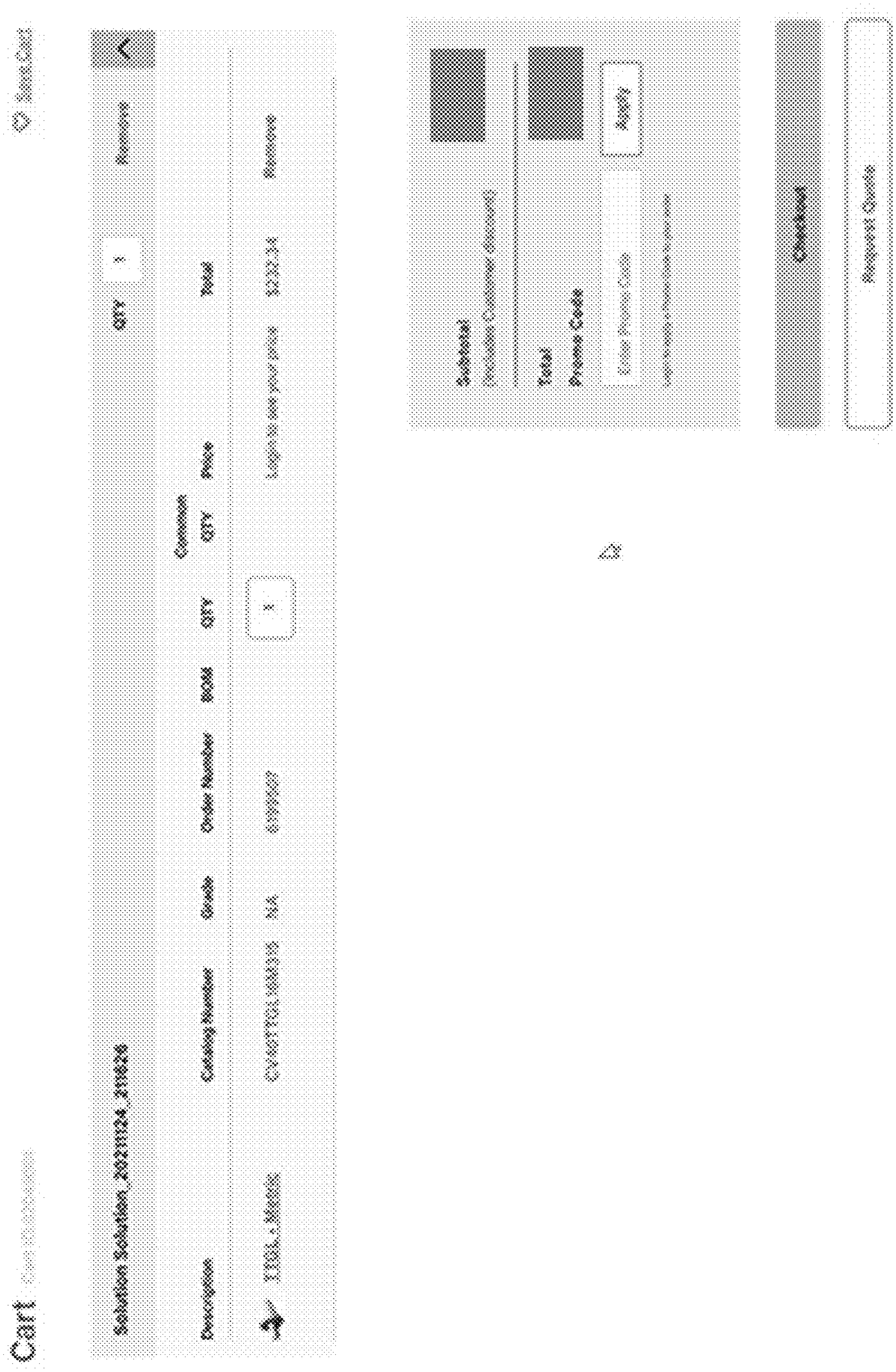

In certain embodiments of the invention, FIGS. 23 and 24 include screen displays illustrating examples of incorporating certain commercial transactions associated with the technical solutions derived from the platform 102. FIG. 23 includes a list of various user-accessible commercial aspects of a solution (invoice history, shipments, POS reports, sales, etc.). FIG. 24 illustrates an example of shopping cart function which can be used in certain embodiments to purchase a developed industrial tool solution.

Figure 25:
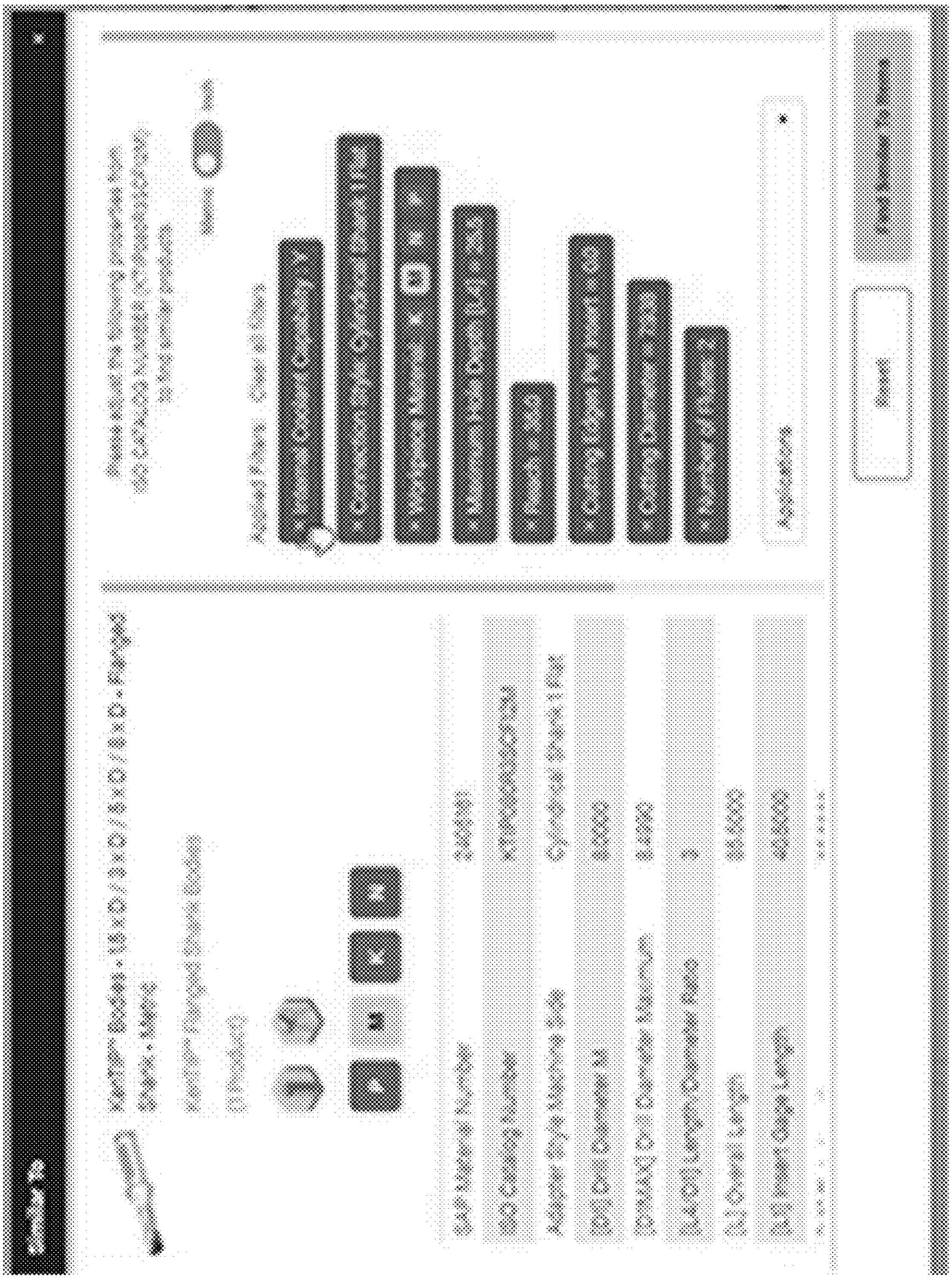
FIGS. 25 and 26 include screen displays illustrating examples of product search tools which can be accessed through an industrial tool solution platform.
Figure 26:
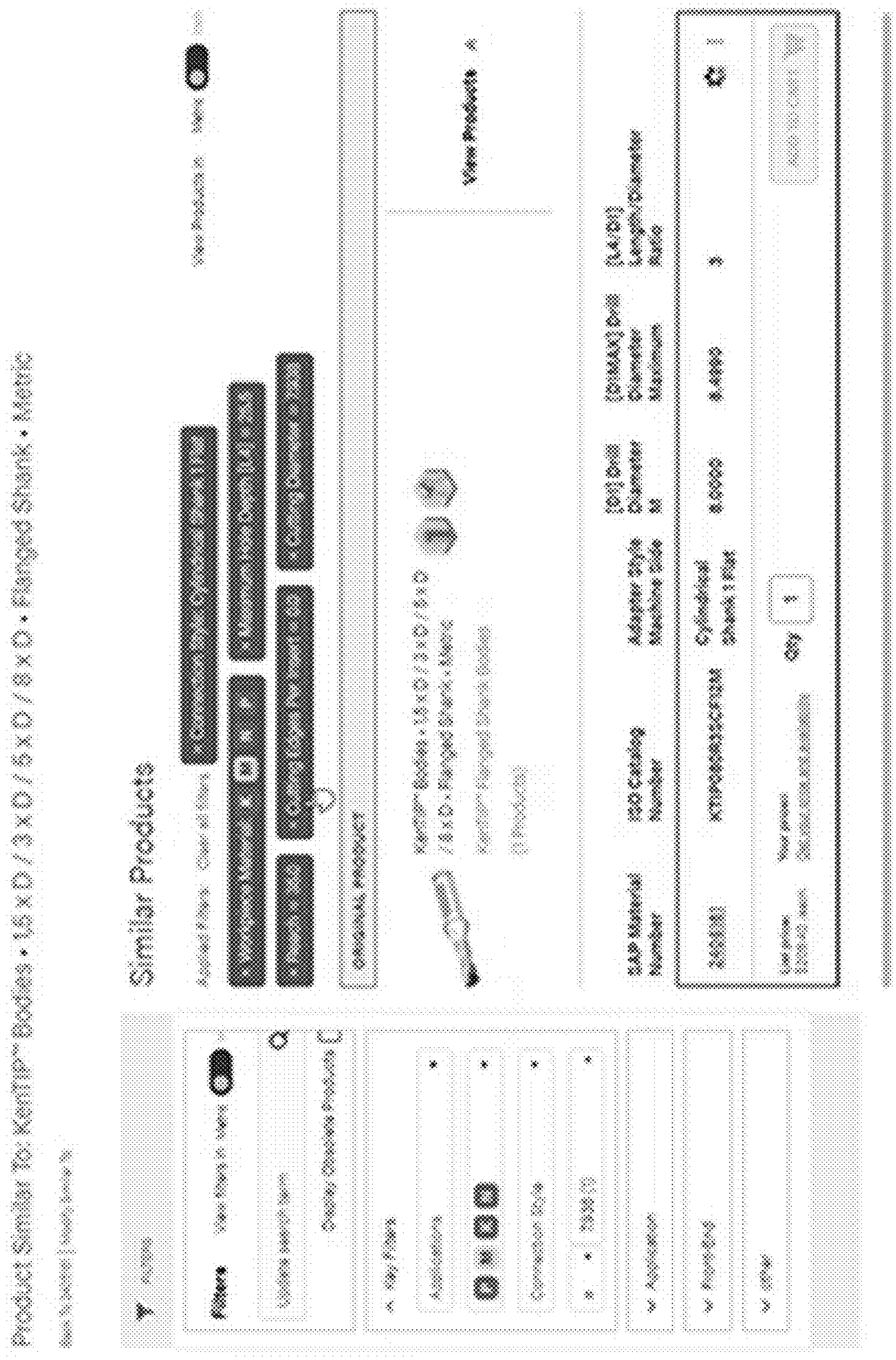
Figure 27:
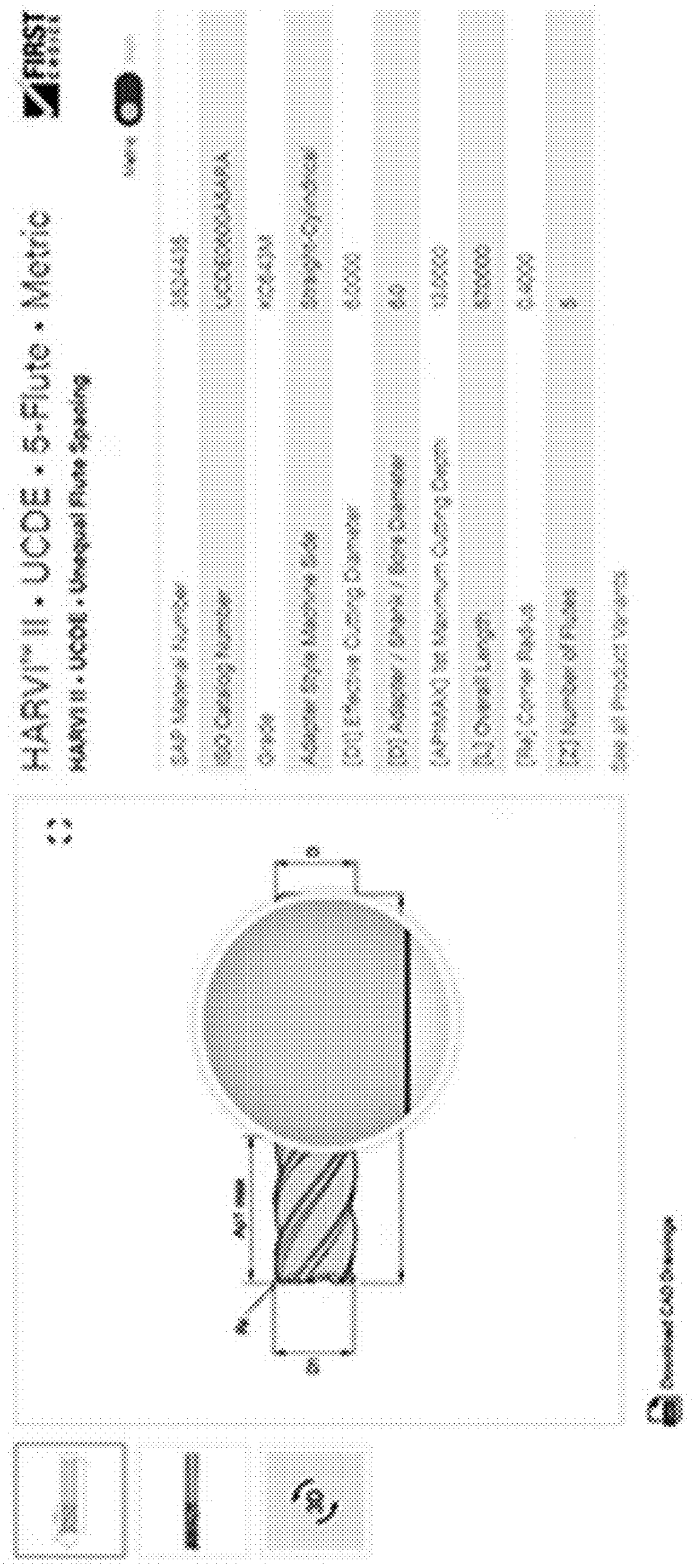
FIGS. 27 and 28 include screen displays illustrating examples of configuring or modifying parameters of a solution in an industrial tool solution platform.

In other embodiments of the invention, FIGS. 25 through 27 include screen displays illustrating examples of product search tools. In certain aspects, FIGS. 25 and 26 provide examples of identifying solutions which are similar to previously ordered solutions or perhaps solutions that have become obsolete or no longer in production. FIG. 25 shows how the platform 102 can dynamically and automatically generate and display one or more filters that are applicable to a desired solution to assist with the process of identifying another solution which is similar to the original product or solution. FIG. 26 depicts how a solution similar to an original solution has been identified and displayed. In this example, the user can modify the search results by supplementing or removing filter boxes to broaden the scope of the search, to narrow the scope of the search, or to refine the search to yield search results more closely corresponding to the original solution. FIG. 27 provides an example of graphical icons (e.g., hexagonal icons) which can be associated with each solution listing. Each of these graphical icons may be configured to represent an attribute or characteristic of the solution, such as a dimension, geometry, or other feature of the solution.

Figure 28:
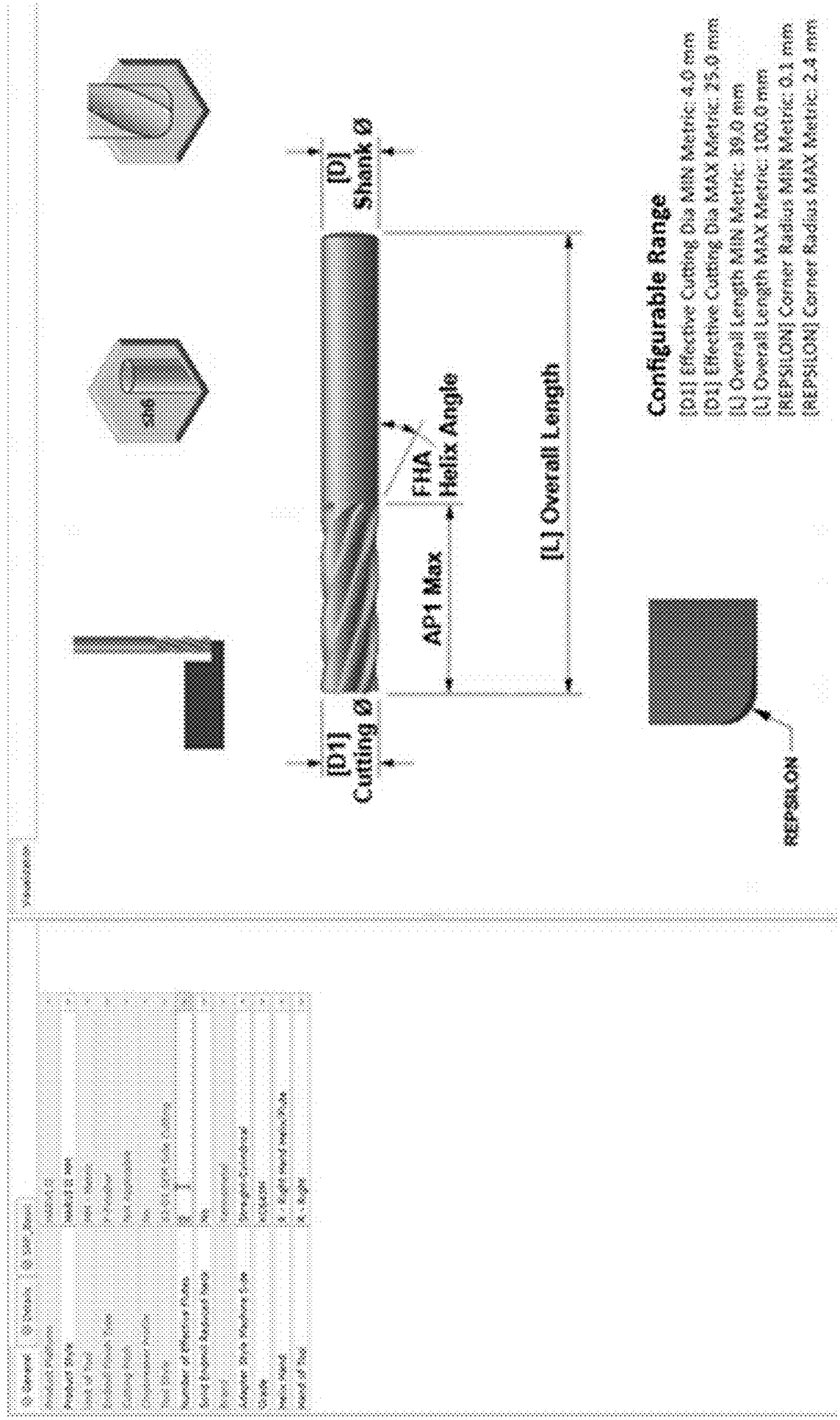

FIGS. 27 and 28 include screen displays illustrating examples of configuring or modifying parameters of a solution in the industrial tool solution platform 102. As shown, and perhaps in the context of an identified "similar to" solution, the user can configure the newly identified solution and make changes to geometry, dimensions, and other parameters which customize the solution for a current application. For example, the solution may be altered from a four-flute design to another type of flute design parameter, or to change a length of a part.

Figure 29:
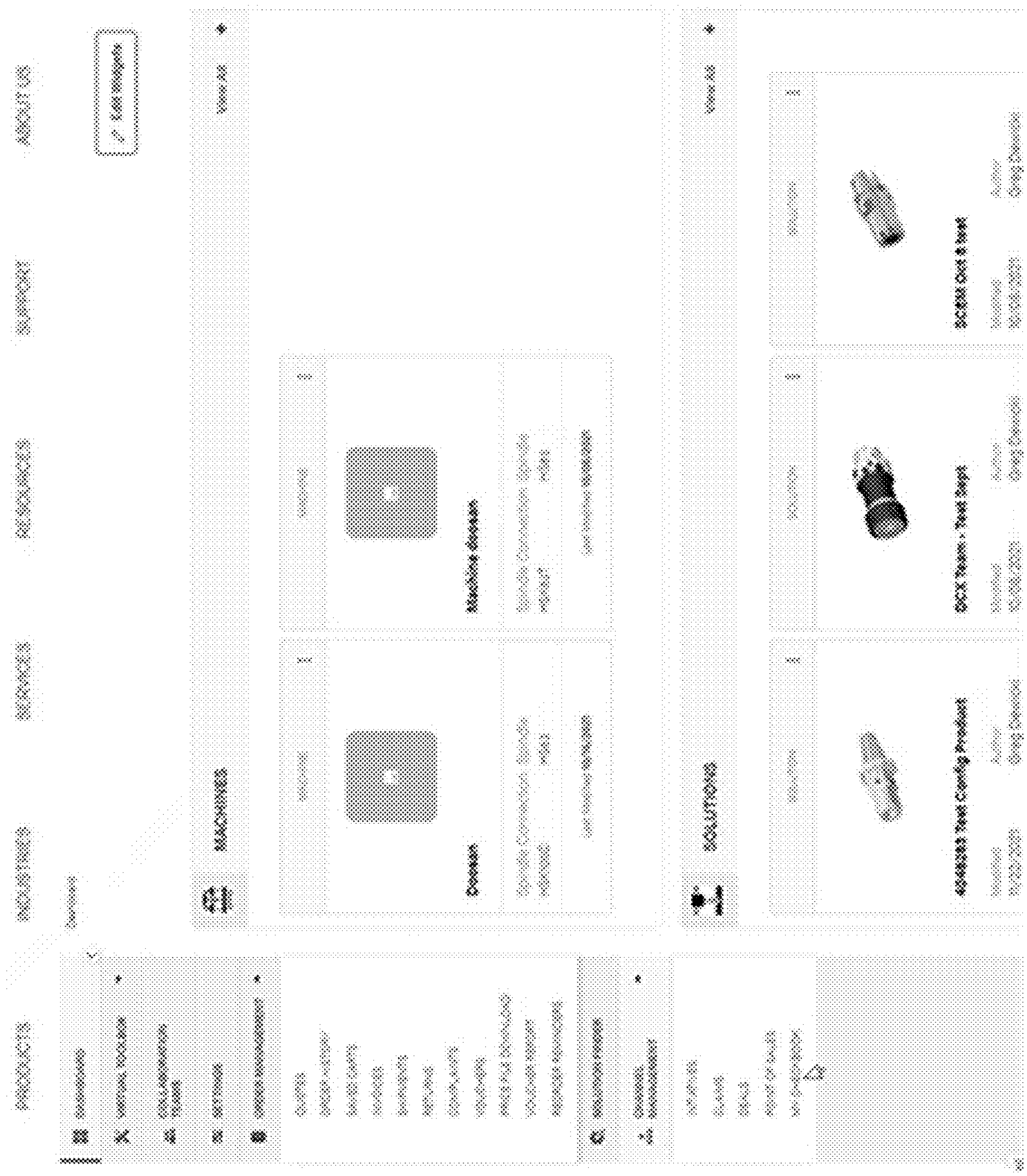
FIG. 29 includes a screen display illustrating examples of accessing various aspects or features of channel partner relationships which can be enabled or facilitated through an industrial tool solution platform.
Figure 30:
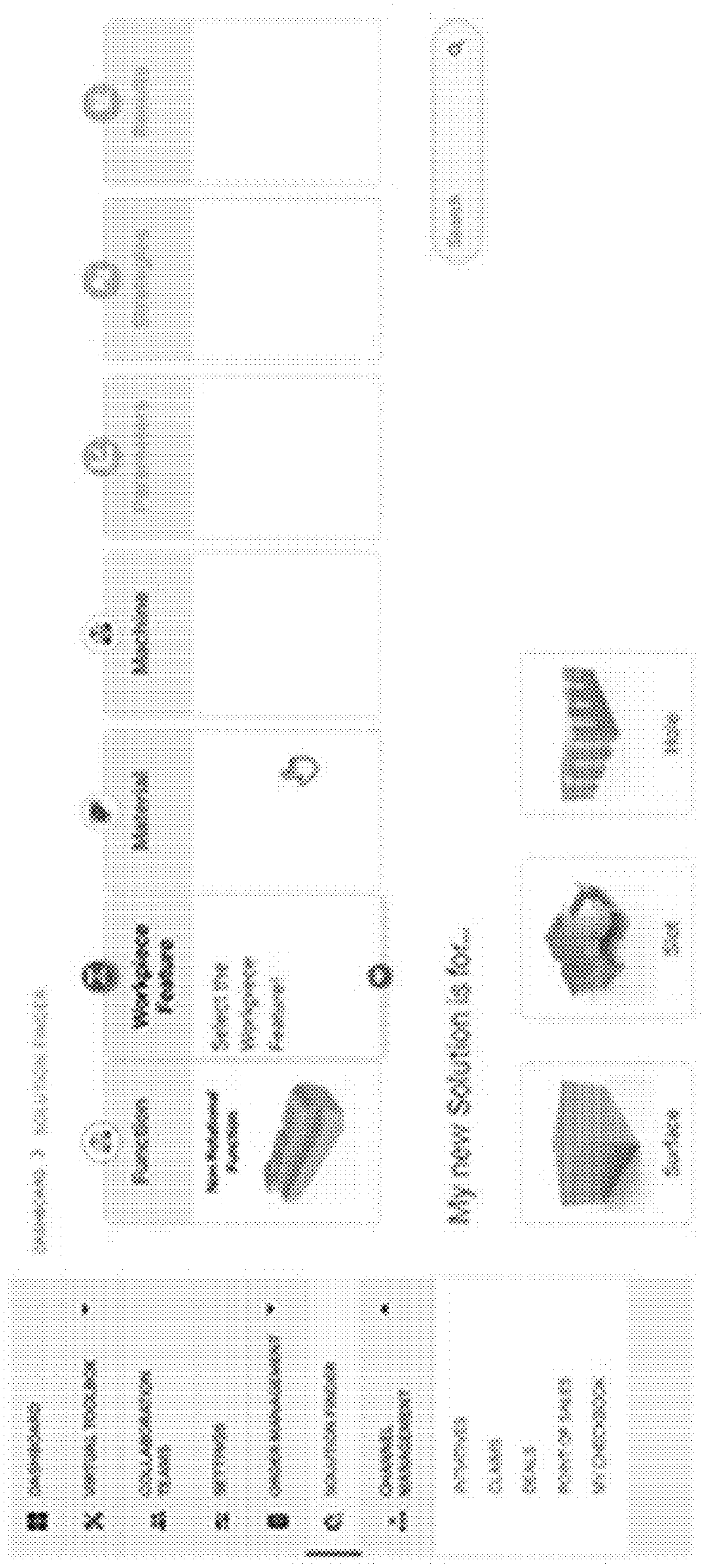
FIGS. 30 through 39 include various screen displays illustrating examples of different aspects of a solutions finder feature which can be accessed in connection with an industrial tool solution platform.
Figure 31:
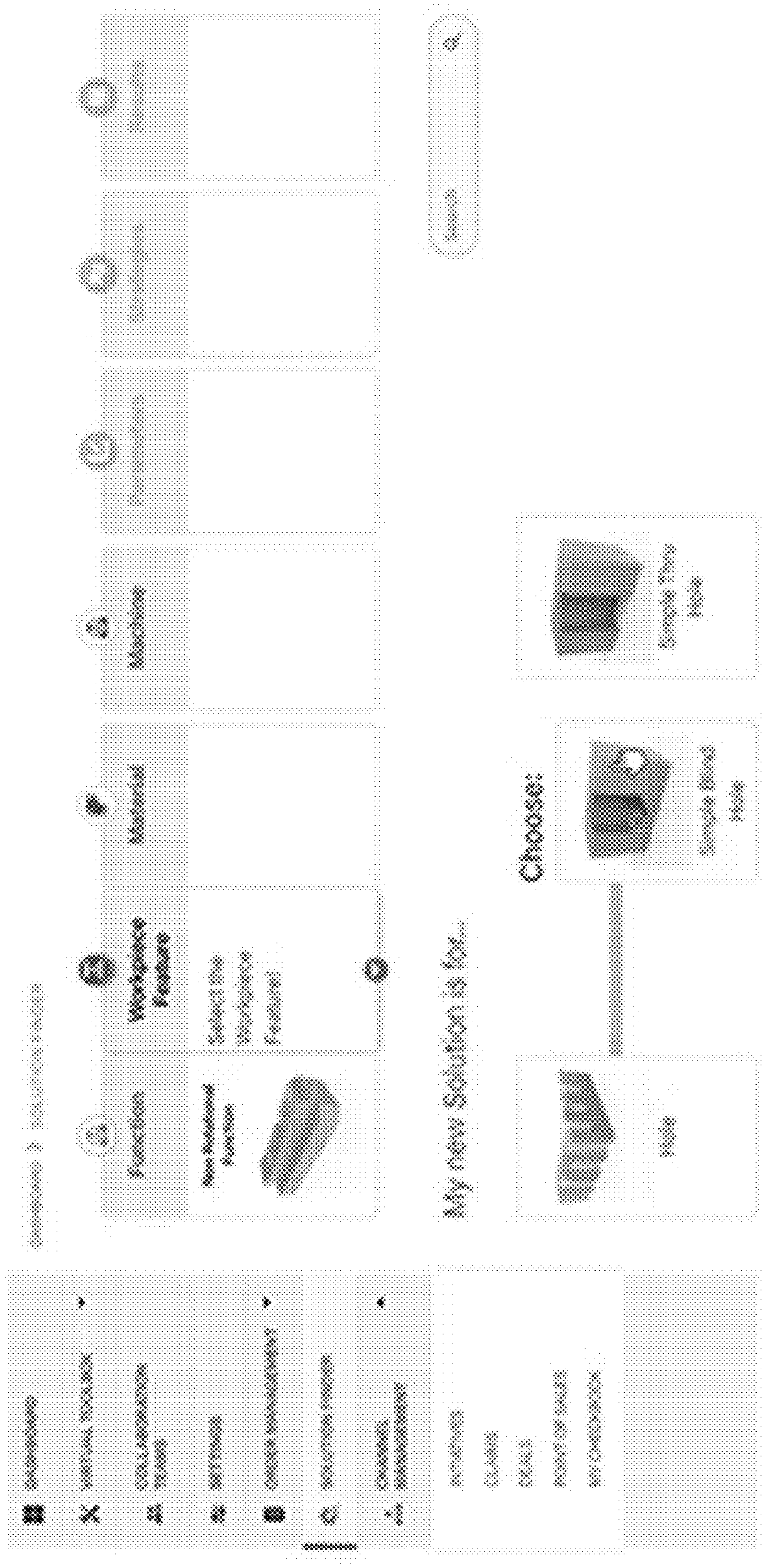
Figure 32:
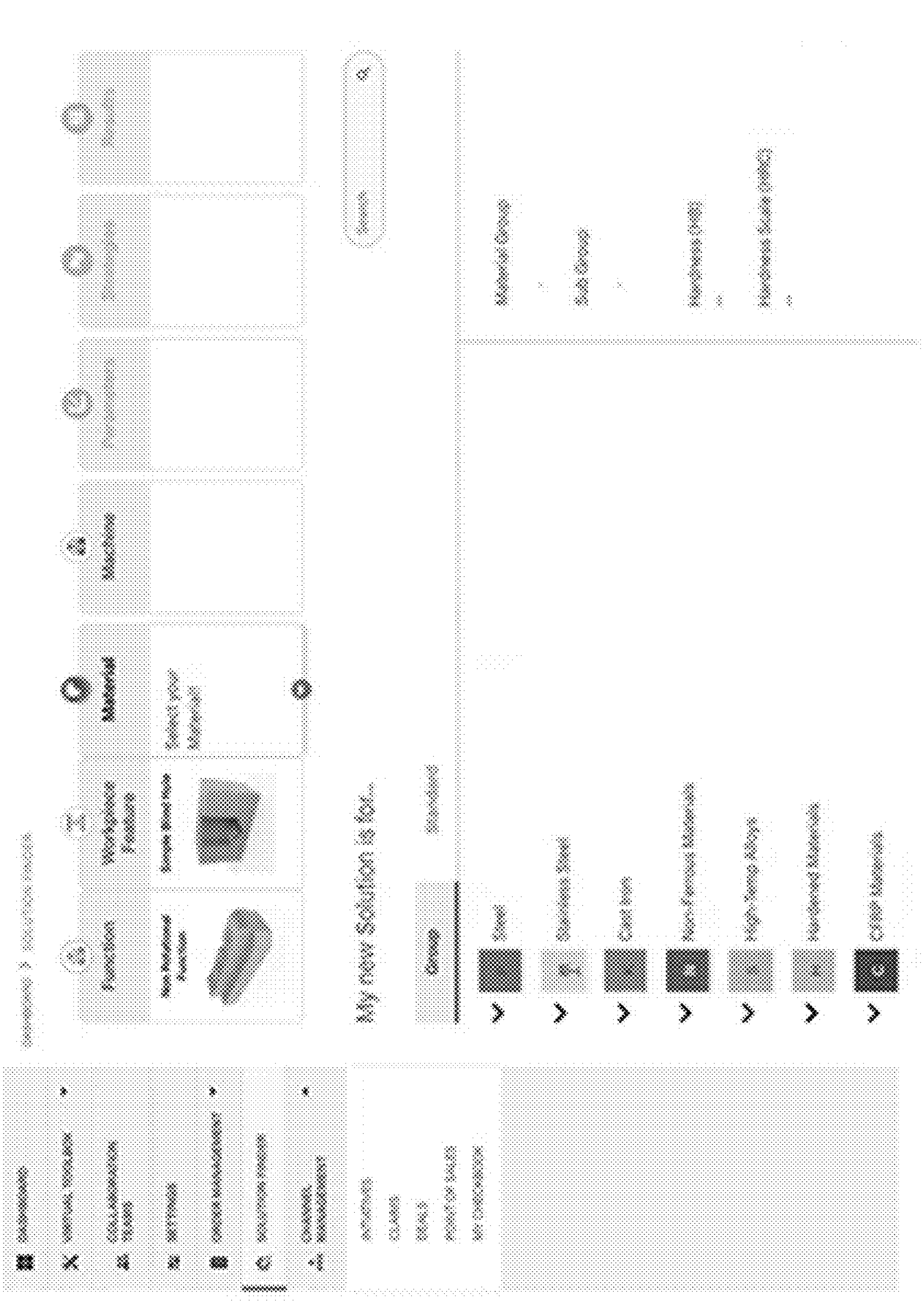
Figure 33:
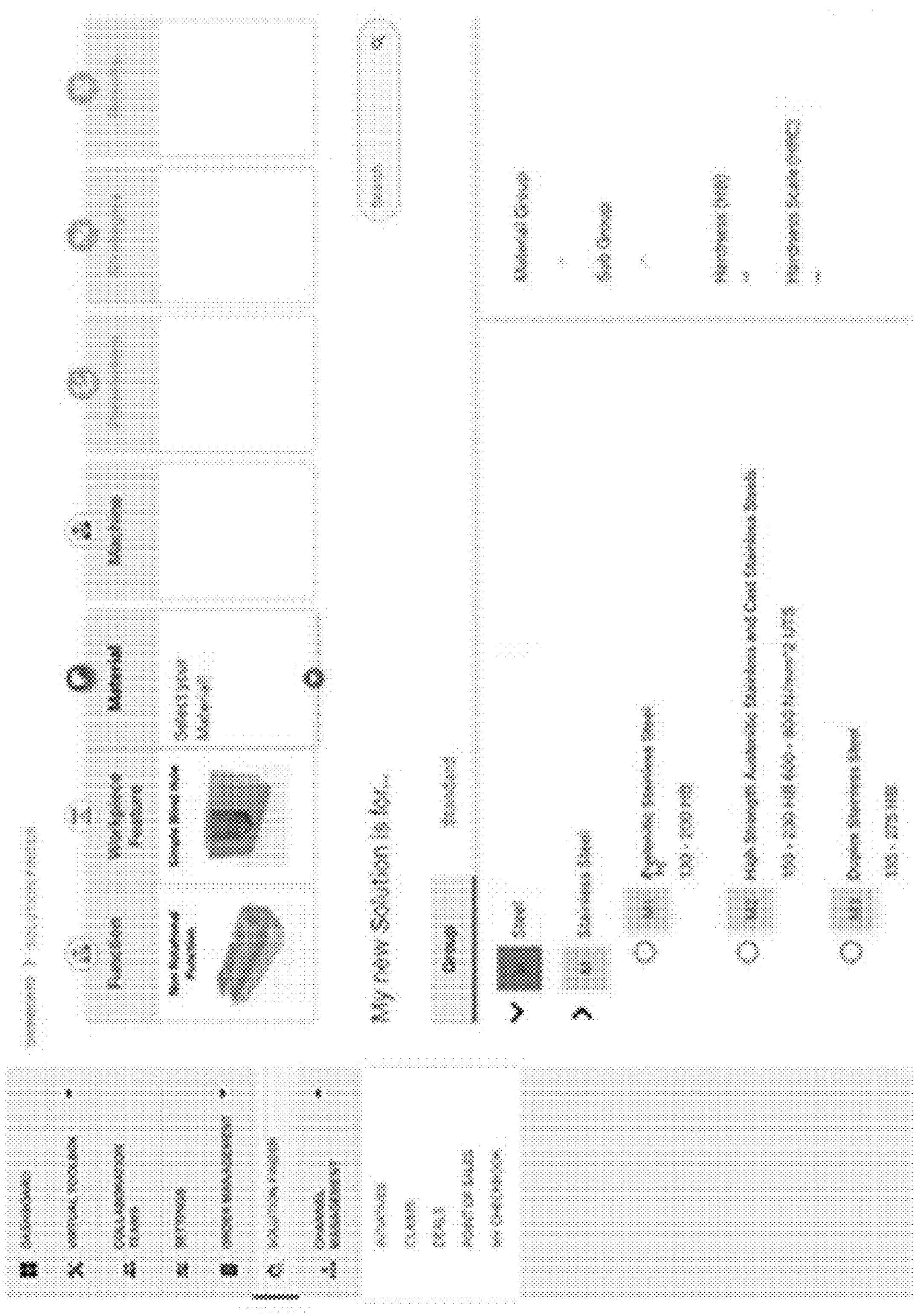
Figure 34:
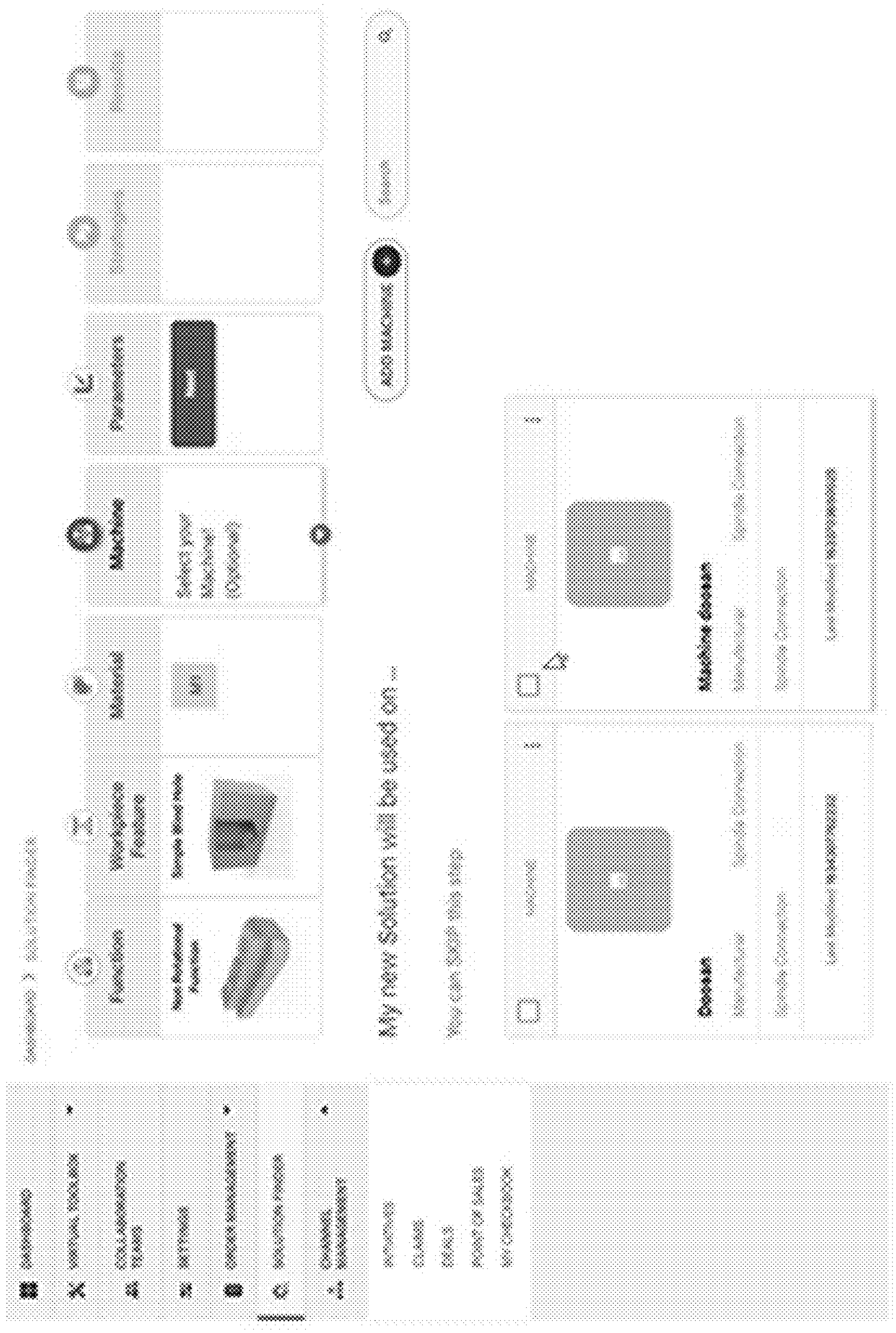
Figure 35A:
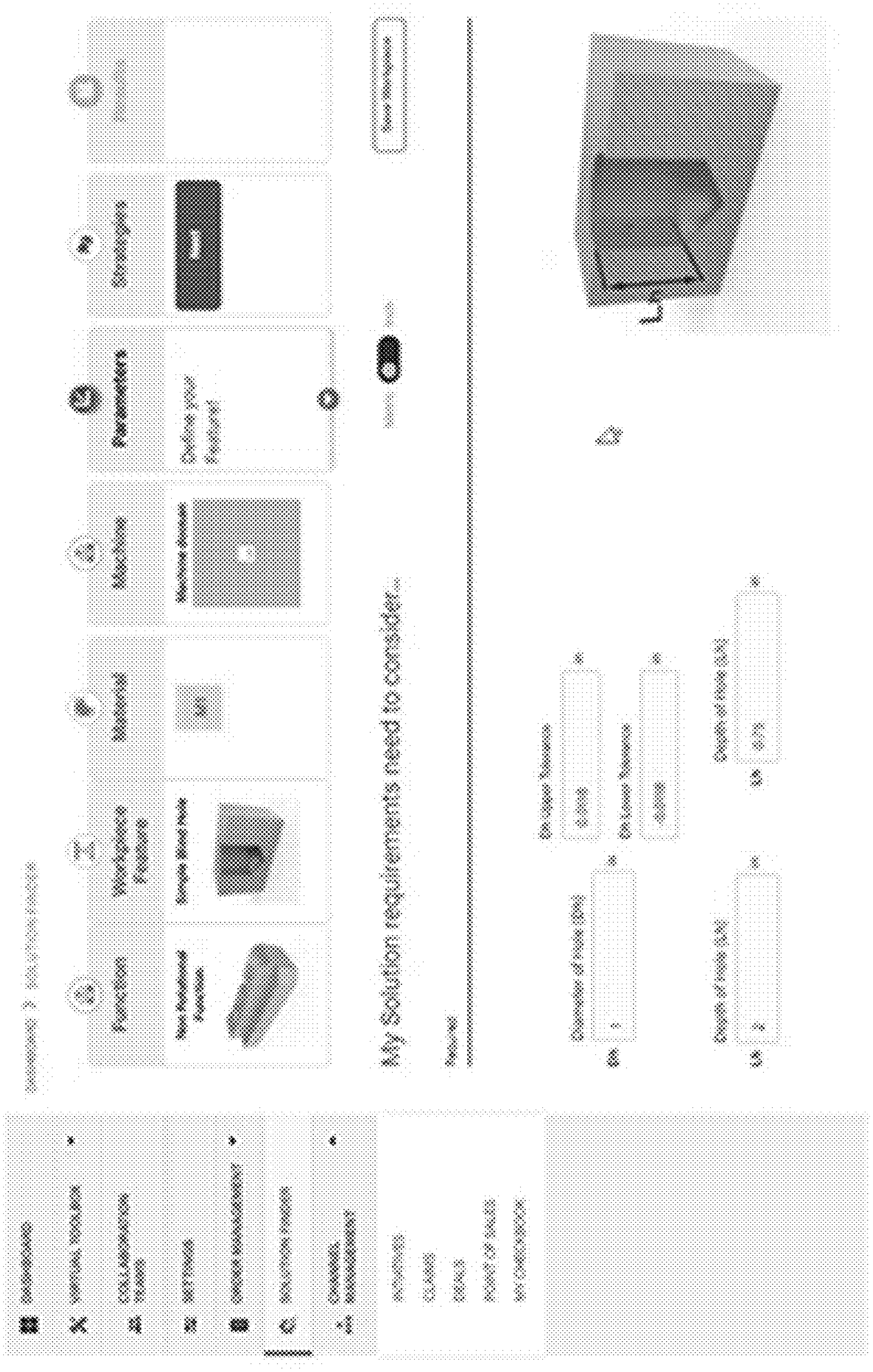
Figure 35B:
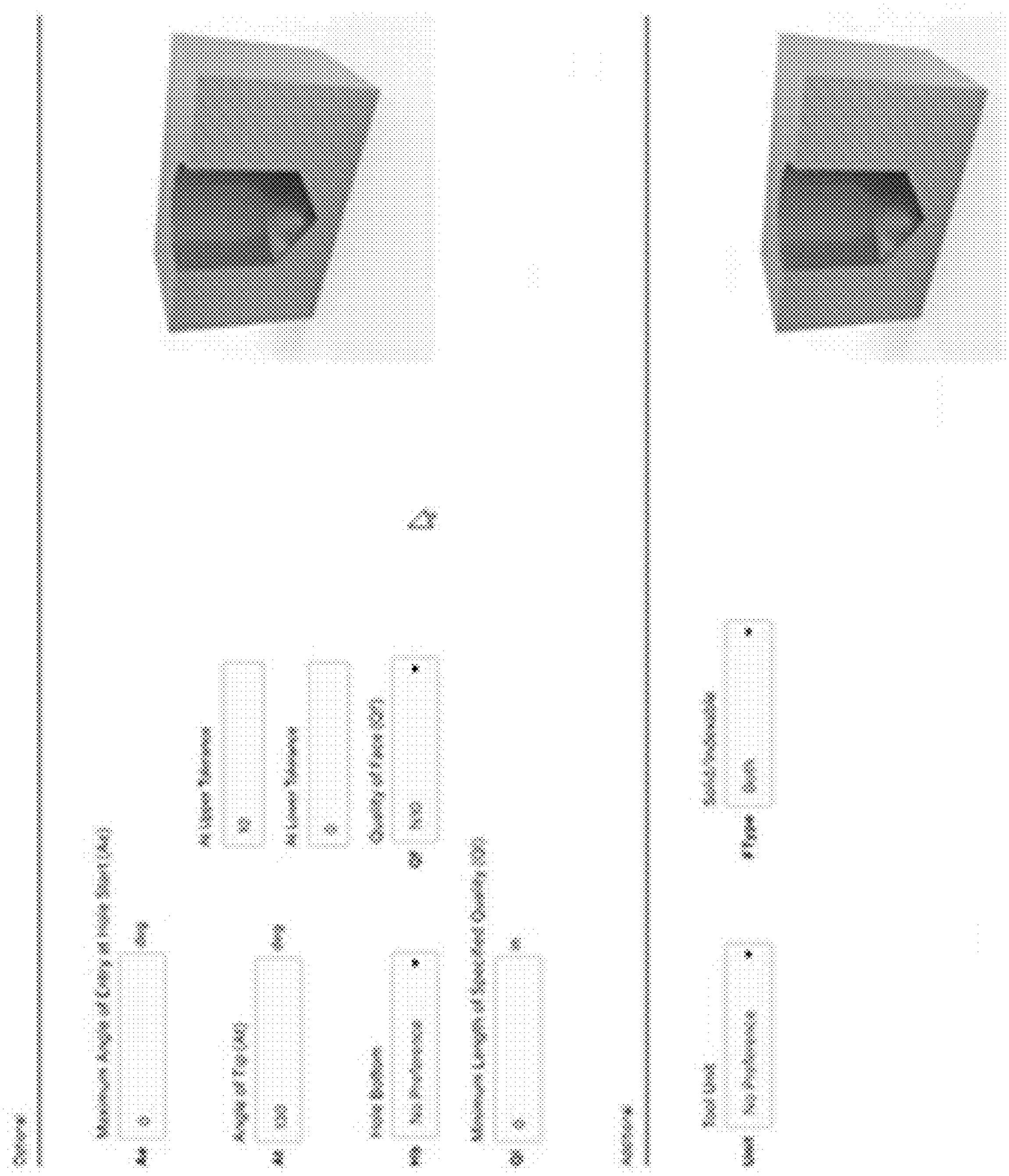
Figure 36:
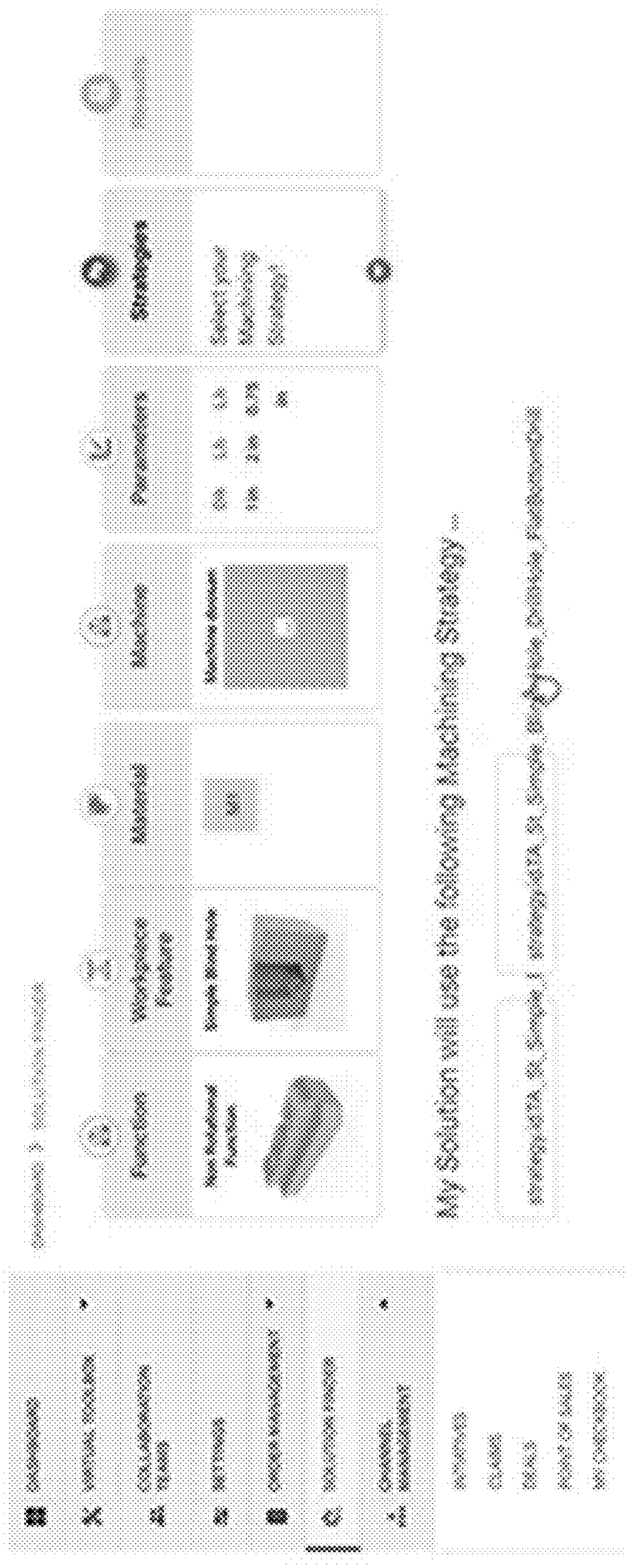
Figure 37A:
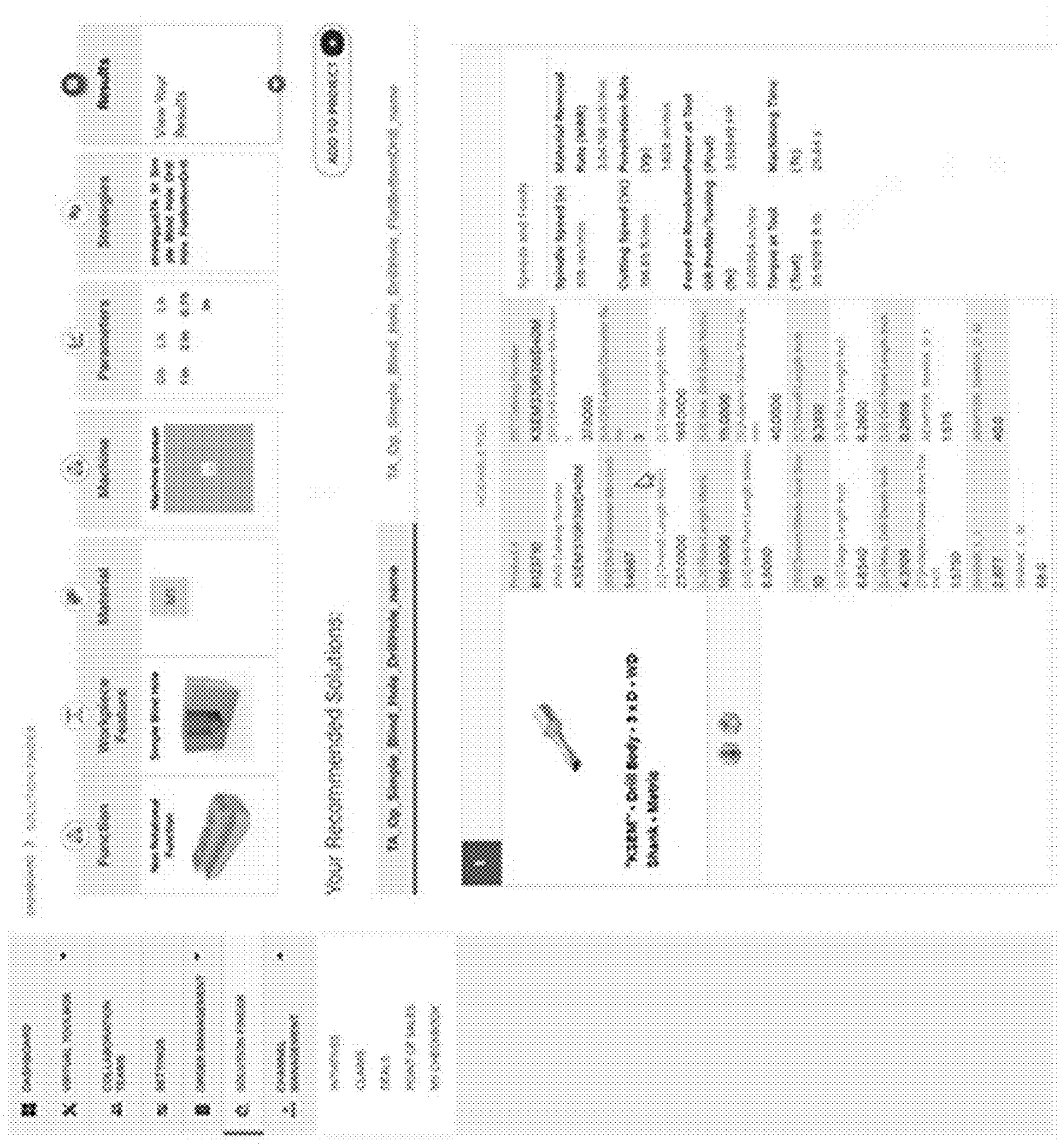
Figure 37B:
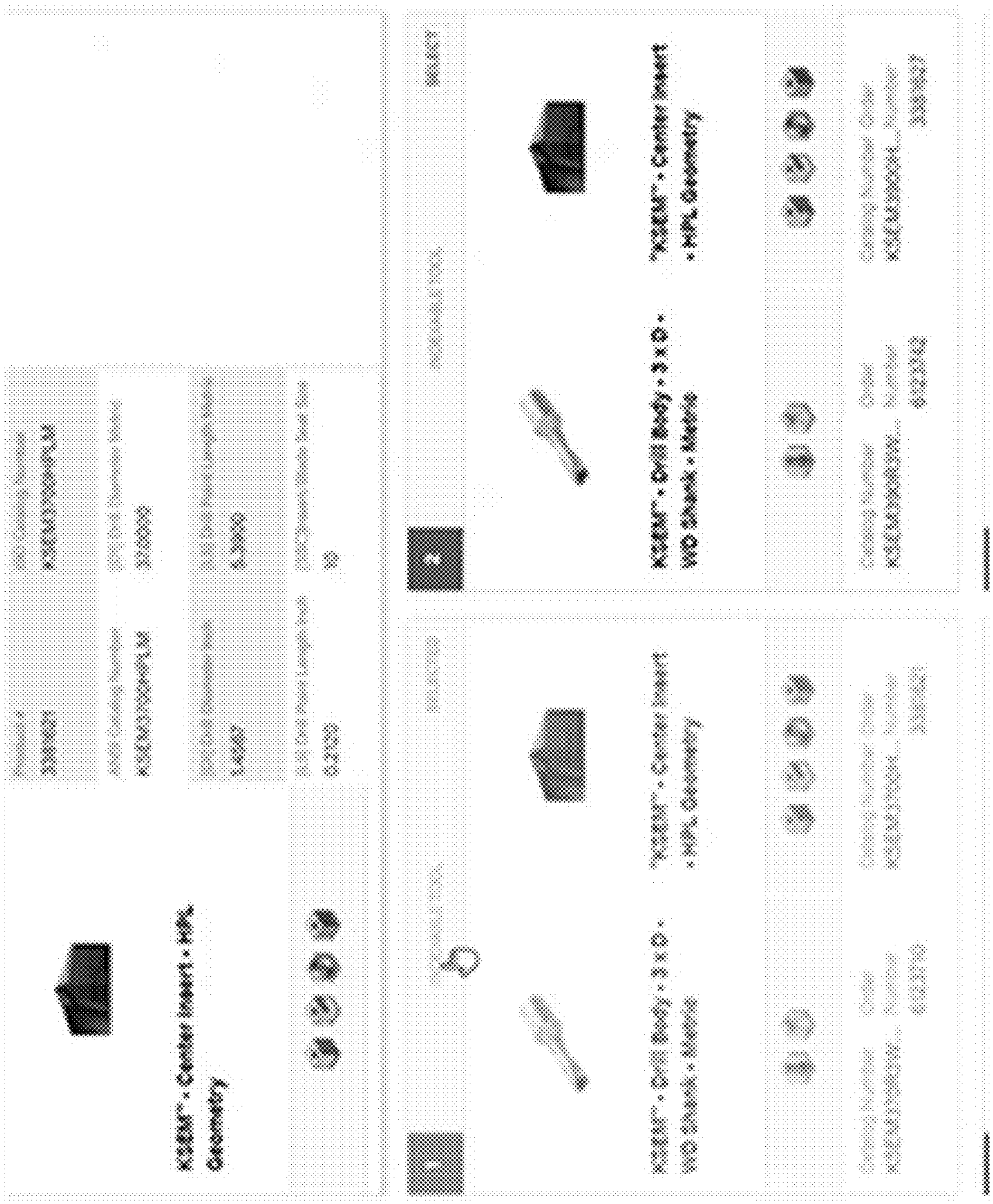
Figure 37C:
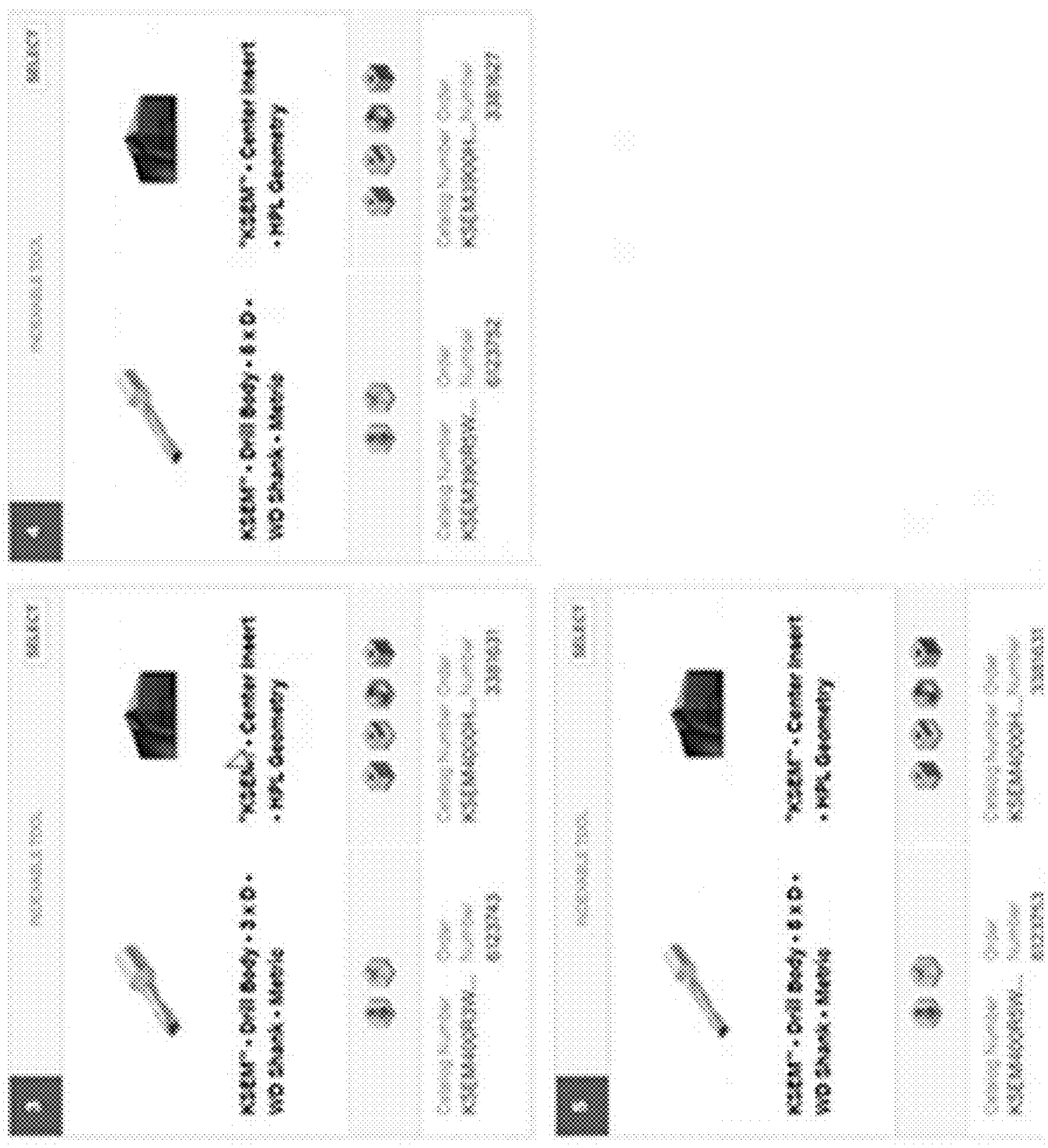
Figure 38:
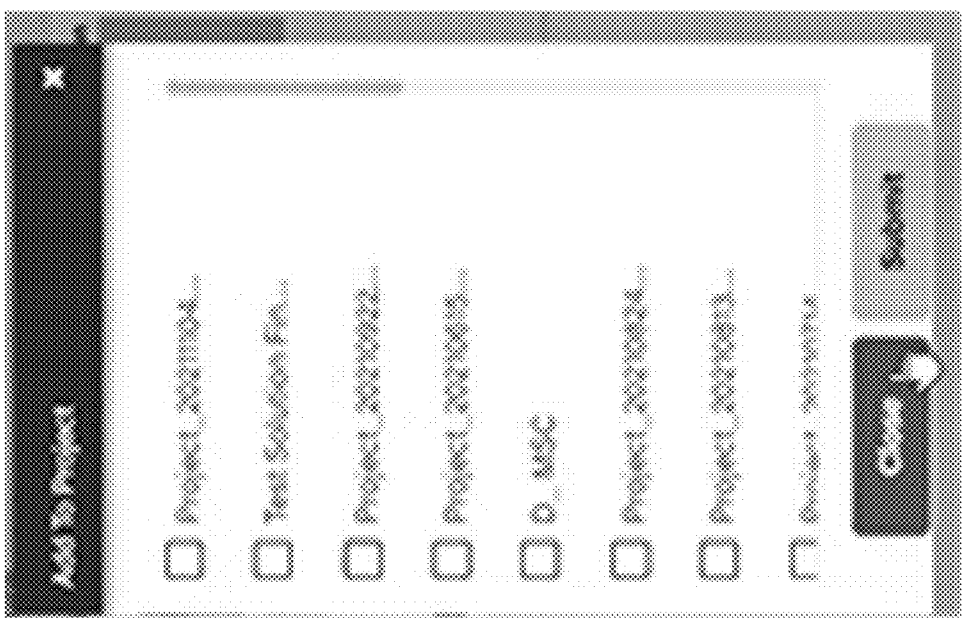
Figure 39:
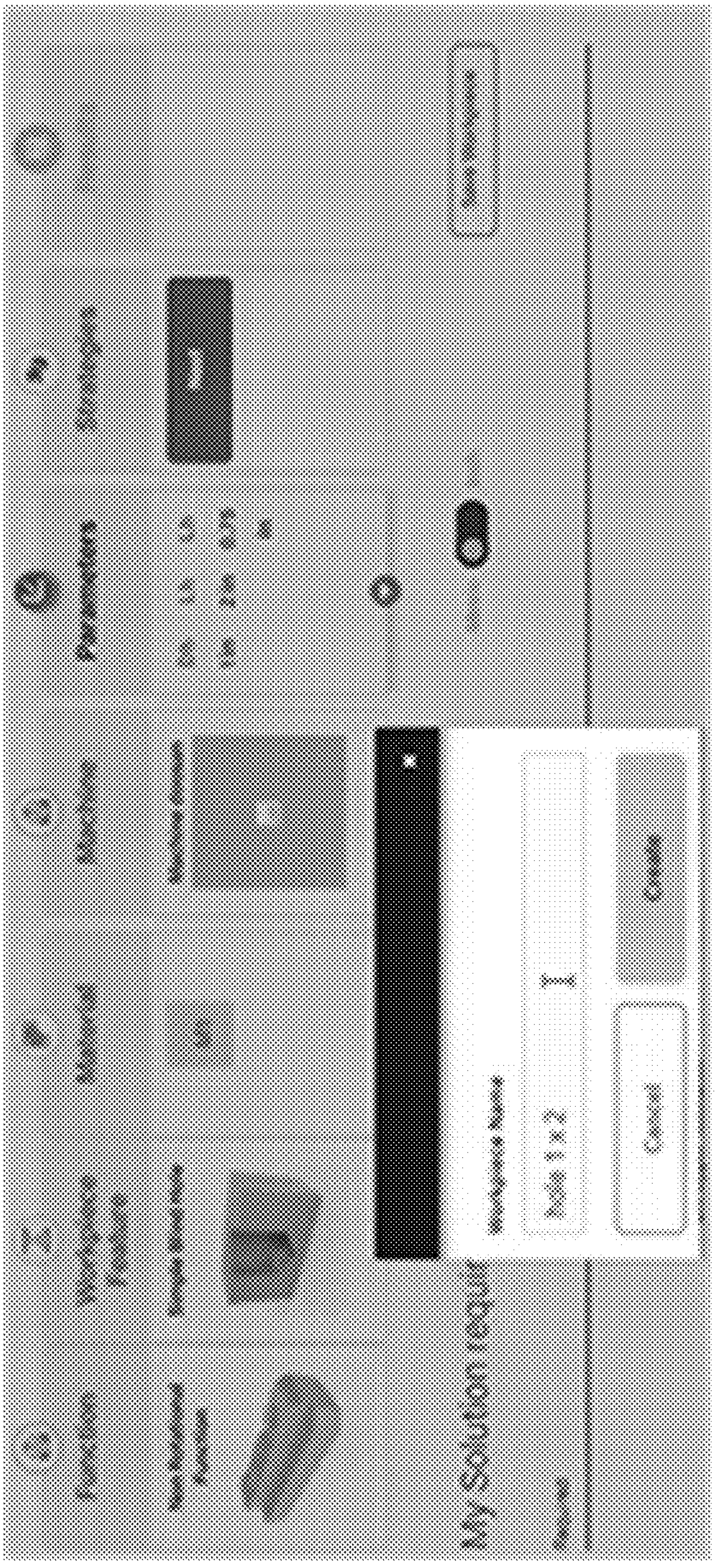

FIG. 29 includes a screen display illustrating examples of accessing various aspects or features of channel partner relationships which can be enabled or facilitated through the industrial tool solution platform 102. Channel management can be facilitated wherein partners provide information about customers to the platform 102 or use information derived from the platform 102. For example, a distributor having a relationship with the operator of the platform 102 can upload point of sales data to the platform 102. In another example, another channel partner might use data obtained from the platform 102 to develop a marketing campaign for products sold through the platform 102.

FIGS. 30 through 39 include various screen displays illustrating examples of different aspects of a solutions finder feature which can be accessed in connection with the industrial tool solution platform 102. In various embodiments, the rules engine 120 can be accessed and executed to determine appropriate machining strategies, for example, for making a desired part or component. In this example, the user desires to make a hole in a part, and the solution finder can be used to select a hole, made with a specific material (e.g., stainless steel), made on a given machine (e.g., Doosan machine). Then, parameters for the hole can be specified, such as a hole that is one inch in diameter and two inches deep, as well as other details about the hole, such as other dimensions and tolerances. Then the rules engine 102 can be executed to generate and display different strategies which can be selected by the user, and the engine 102 can provide results including solutions based on the selected strategy. In one aspect, one or more of these generated solutions can be added to a specific project, for example. In another aspect, a workpiece feature can be saved and stored in the virtual toolbox, for example.

Figure 40:
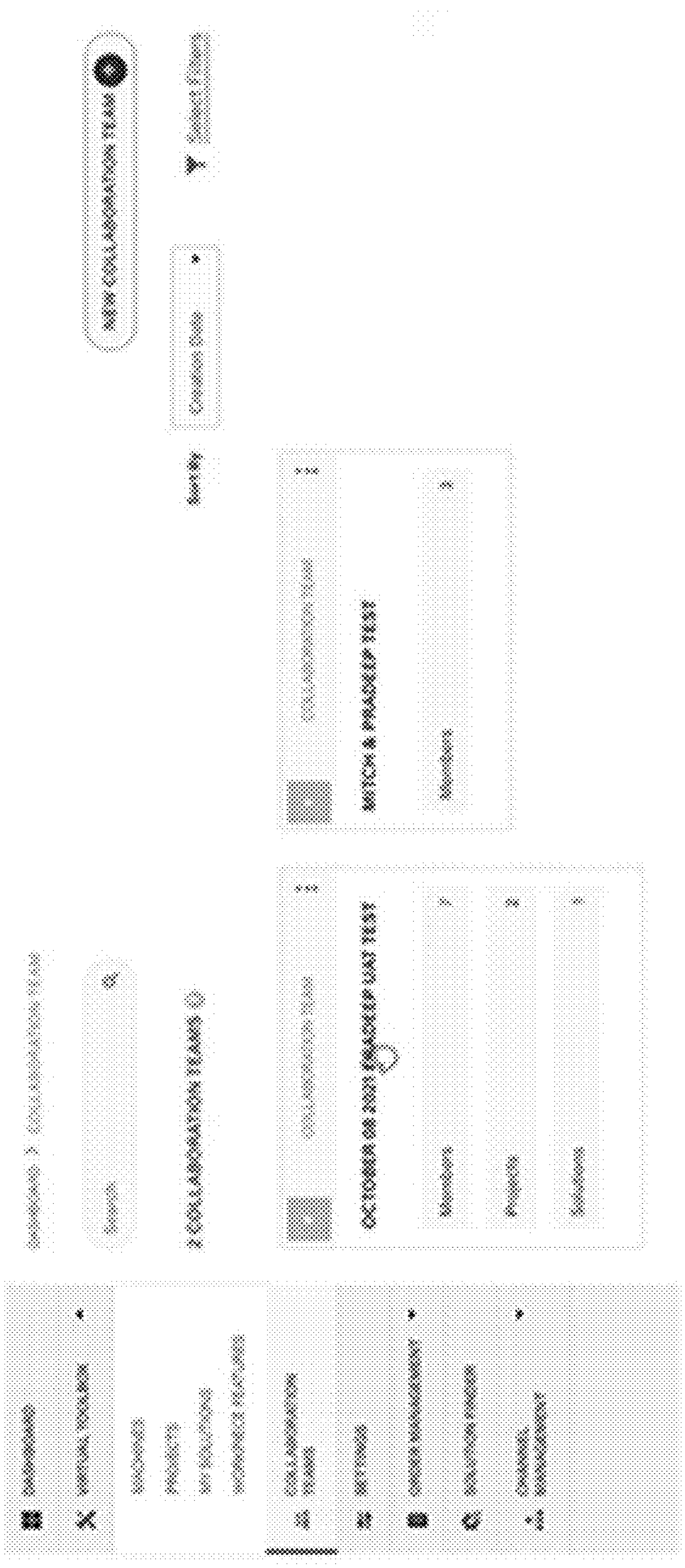
FIGS. 40 through 41E illustrate various screen displays showing examples of different aspects of a collaboration team feature which can be accessed in connection with an industrial tool solution platform.
Figure 41A:
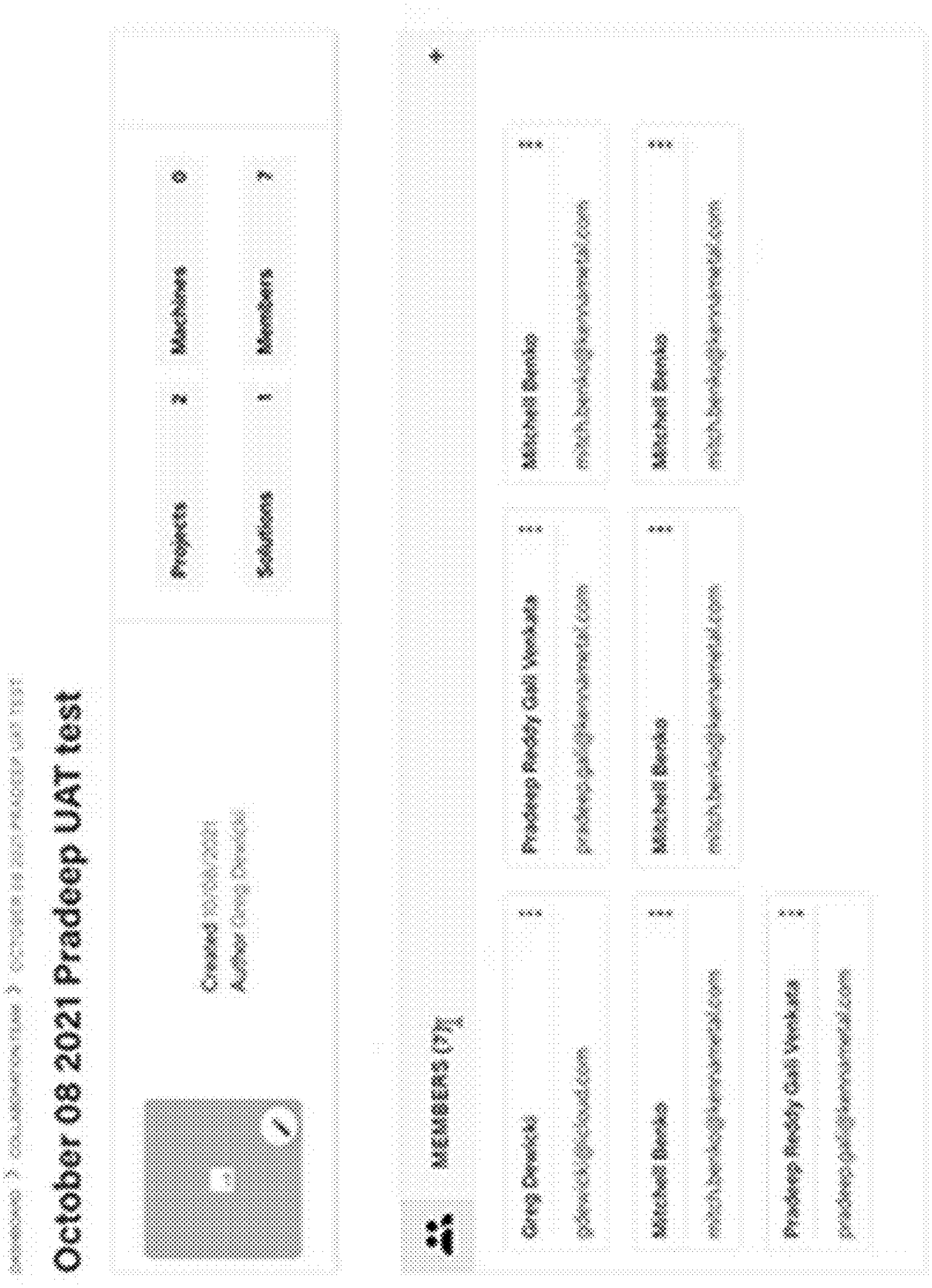
Figure 41B:
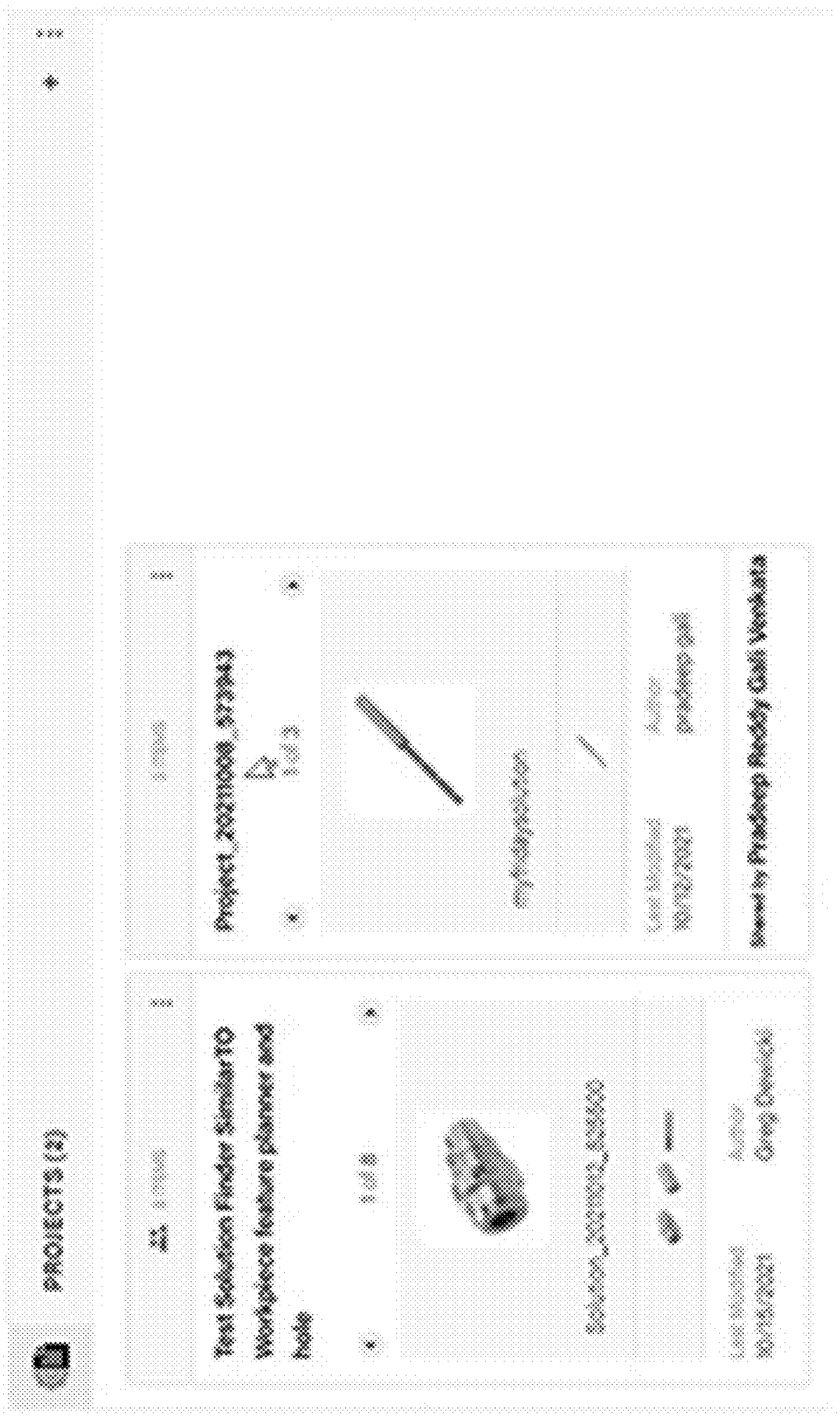
Figure 41C:
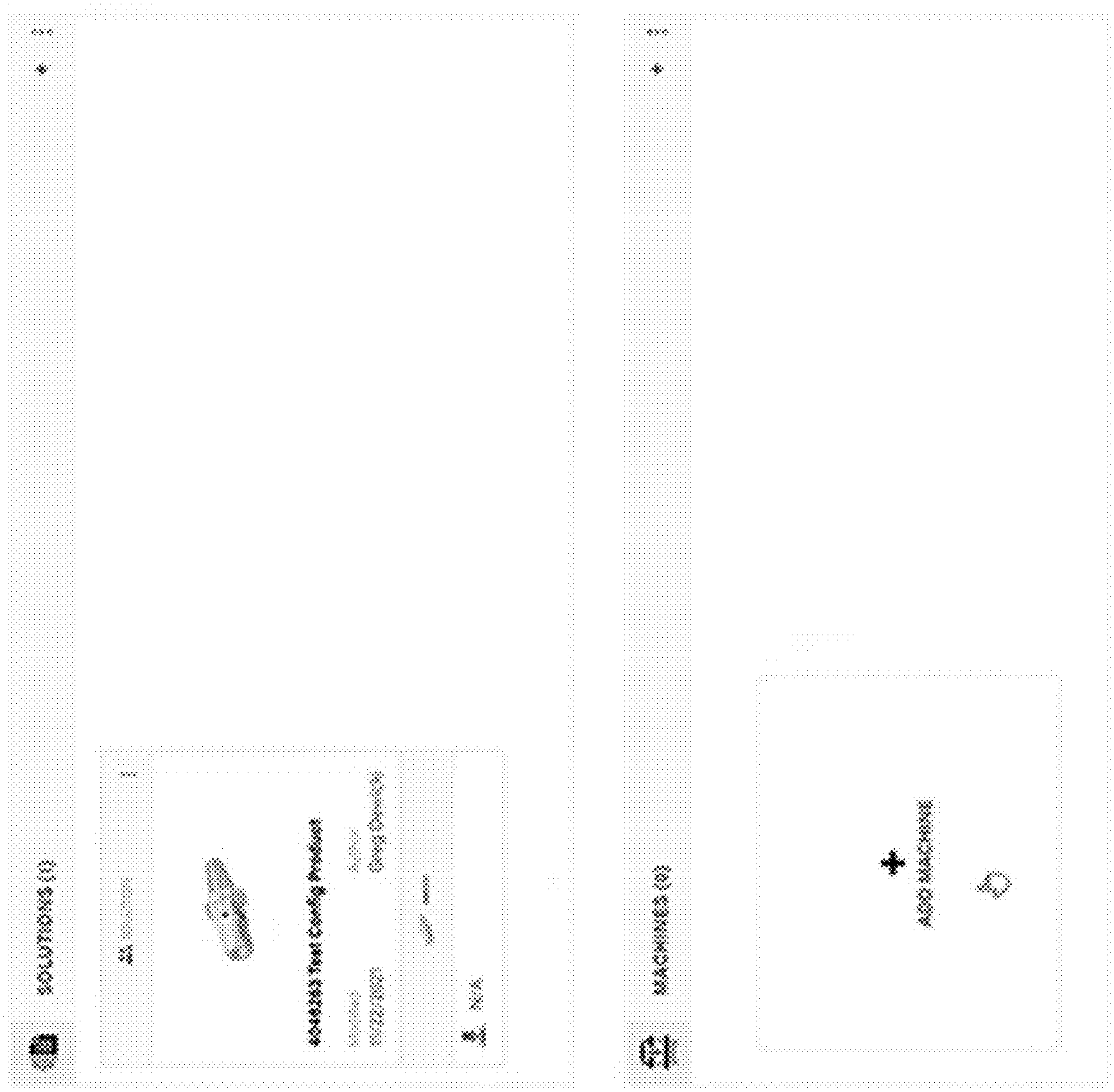
Figure 41E:
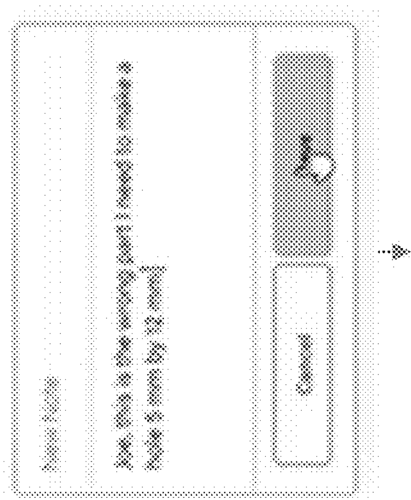
Figure 41D:
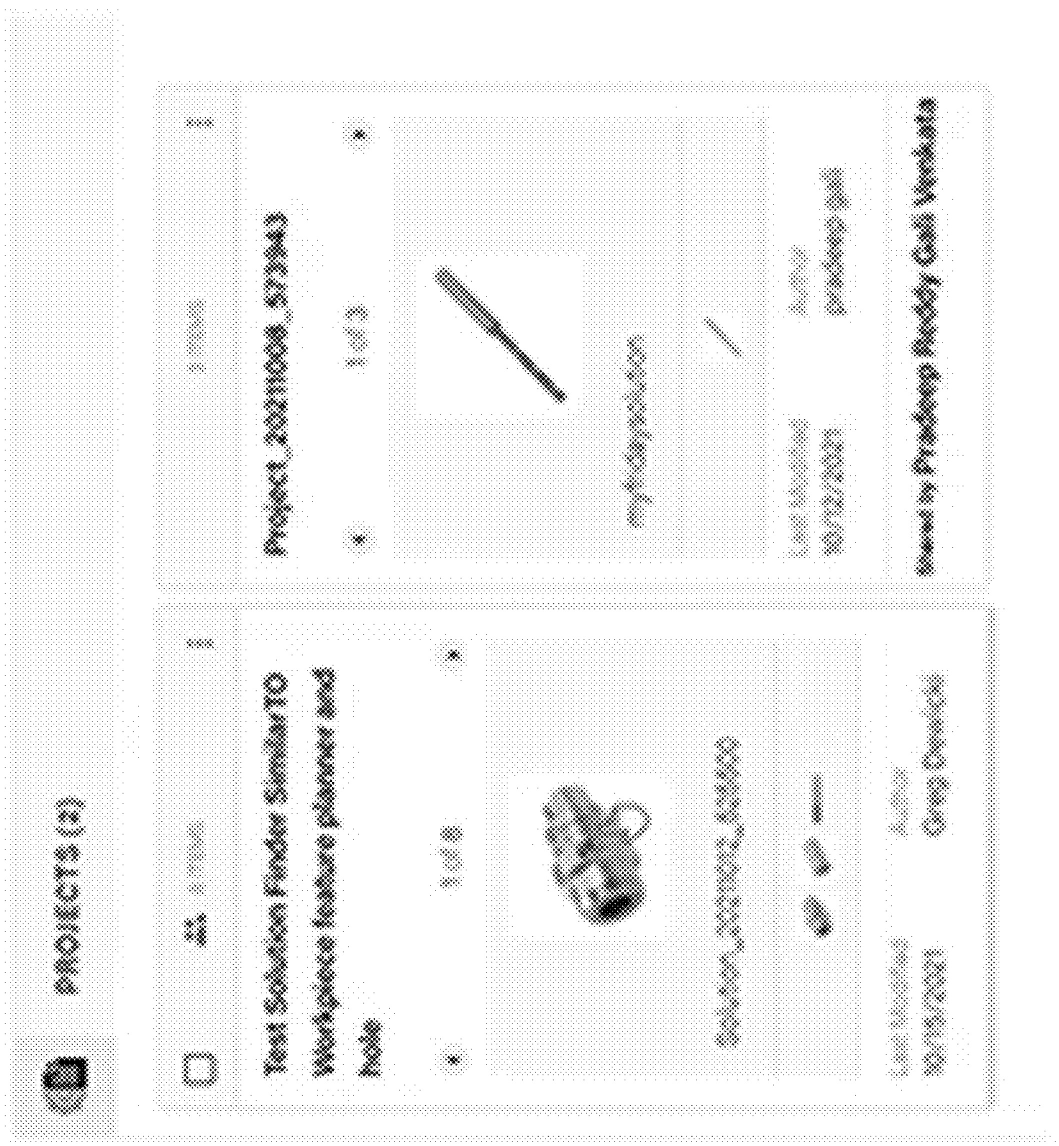

FIGS. 40 through 41E illustrate various screen displays showing examples of different aspects of a collaboration team feature which can be accessed in connection with the industrial tool solution platform 102. In various embodiments, the collaboration team can be used to invite customers, distributors, project engineers, application engineers, machine operators, builders, and many other team members into a defined team to work together on a product solution. After a team has been created and established, solutions, machines, workpiece features, and other aspects of collaborative work can be associated with the team. For example, notes can be added by an engineer to communicate part or component selections to other team members, such as sourcing personnel. In many aspects, the collaboration team feature creates a digital twin for customer and technical interactions among manufacturers, distributors, and customers or users of industrial tool solutions. An interface facilitates collecting technical data and transactional data together, and then building a digital twin of the customer factory and tools, for example, which provides the foundation for creating projects. The projects allow for more extensive collaboration on multiple machines, multiple solutions, and multiple interactions with multiple people.

Figure 42:
FIG. 42 is a screen display showing examples of features for adding widgets for items which are relevant to a particular user or customer, type of project, type of solution, or other factors.
Figure 43:
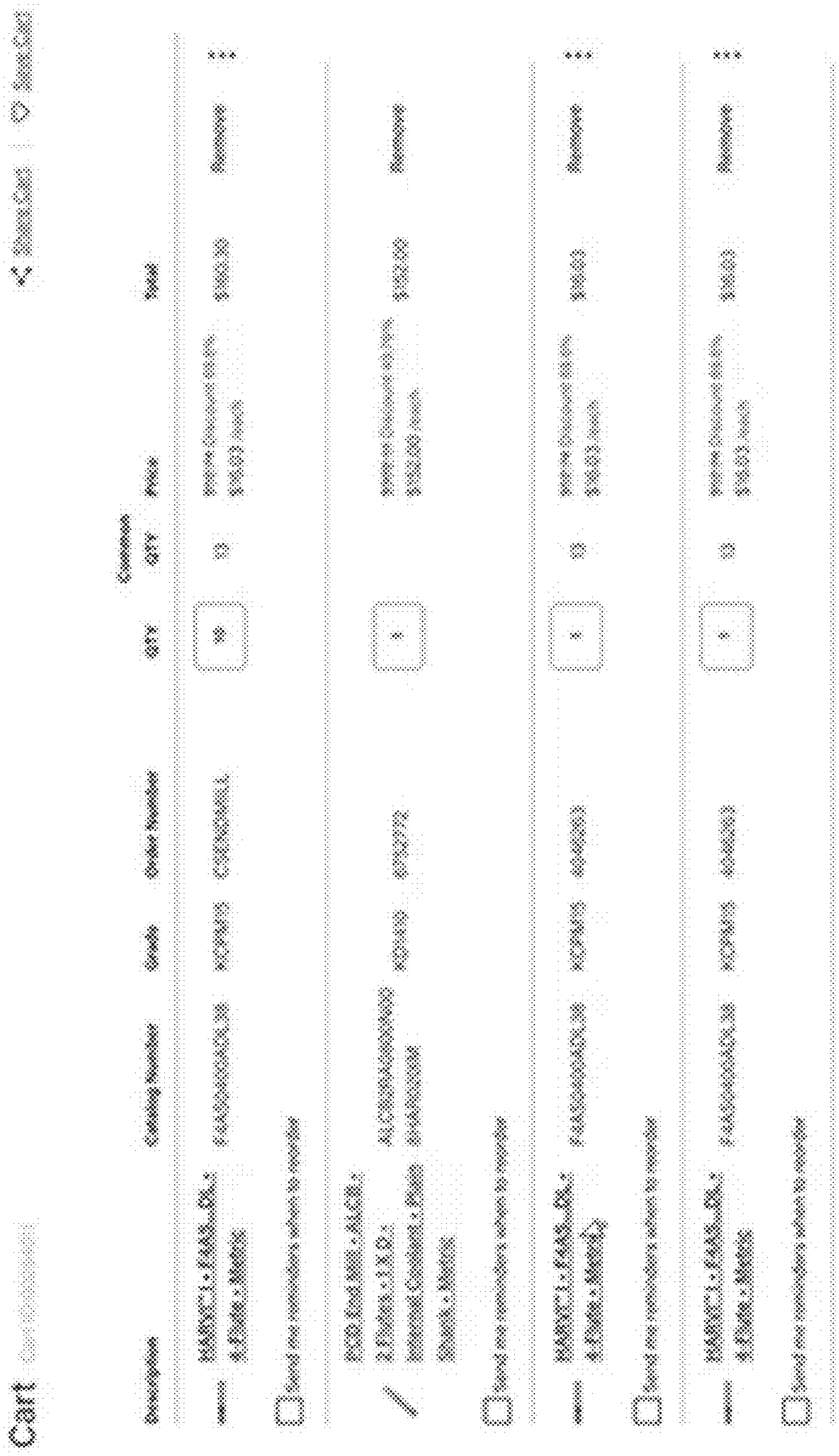
FIG. 43 is a screen display showing an example of a cart which can be generated in connection with developing and selecting different aspects of an industrial tool solution.

FIG. 42 is a screen display showing examples of features for adding widgets for items which are relevant to a particular user or customer, type of project, type of solution, or other factors. Views and performance can be customized based on the user's role, such as purchasing agent, machinist, or design engineer, among others. For example, solutions stored in the virtual toolbox can be shared with a purchasing agent who then has a history of orders and can purchase products as needed. FIG. 43 is a screen display showing an example of a cart which can be generated in connection with developing and selecting different aspects of an industrial tool solution.

Figure 44:
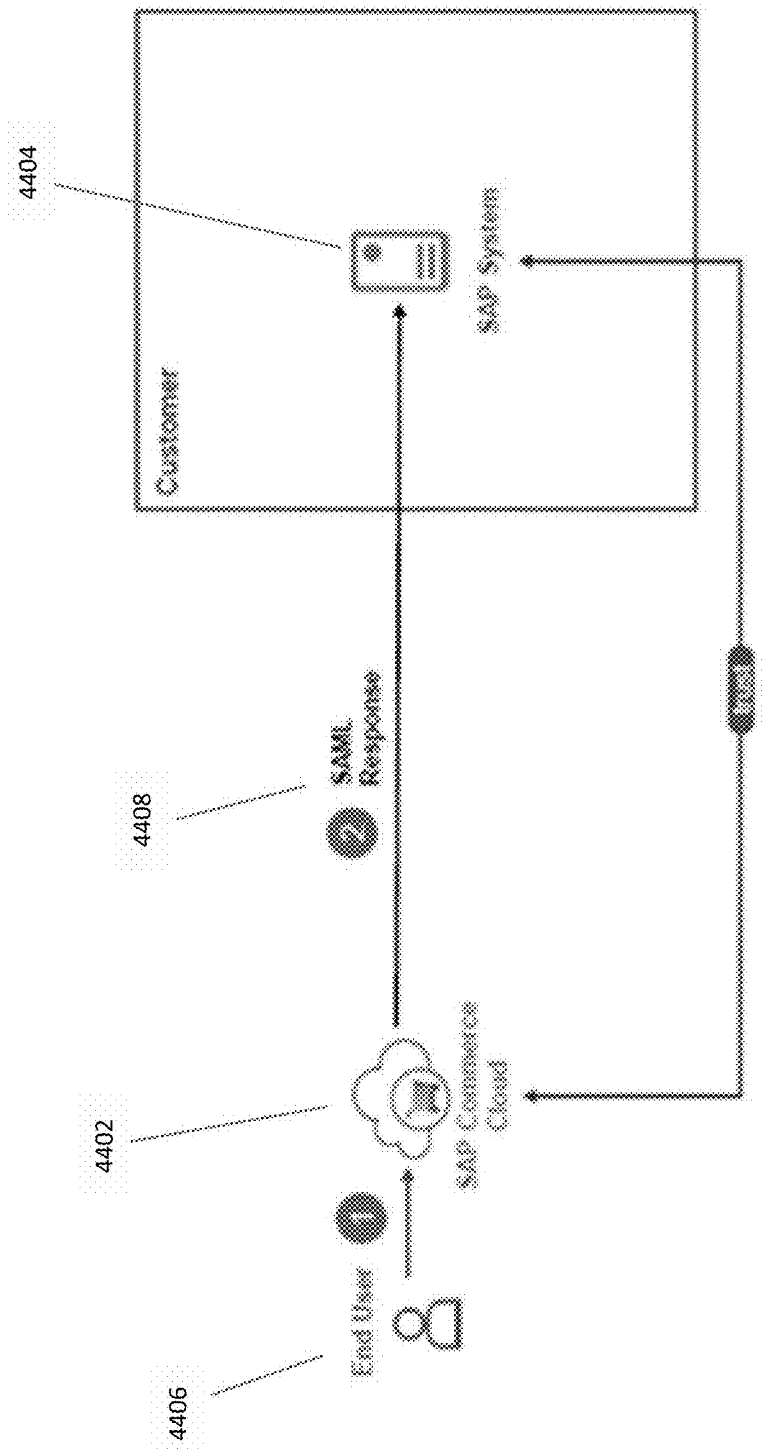
FIG. 44 illustrates an example of a combined process flow and computer architecture diagram showing an example of enabling principal propagation between an SAP Commerce computer system and SAP back end computer systems in accordance with various industrial tool solution platform embodiments.

With regard to the combined process flow and computer architecture diagram of FIG. 44, an example is provided of enabling principal propagation between an SAP Commerce computer system 4402 and SAP back end computer systems 4404 in accordance with the platform 102 embodiments described herein. In various embodiments, the system can use customer data cloud (CDC) Security Assertion Markup Language (SAML) identity provider (IDP) for principal propagation. SAML is an open standard for exchanging authentication and authorization data between parties, in particular, between an identity provider and a service provider. SAML can be an XML-based markup language for security assertions (statements that service providers use to make access-control decisions).

A SAML identity provider is a system entity that issues authentication assertions in conjunction with a single sign-on (SSO) profile of the SAML. In the SAML domain model, a SAML authority is a system entity that issues SAML assertions. Two examples of SAML authorities are the authentication authority and the attribute authority. A SAML authentication authority is a system entity that produces SAML authentication assertions. Likewise, a SAML attribute authority is a system entity that produces SAML attribute assertions. A SAML authentication authority that participates in one or more SSO Profiles of SAML is called a SAML identity provider. For example, an authentication authority that participates in SAML Web Browser SSO is an identity provider that can perform the following tasks: receives a SAML authentication request from a relying party via a web browser, authenticates the browser user principal, and responds to the relying party with a SAML authentication assertion for the principal. The relying party that receives and accepts the authentication assertion may be referred to as a SAML service provider (SP). In addition to an authentication assertion, a SAML identity provider may also include an attribute assertion in the response. In this case, the identity provider can function both as an authentication authority and an attribute authority.

The inventors have acknowledged the problems associated with back end SAP application programming interfaces (APIs) which are designed to enforce permission to data based on the access level of user 4406 identification (user ID) in the APIs. The SAP Commerce system 4402 makes use of a super access user ID, which is sent as part of communicated requests 4408. For workflow reasons, embodiments of the present invention improve this super user issue and provide access based on a specific security access level of the user 4406. Principal propagation can be conducted between and among the SAP Commerce system 4402, the CDC, the active directory (AD) of the platform 102 owner, and the SAP backend system 4404.

In various embodiments, this process may initially involve integrating the CDC with the AD of the platform owner. The AD may be provided as a database and set of services that connects users 4406 with the network resources they need. The database (or directory) contains critical information about the computing environment, including what computers are accessible on the system and the permissions assigned to different users 4406. The process may further involve creating SAML SP settings in the CDC for error correction code (ECC) and customer relationship management (CRM) endpoints. Error correction code (ECC) memory is a type of RAM memory which can be found in workstations and servers which has the ability to automatically detect and correct memory errors, for example, thus fighting data corruption. Customer relationship management (CRM) is a technology designed for managing a company's relationships and interactions with its customers. Next, the process can create a SAML assertion response 4408 in a compatibility layer or interface that allows binaries for a legacy or foreign system to run on a host system, and which translates system calls for the foreign system into native system calls for the host system (e.g., Hybris) for the ECC/CRM endpoints. The SAML response 4408 created for the logged-in user 4406 can be communicated as a SAML authorization with regard to ECC and CRM API calls, for example.

In order to effect principal propagation between the SAP commerce system 4402 and the SAP back end system 4404, proper SAML authentication details can be communicated in the authorization request for the back end system 4404 APIs communicated from the commerce system 4402 to the SAP back end system 4404. For the situation in which SAP CDC is the authorization server for the e-commerce application, integration between the CDC and AD can be made. Once authenticated, the SAP commerce system 4402 requires the SAML assertion response 4408 to be communicated as the authorization header in the ECC and the CRM APIs.

Figure 46:
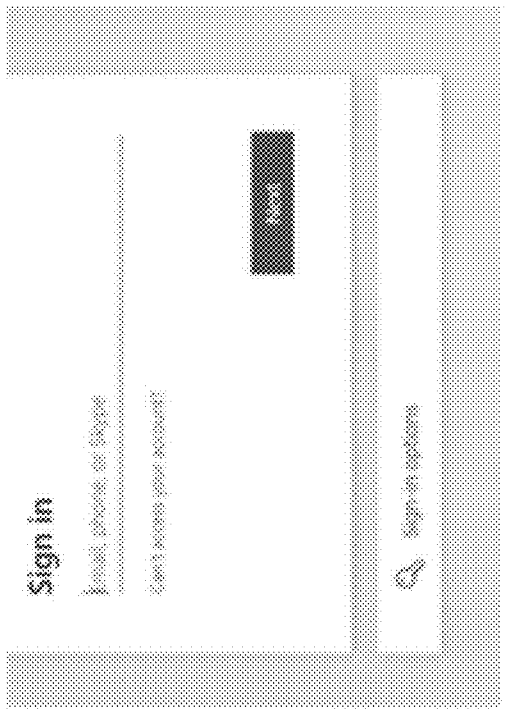
FIGS. 45 and 46 include examples of user interface screens which can be used to perform an active directory authentication workflow in connection with certain industrial tool solution platform embodiments.
Figure 45:
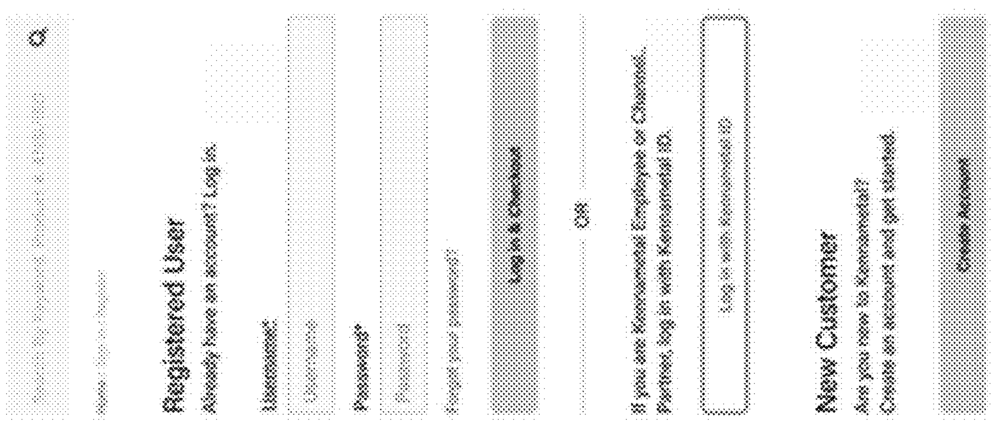

With reference to the examples of login screens shown in FIGS. 45 and 46, internal company users, guest/B2C users, or external B2B users may be permitted to access the platform 102 in a secure and authenticated manner. External partner users can be permitted to use their platform 102 AD accounts to login into and perform activities on the platform 102, such as accessing functionality for deals, initiatives, claims, and other relevant aspects of the platform 102 After a user logs in, the user may be permitted to select only customers for whom they have permission to access, while other "SoldTo" accounts are made inaccessible or hidden from the user. User access can be controlled by roles assigned to users within a corresponding module of the platform 102. As shown in FIG. 45, the AD authentication workflow can be initiated by the user clicking a button to access a screen display for receiving a username and password (Microsoft). The user can then enter an AD user ID and a corresponding password for the account. The user's credentials can then be validated against the Active Directory, and a session is built for the user.

In the situation when the session is built for the user, there may be two types of accounts and the way each session is built may differ. If the user is external to the company which owns or controls the platform 102, the user is identified as an external partner, and the corresponding user account in the platform 102 is accessed and a session built accordingly. After login, the external user can be directed to a WIDIA home page, for example, and the platform 102 can be programmed to function like a distributor account. In one embodiment, the platform 102 may establish a dedicated section in the collaboration team space for the user. When the user is an internal user (e.g., an employee of the company which owns or controls the platform 102), a place holder can be created for the internal user and the user can be authorized to conduct transactions within the platform 102. The account place holder can be used to access a "Partner Function" for the internal user, and multiple partner functions can be assigned to the user. In certain embodiments, partner functions can be used in customer search API calls, for example. Usage of partner functions may restrict the number of customers the employee can access.

The user can be redirected to a "Customer Search" screen. After selecting the customer from the list, the platform 102 can be configured to function substantially similarly as with any other user including external users. The API calls made to SAP can be programmed to communicate the login session to SAP, so that the transaction in SAP can be executed against the logged in user ID and not a service account, for example. If the internal user chooses to navigate out of the customer page without selecting a SoldTo account, then the platform 102 may not permit any transactions by the user on the platform 102 site. For example, the "Add to Cart" function can be disabled and checkout and quoting functions can be disabled. The user may be prompted with a message stating that: "You have not selected a customer. None of the transactions will work on the site. Do you want to proceed?" along with "Continue" and "Cancel" buttons, for example.

Figure 48:
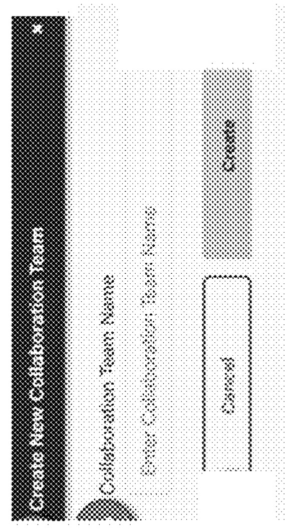
FIGS. 47 through 60 illustrate examples of screen displays and computer-implemented tools configured for accessing and implementing the collaboration teams features and functions of certain industrial tool solution platform embodiments.
Figure 47:
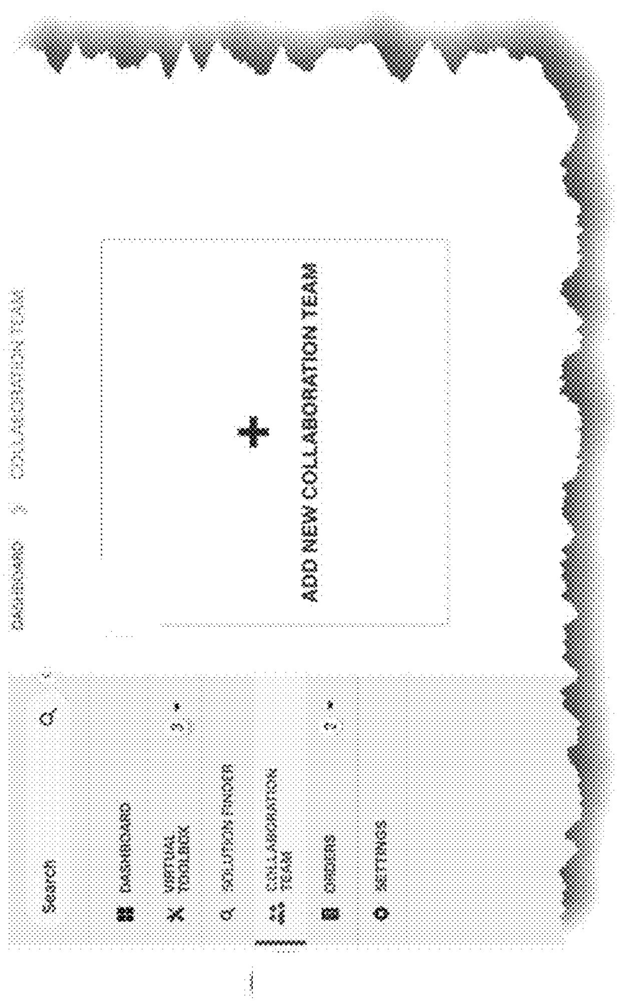
Figure 49:
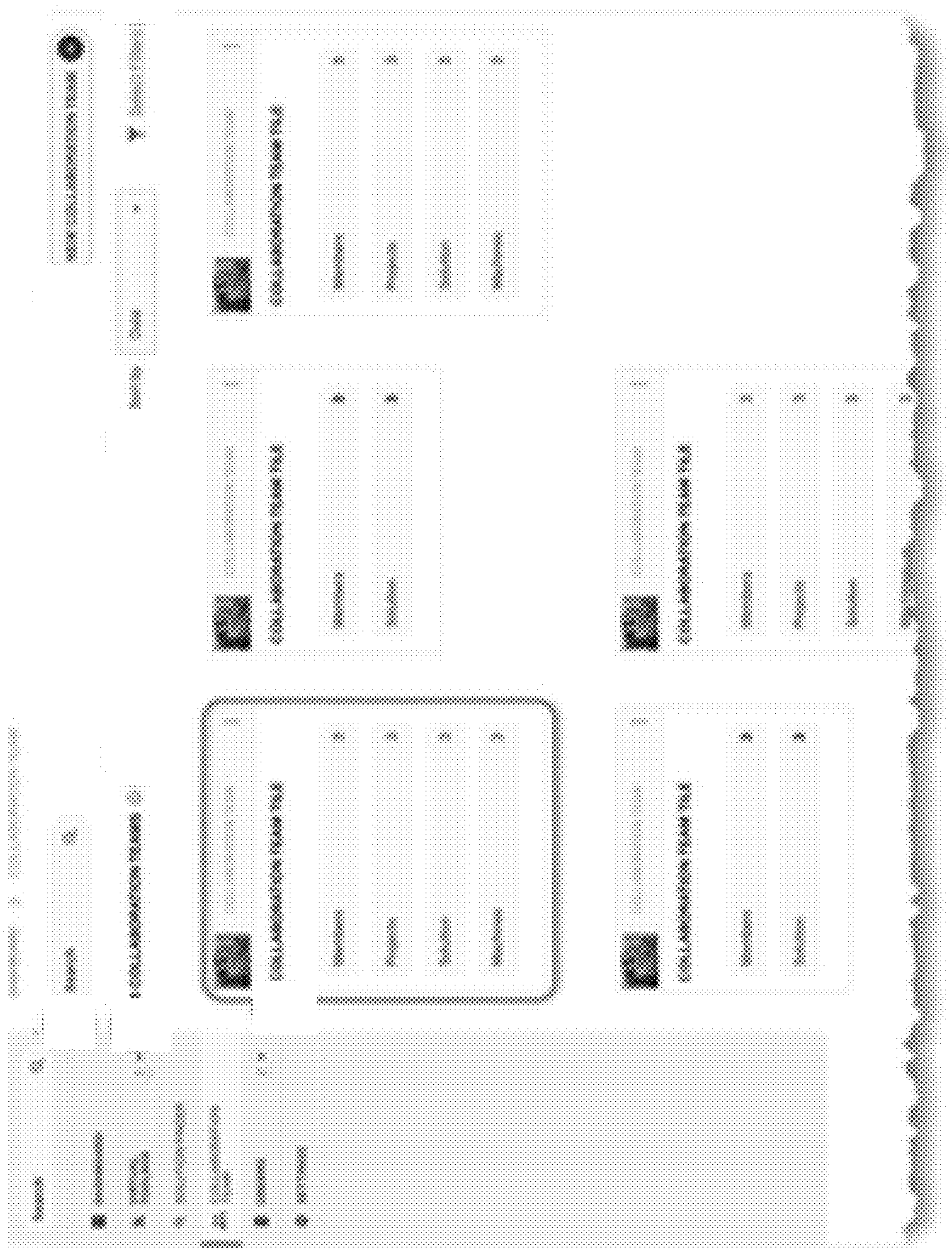
Figure 50:
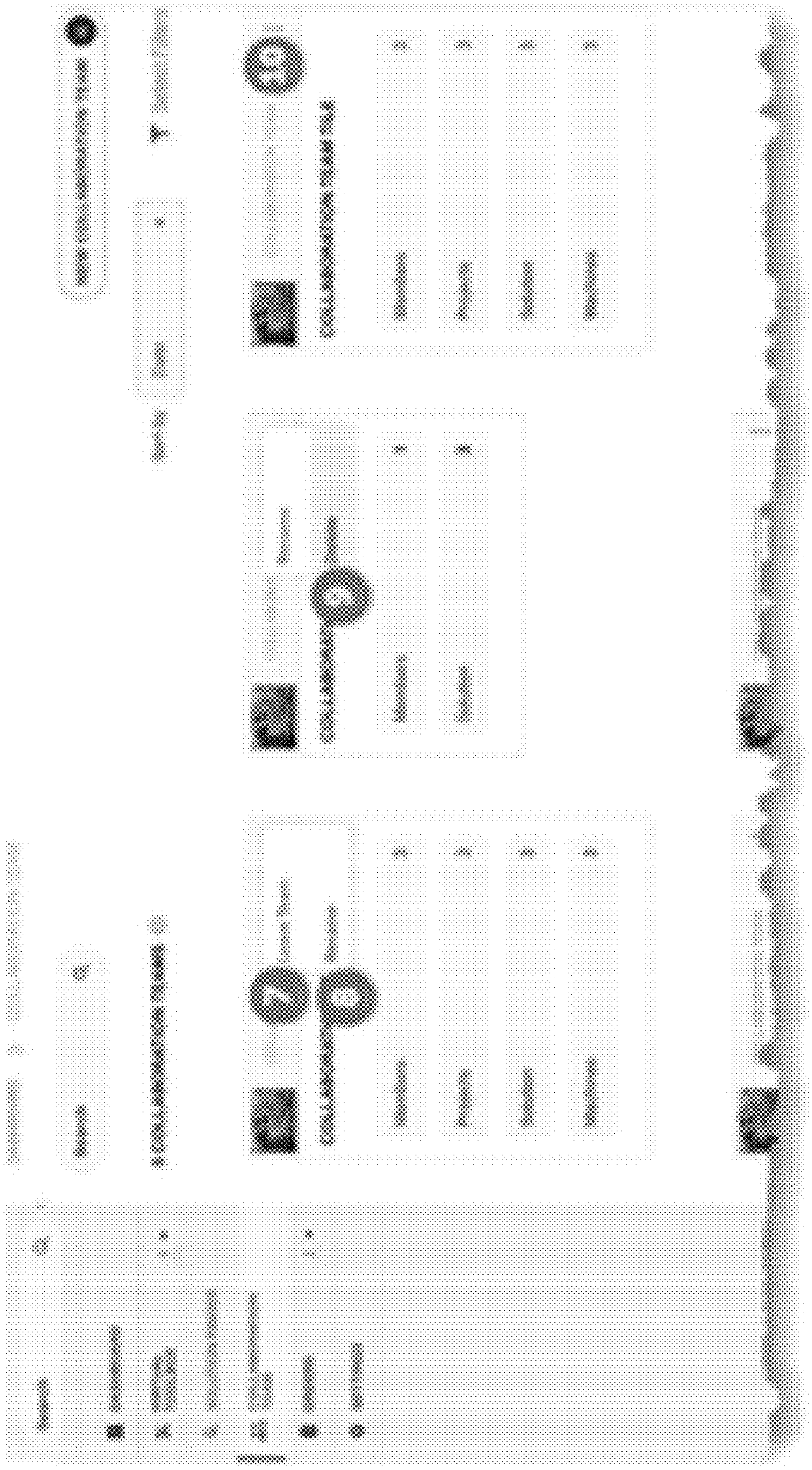
Figure 51:
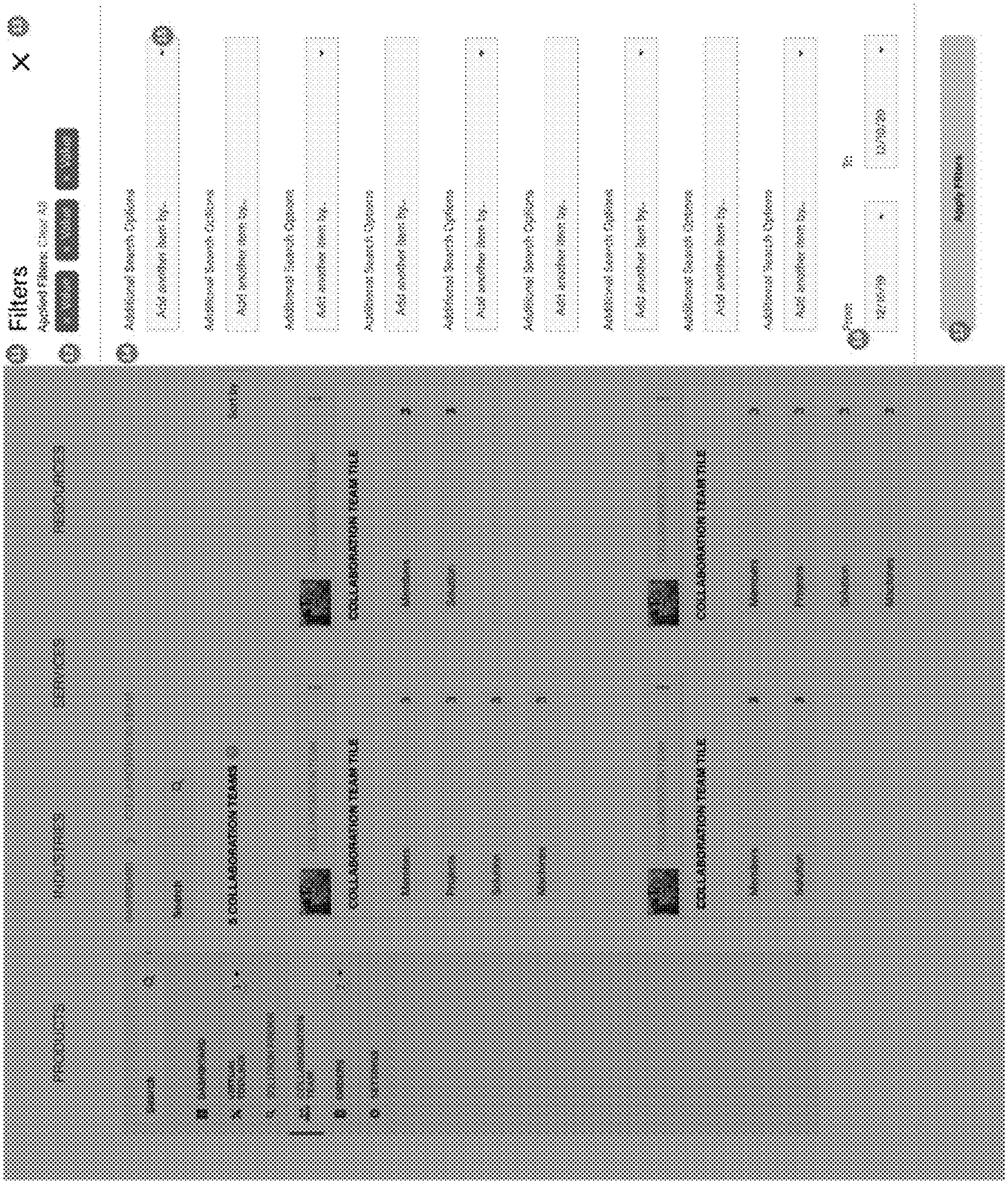
Figure 52A:
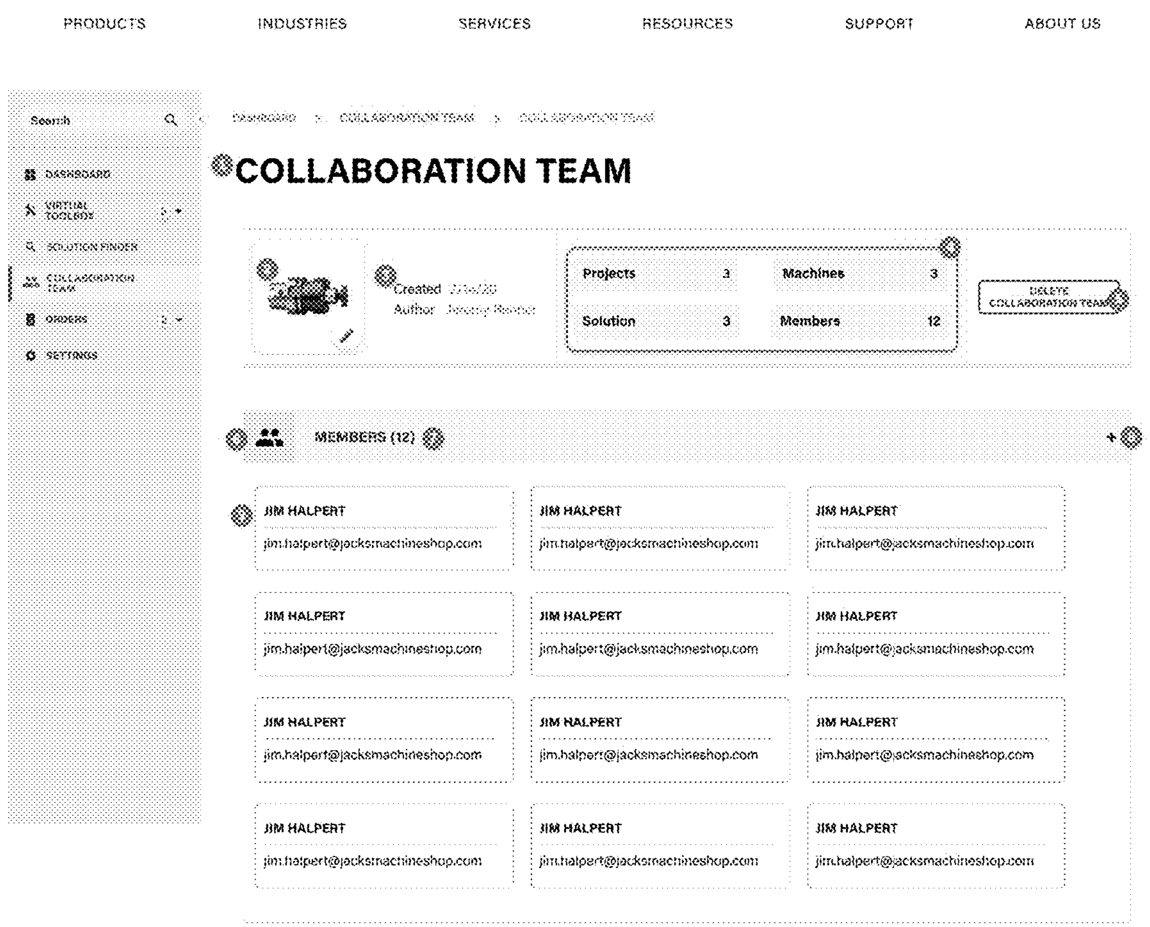
Figure 52B:
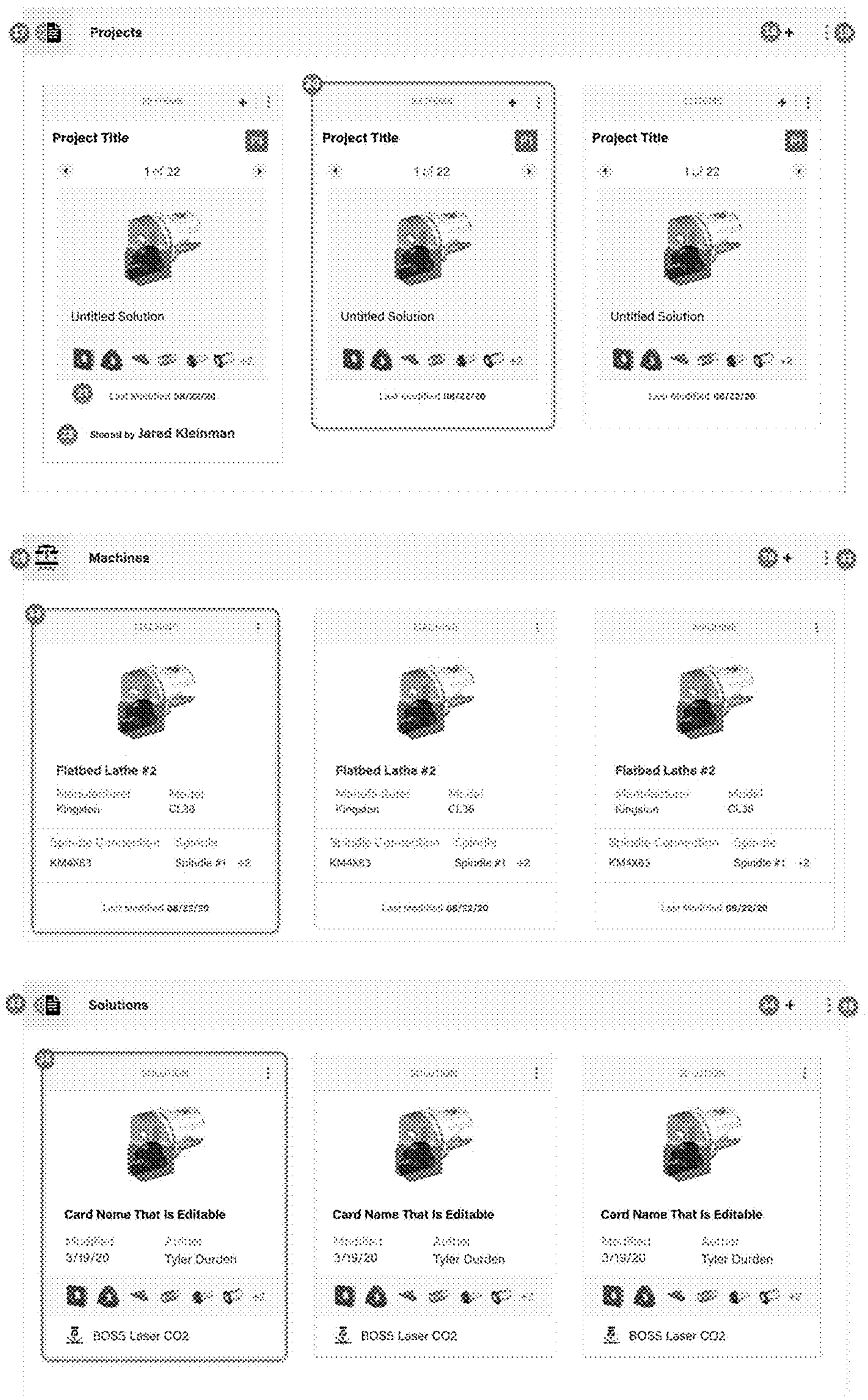
Figure 53:
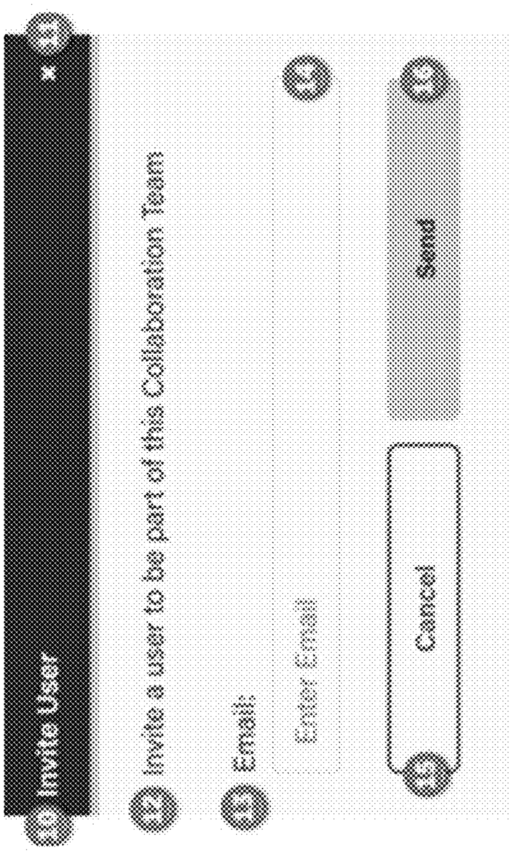
Figure 54:
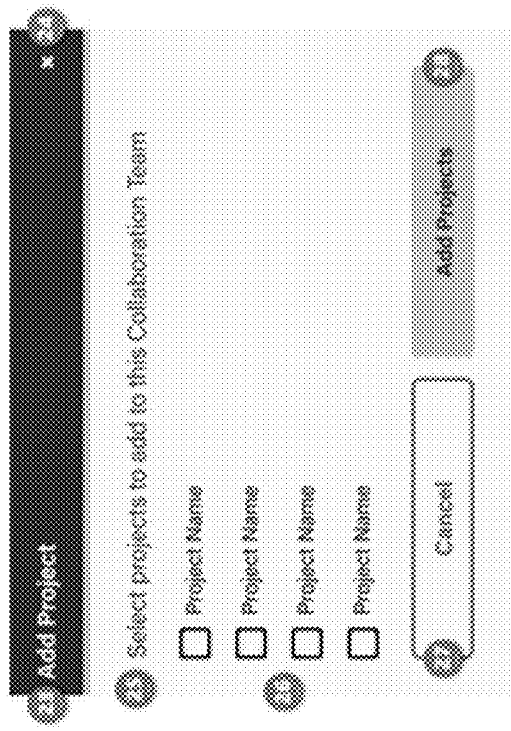
Figure 55:
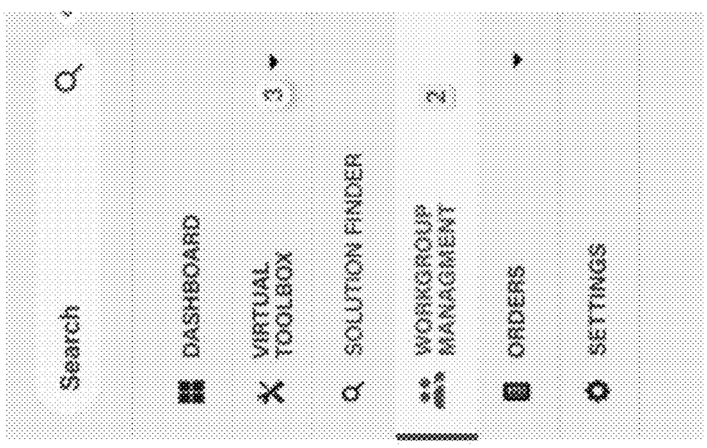
Figure 56:
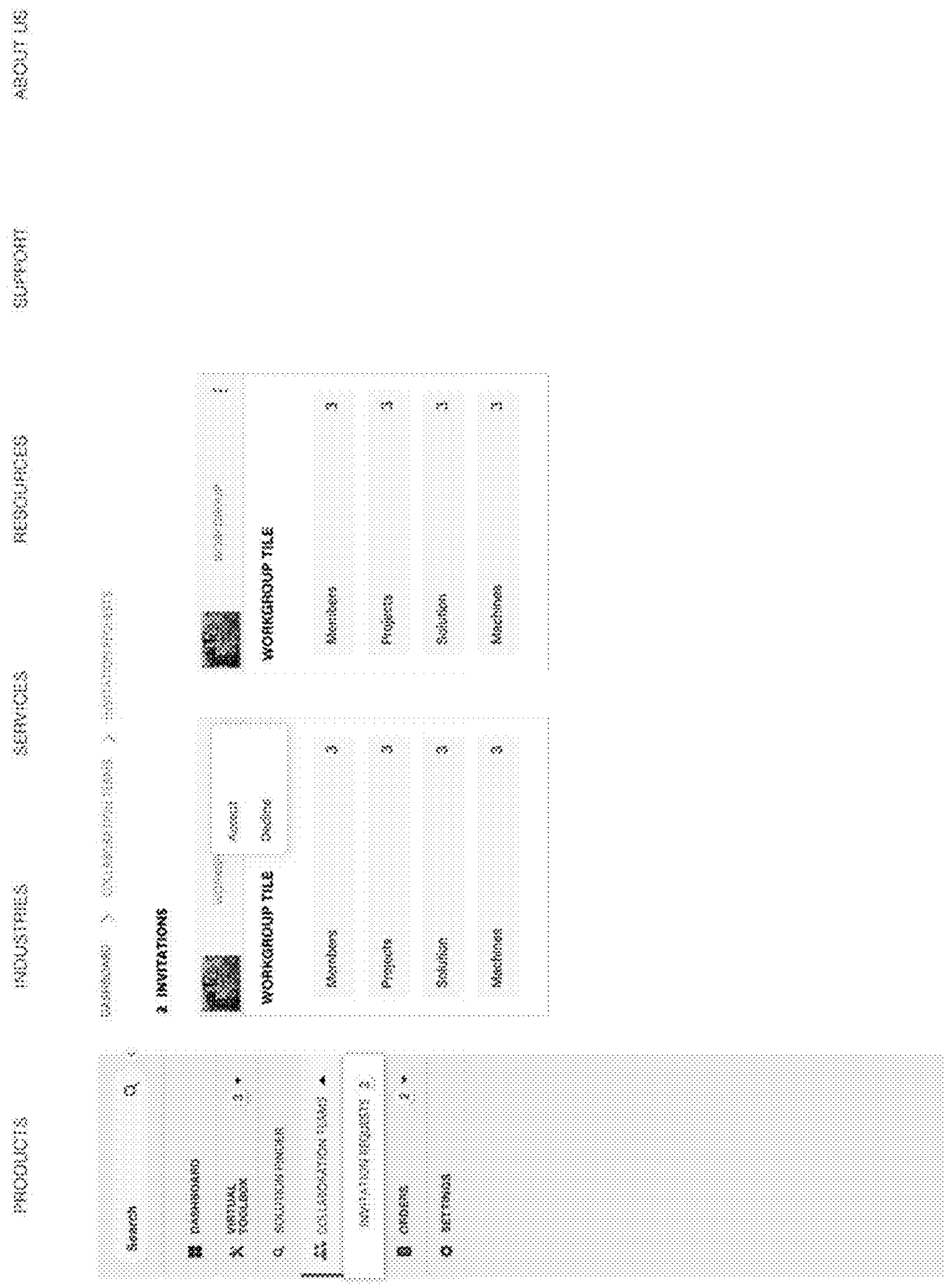
Figure 57:
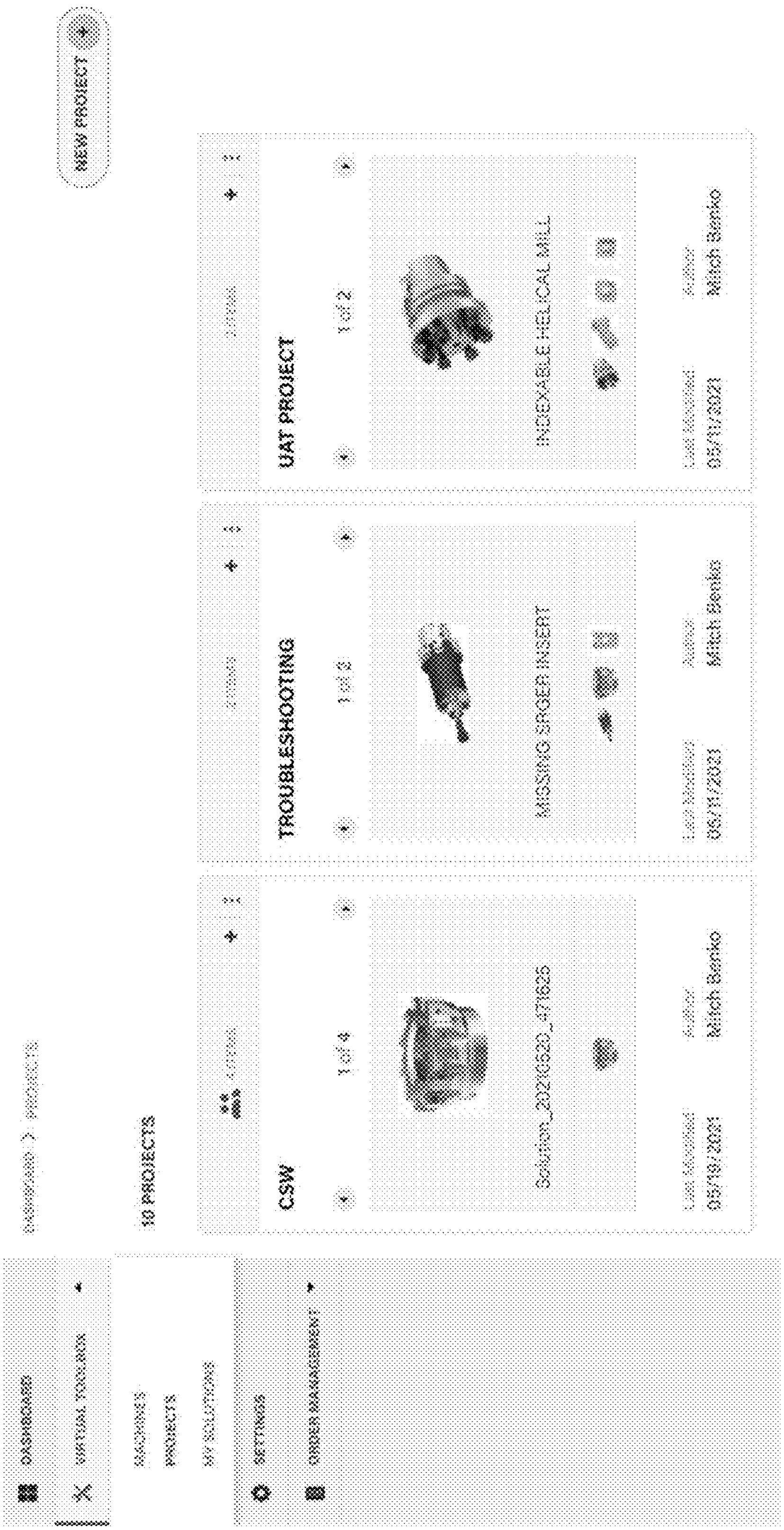
Figure 58:
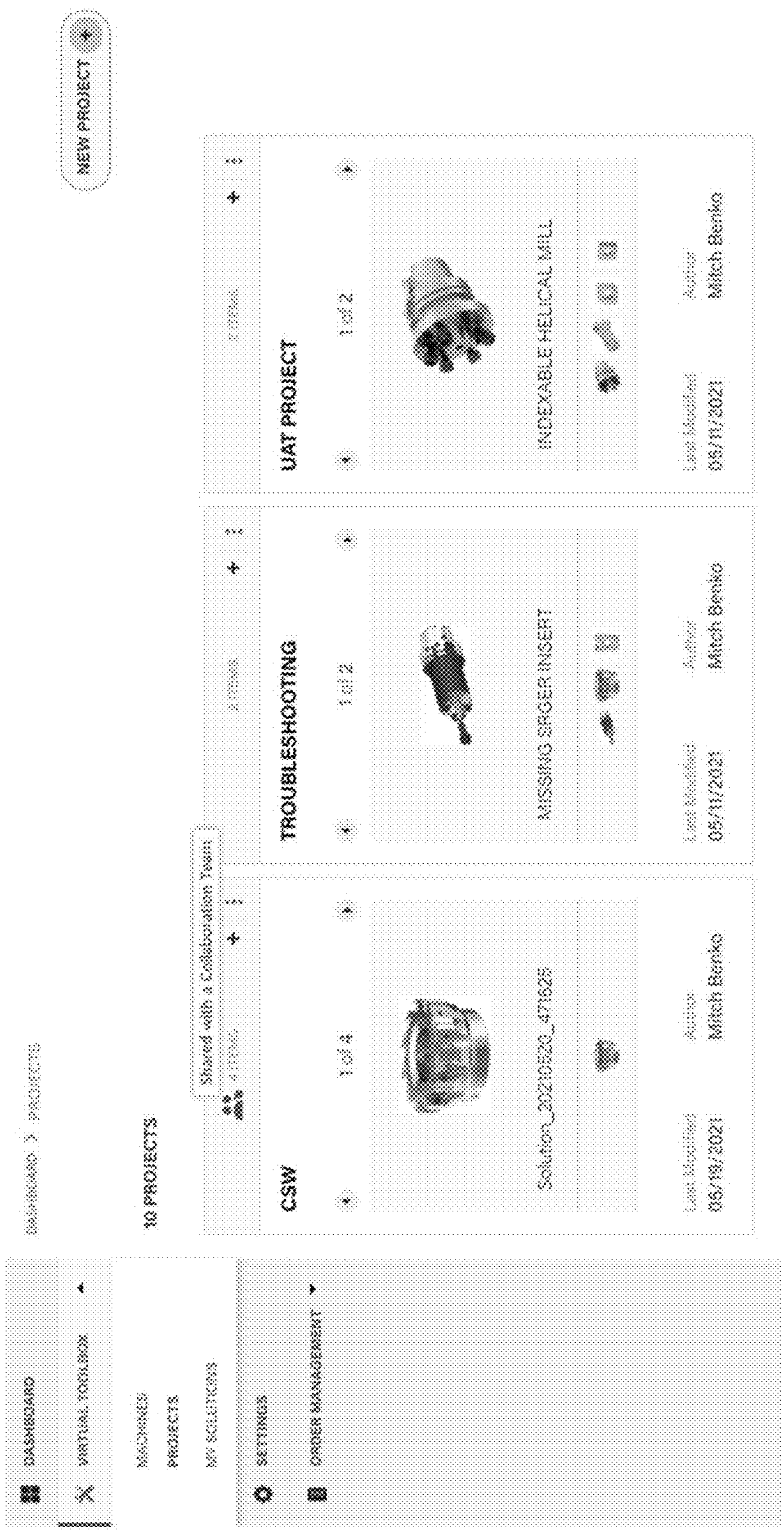
Figure 59:
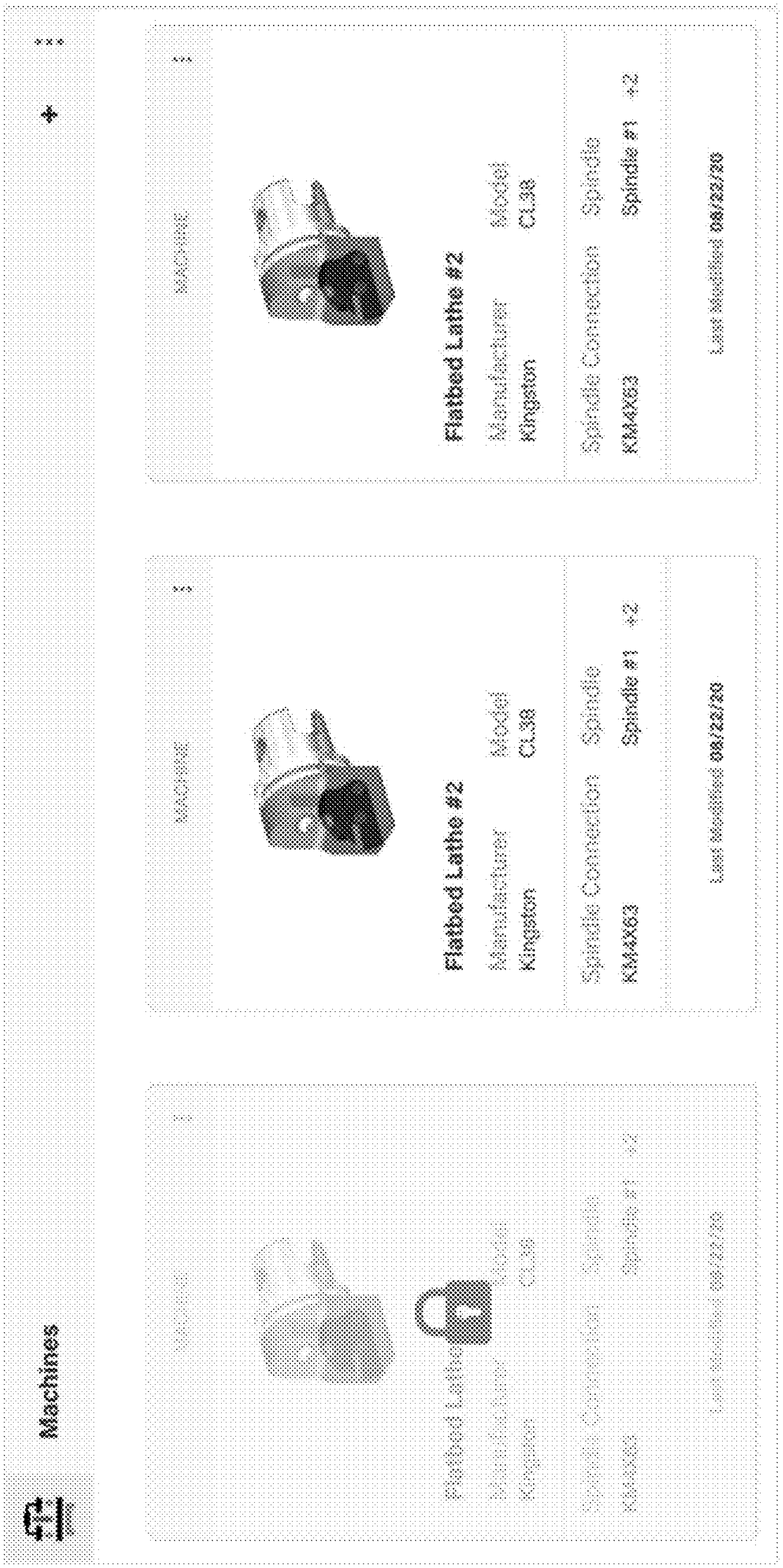
Figure 60:
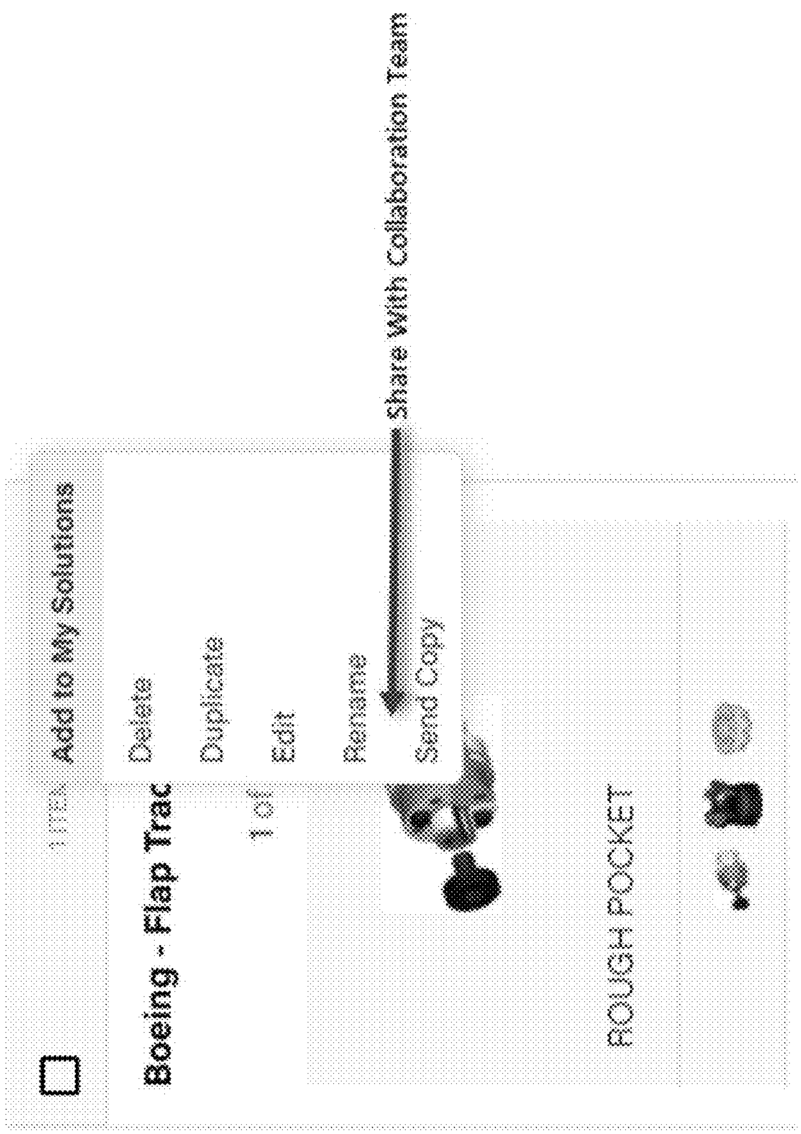
Figure 61:
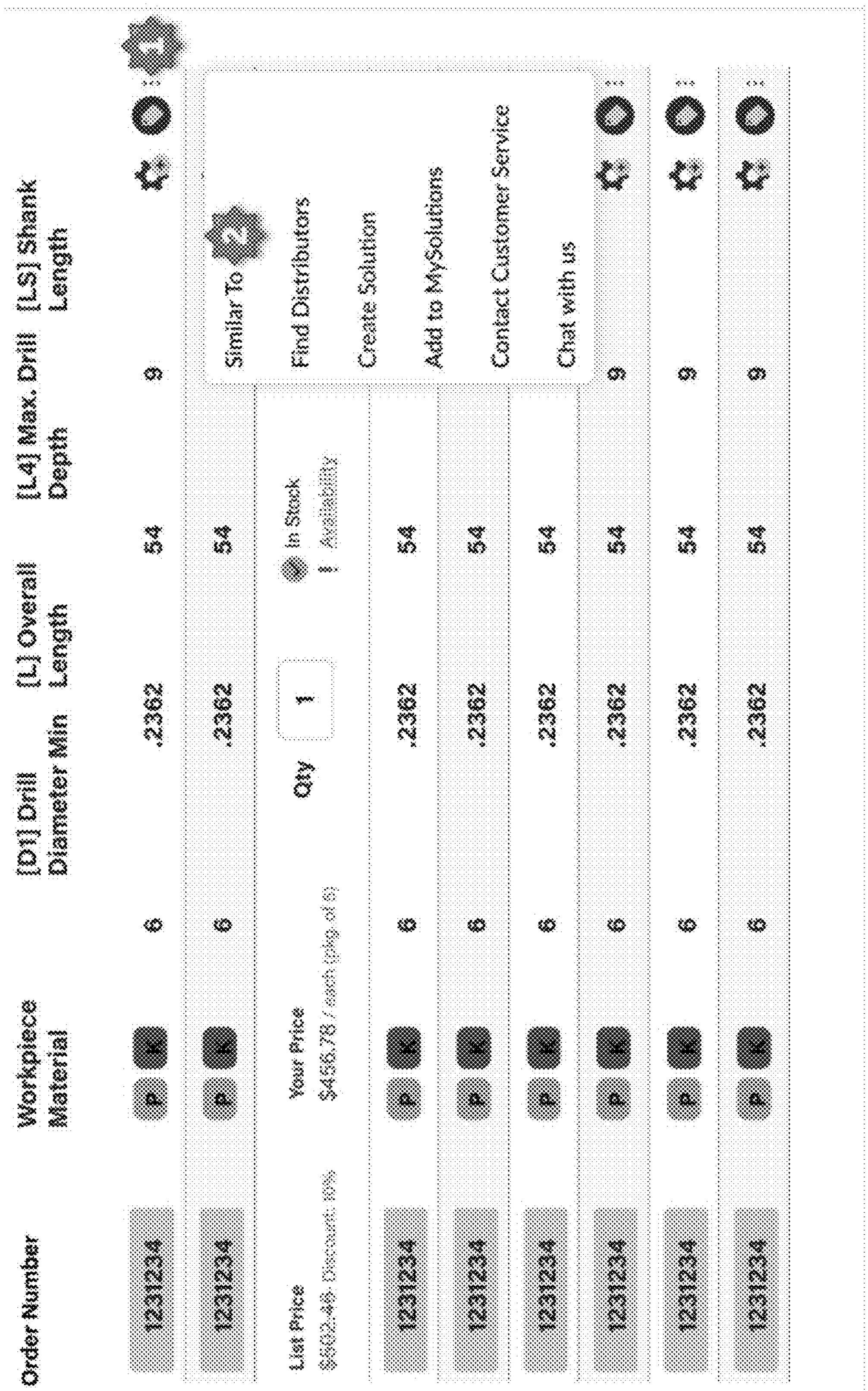
FIGS. 61 through 64 include various user interface screens illustrating different examples of various features and aspects of the "Similar To" functionality.
Figure 62:
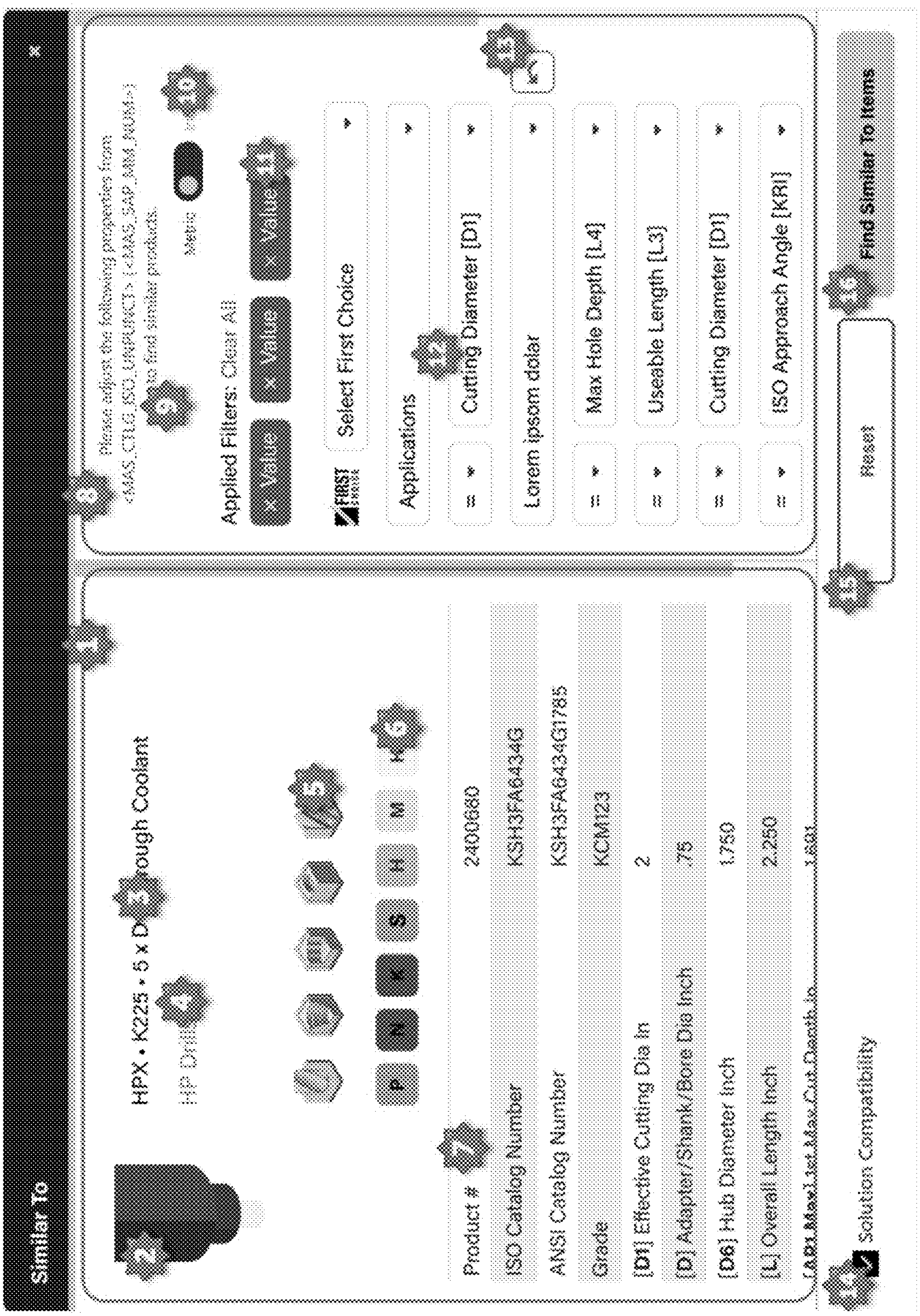
Figure 63:
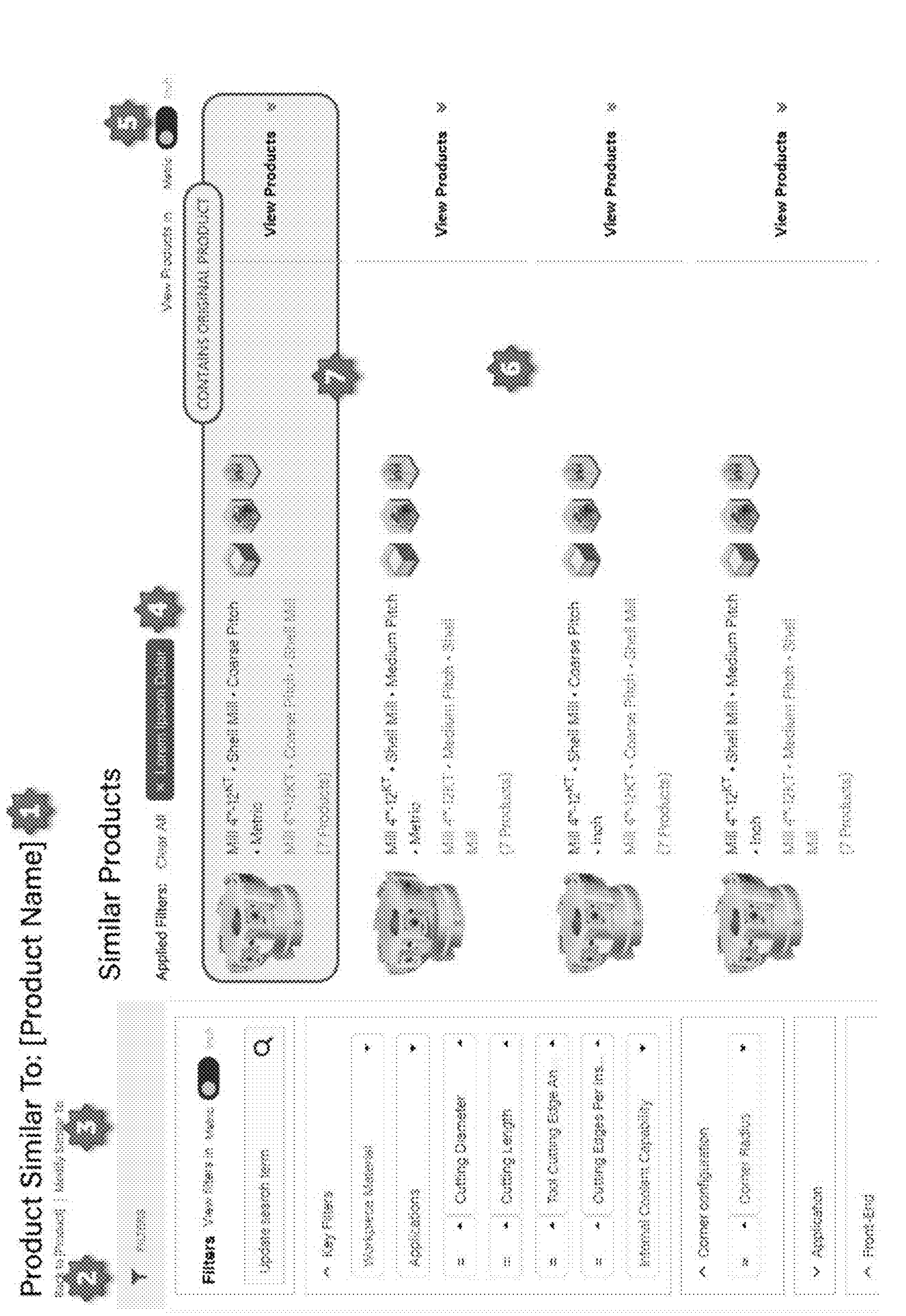
Figure 64:
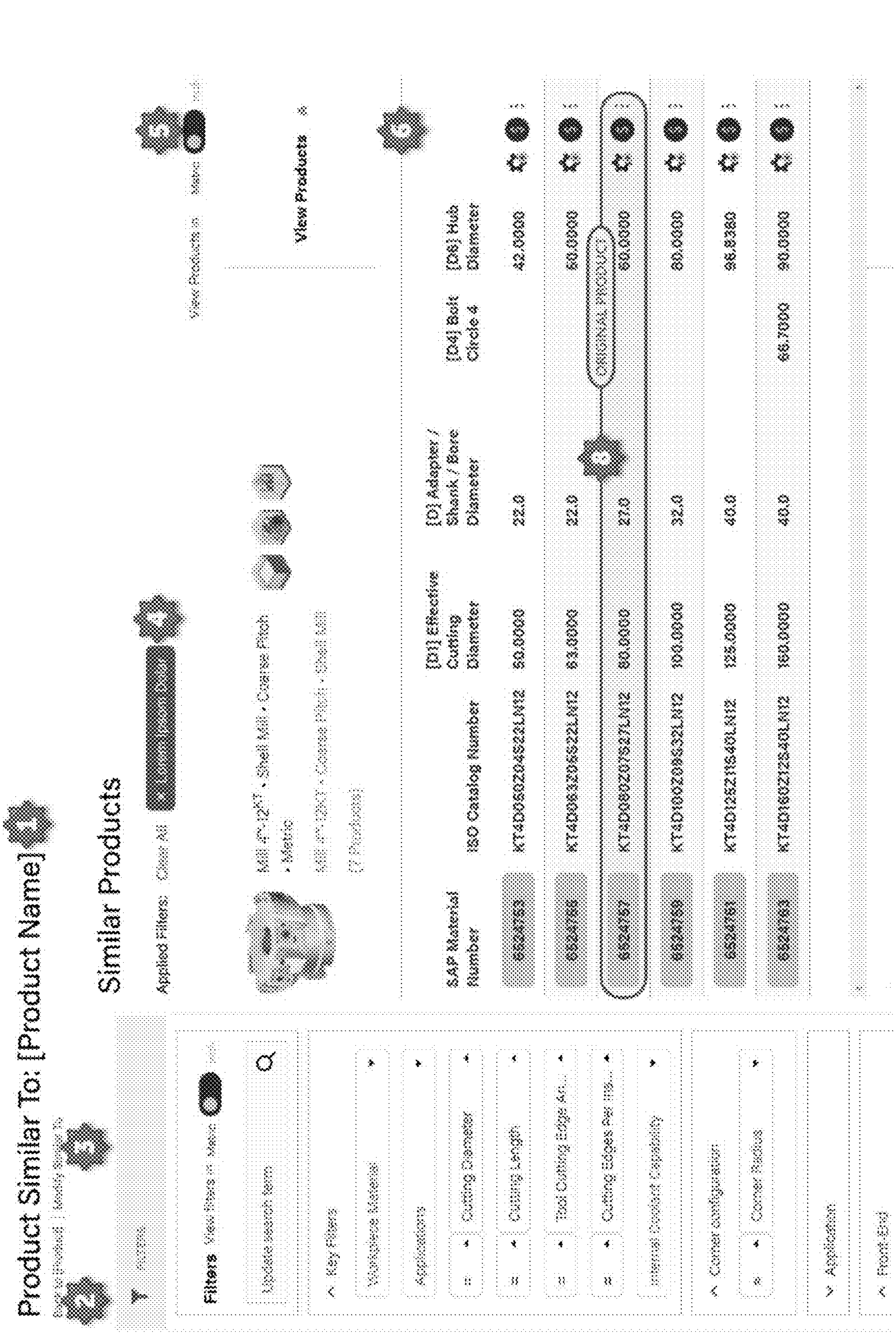
Figure 65:
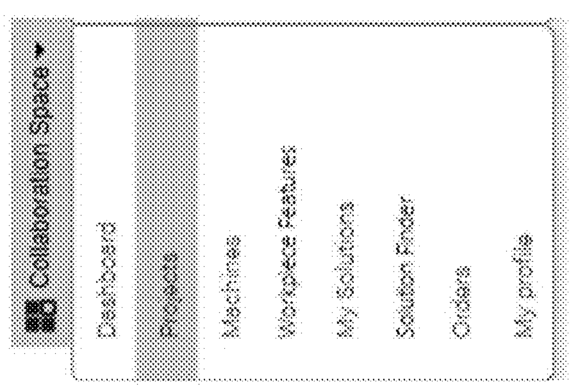
FIGS. 65 through 93 include various user interface screens illustrating different examples of various features and aspects of certain embodiments of the solution finder functionality.
Figure 66:
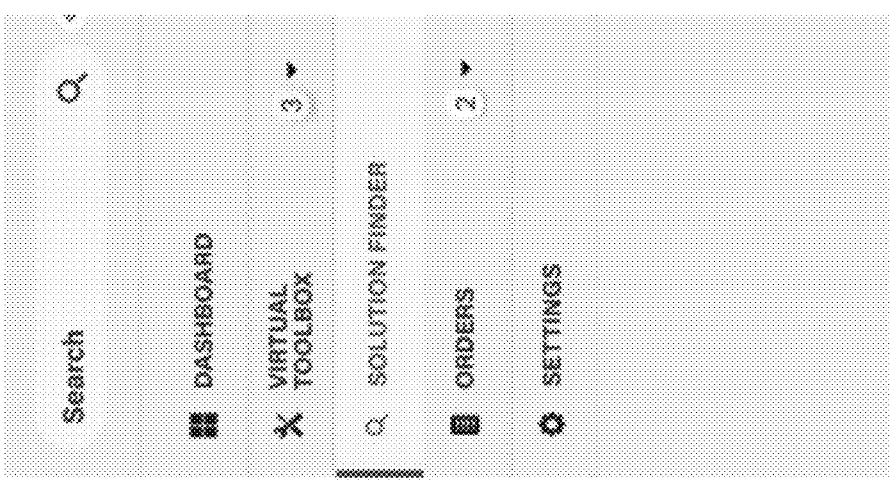
Figure 67:
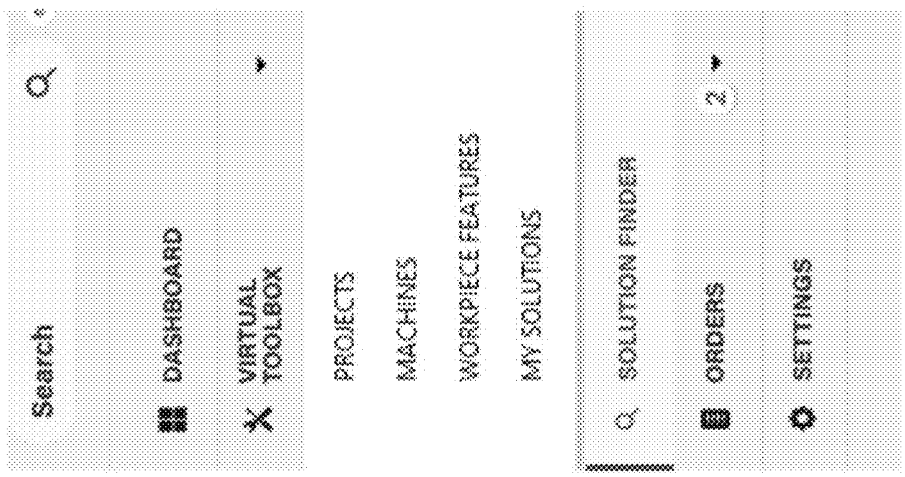
Figure 68:
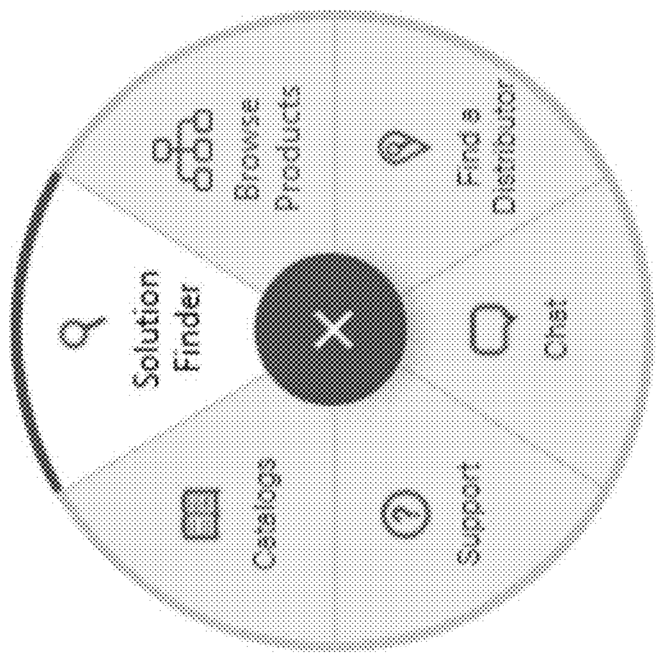
Figure 69:
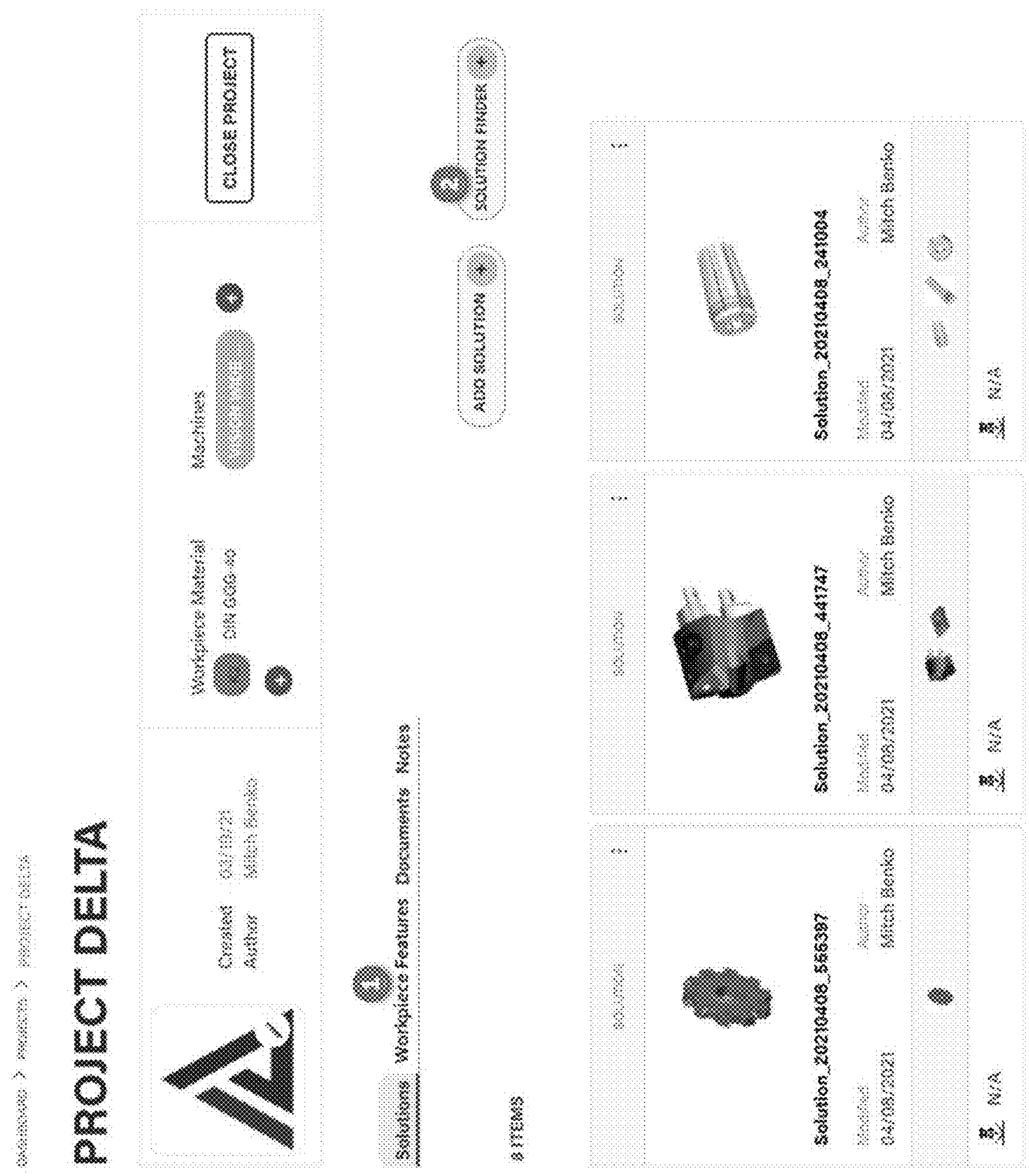
Figure 70:
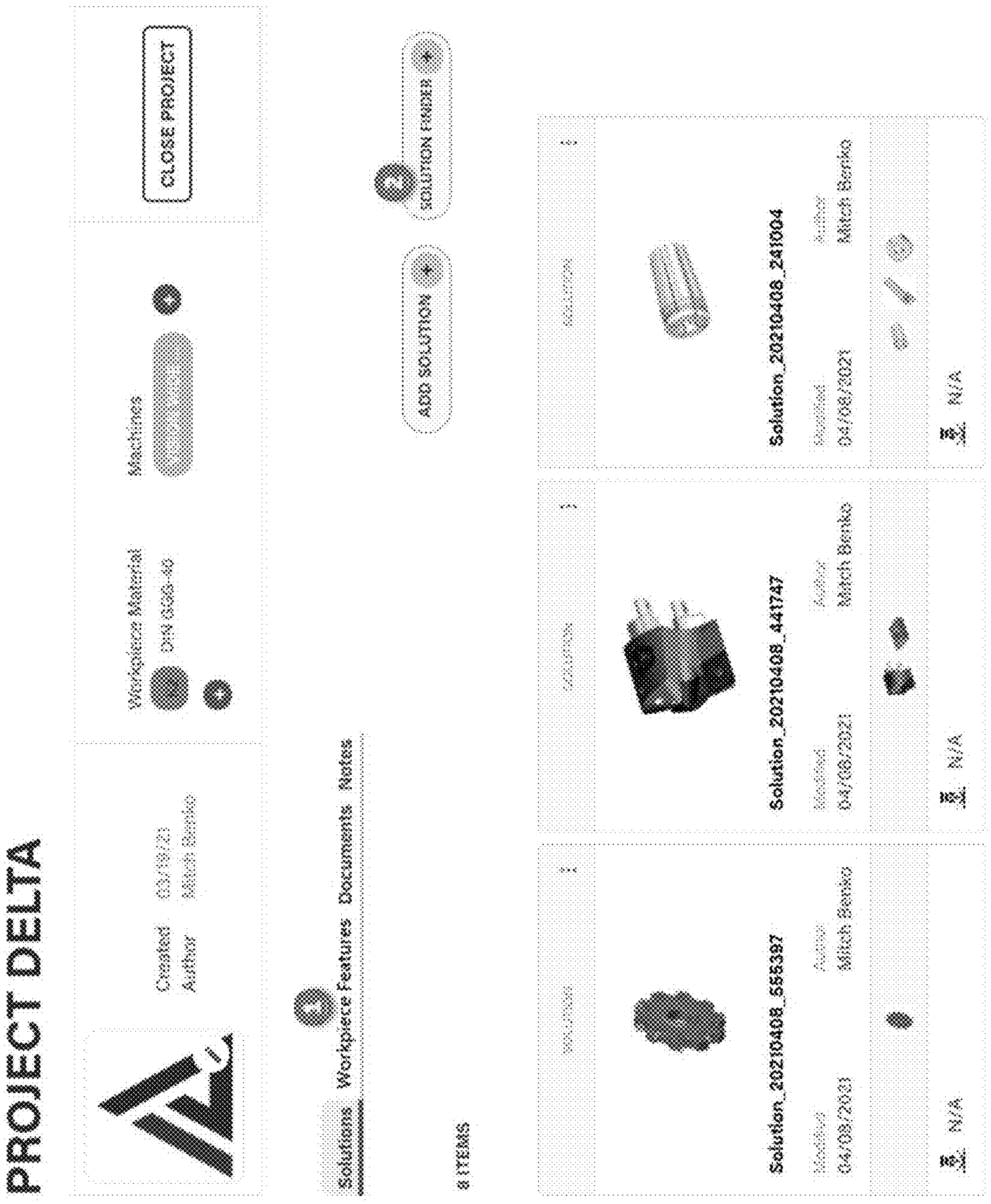
Figure 71:
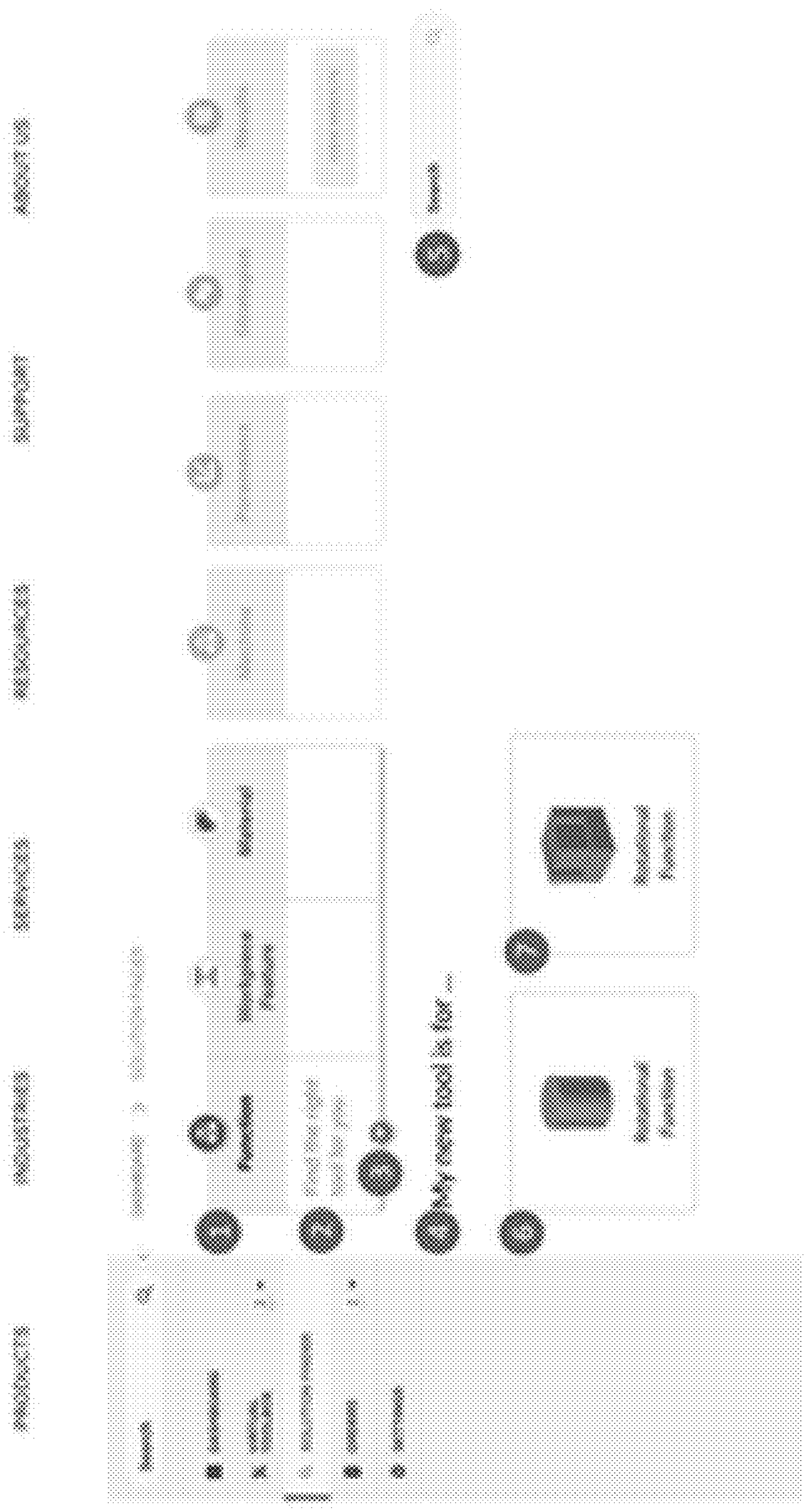
Figure 72:
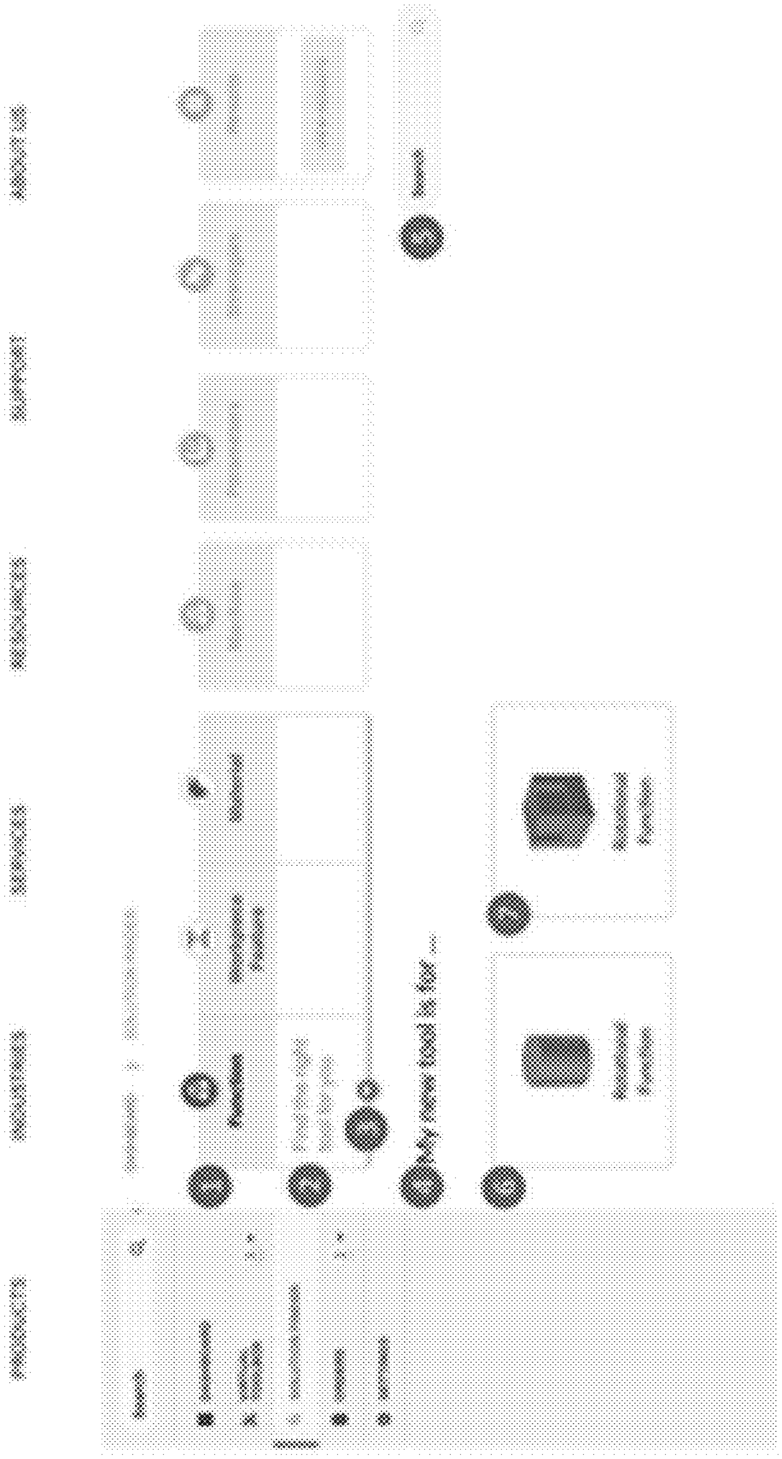
Figure 73:
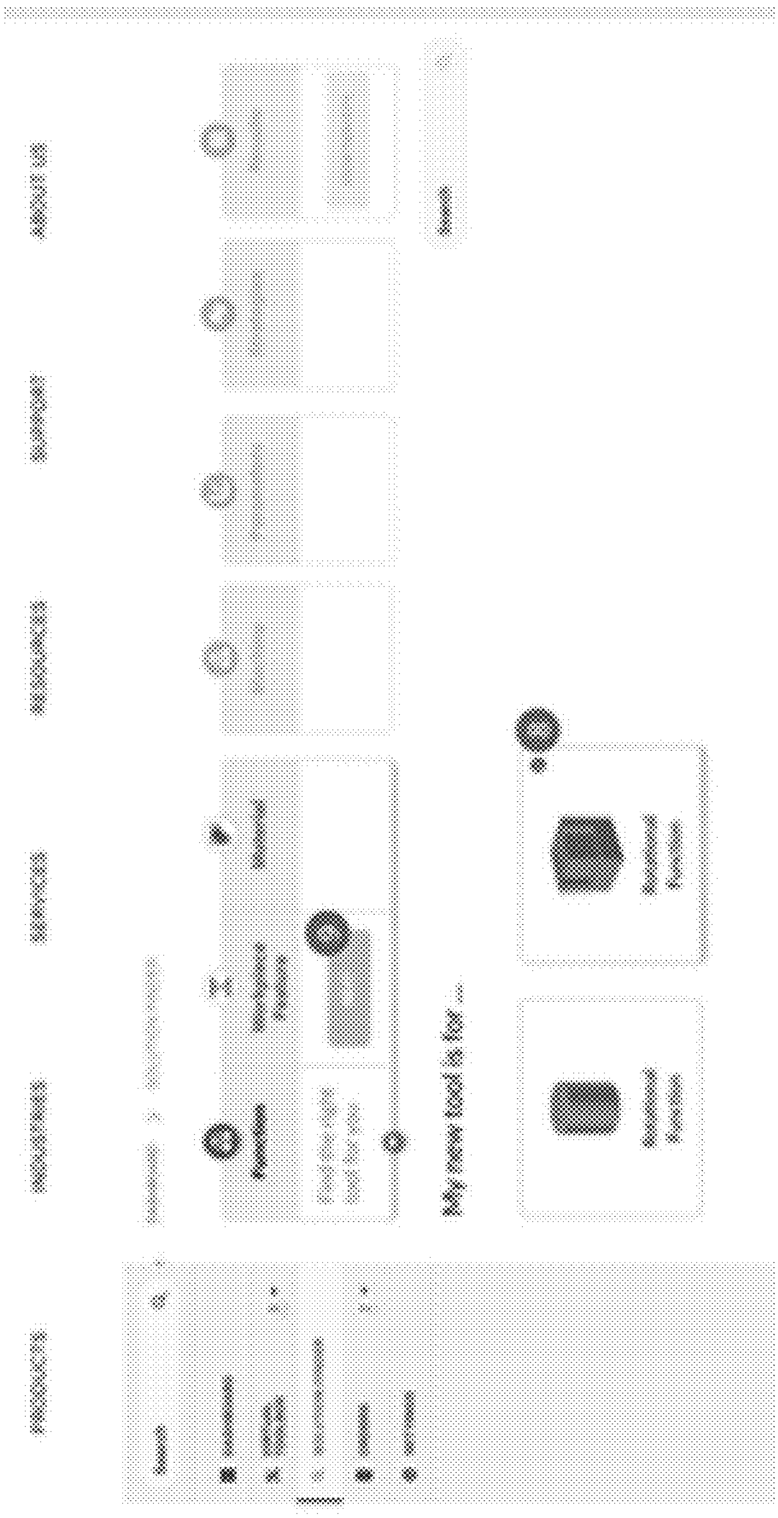
Figure 74:
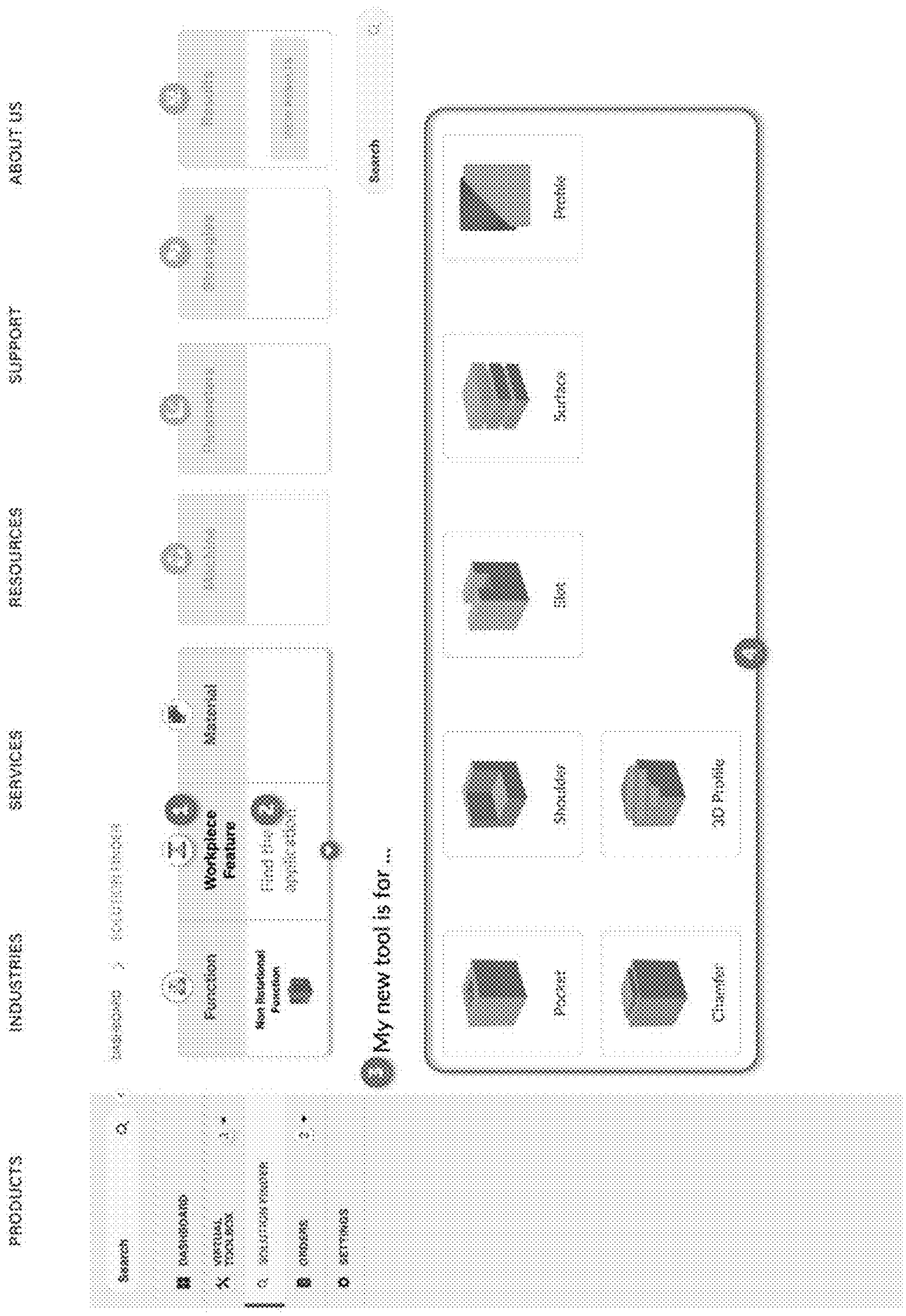
Figure 75:
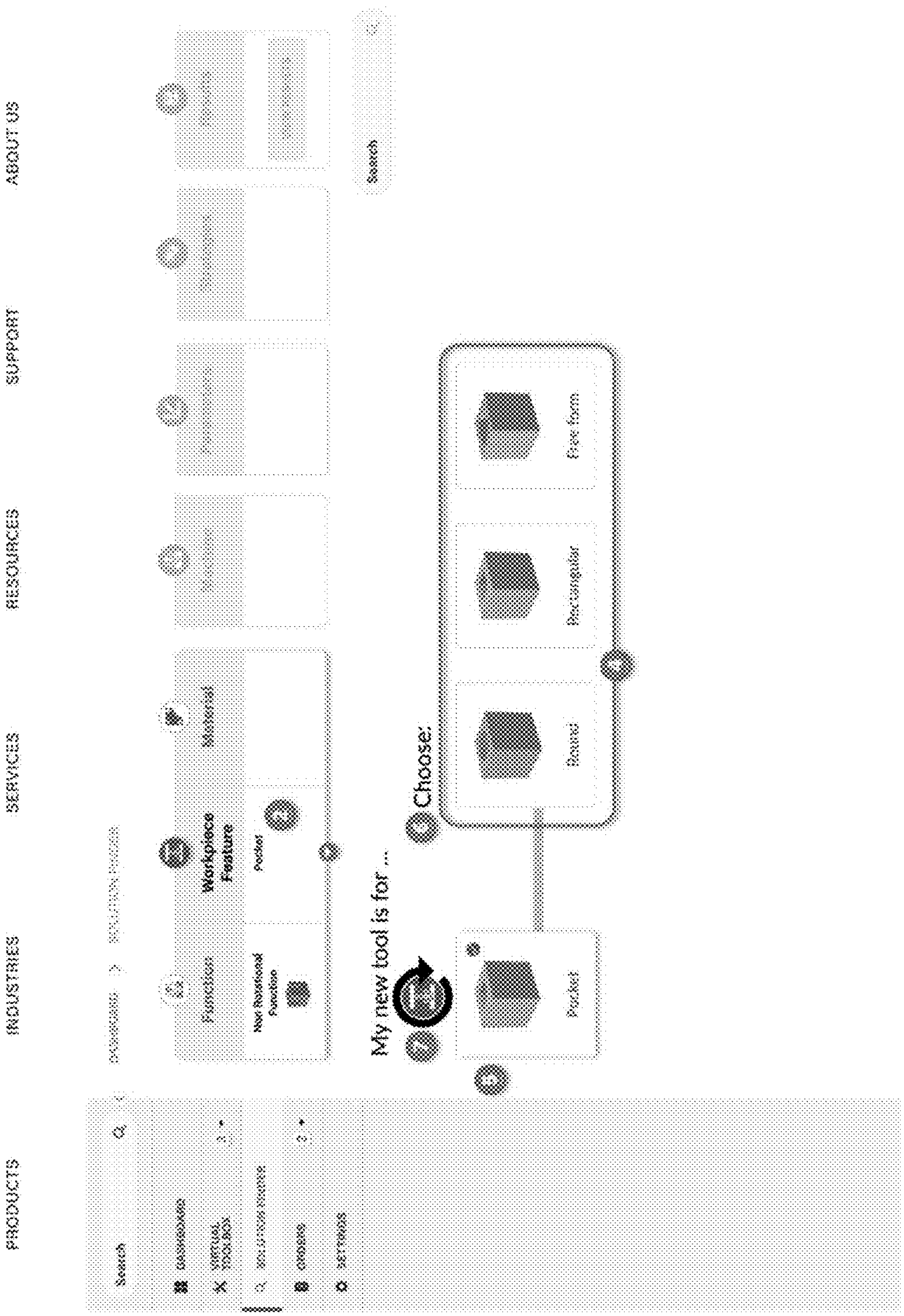
Figure 76:
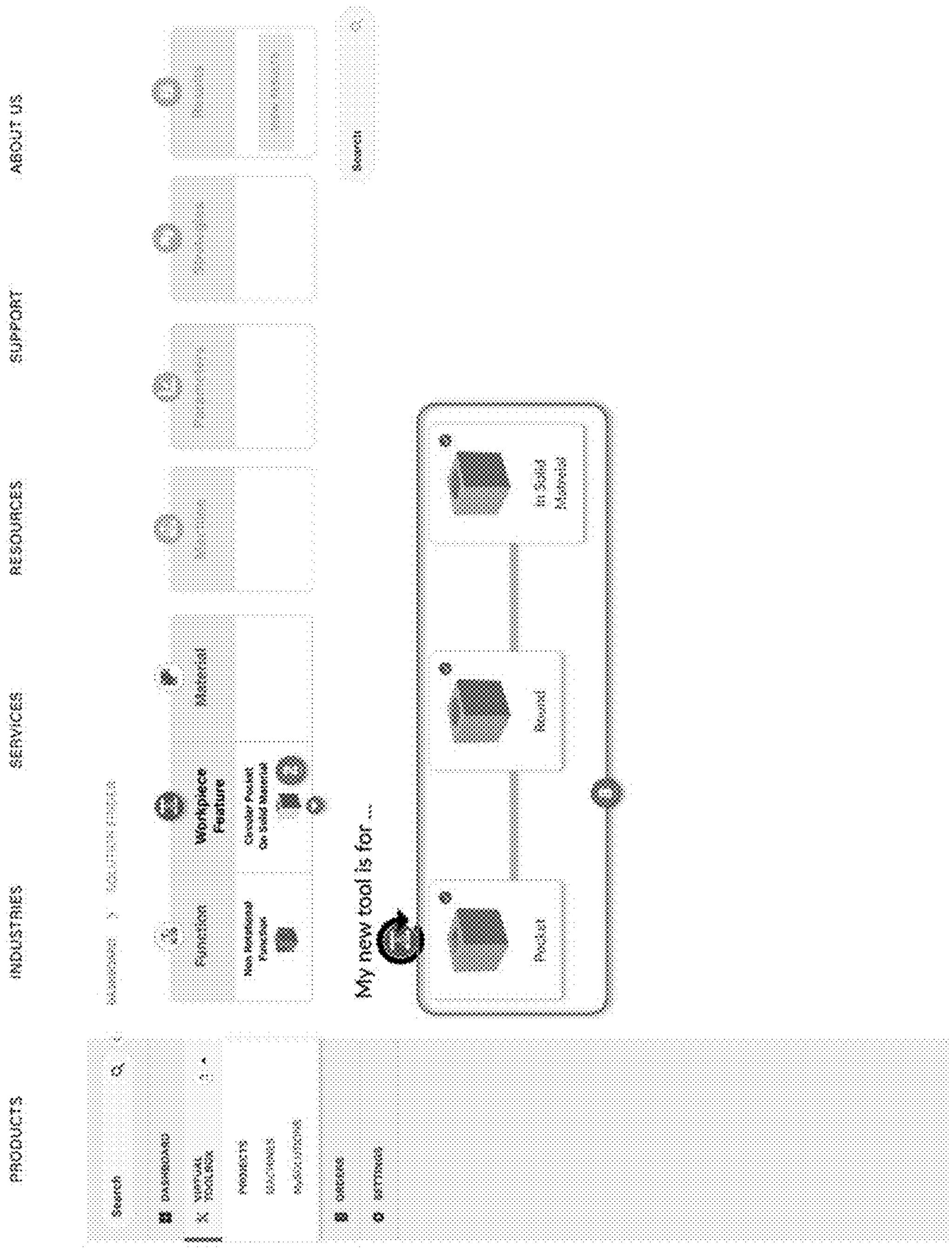
Figure 77:
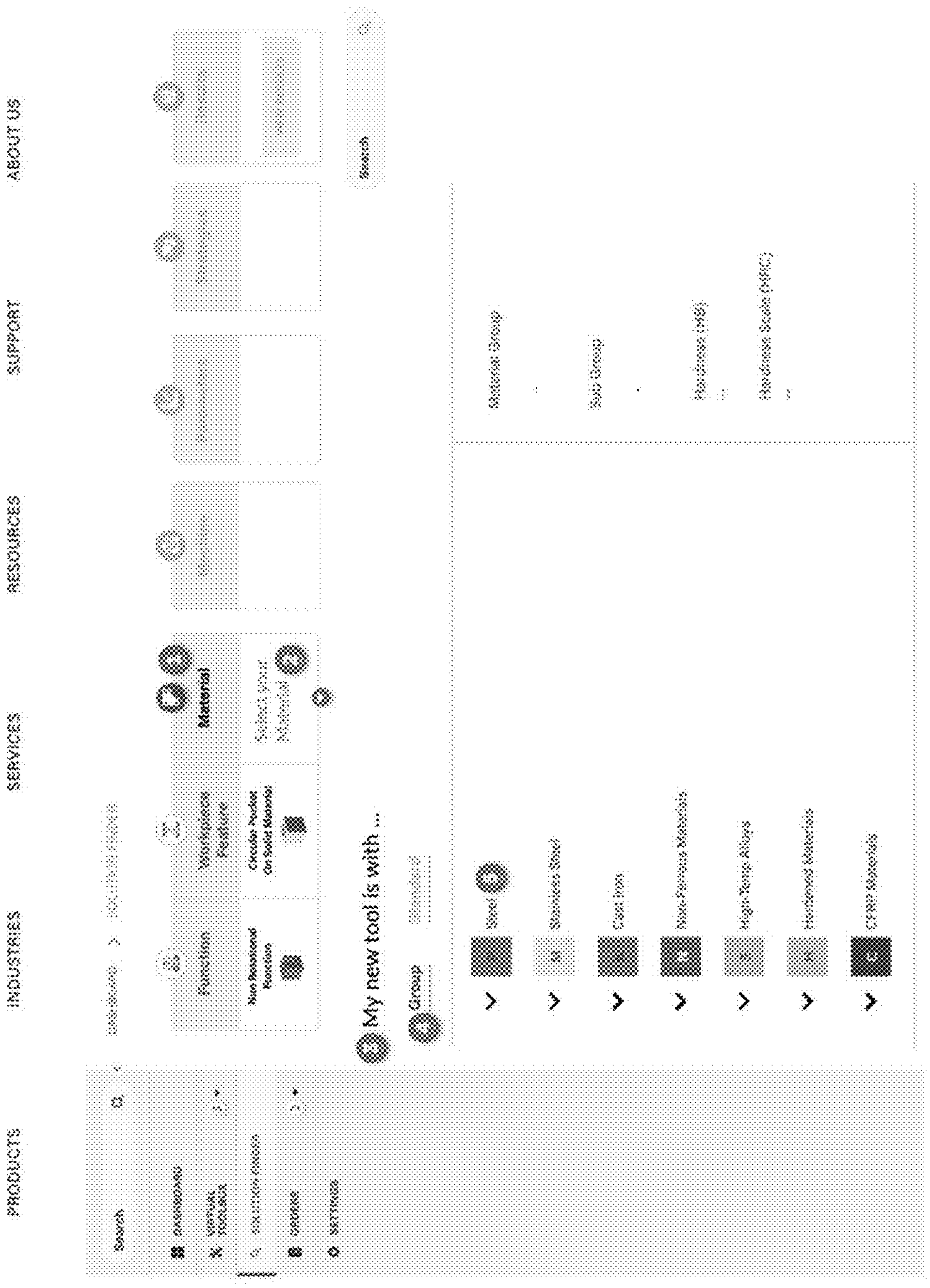
Figure 78:
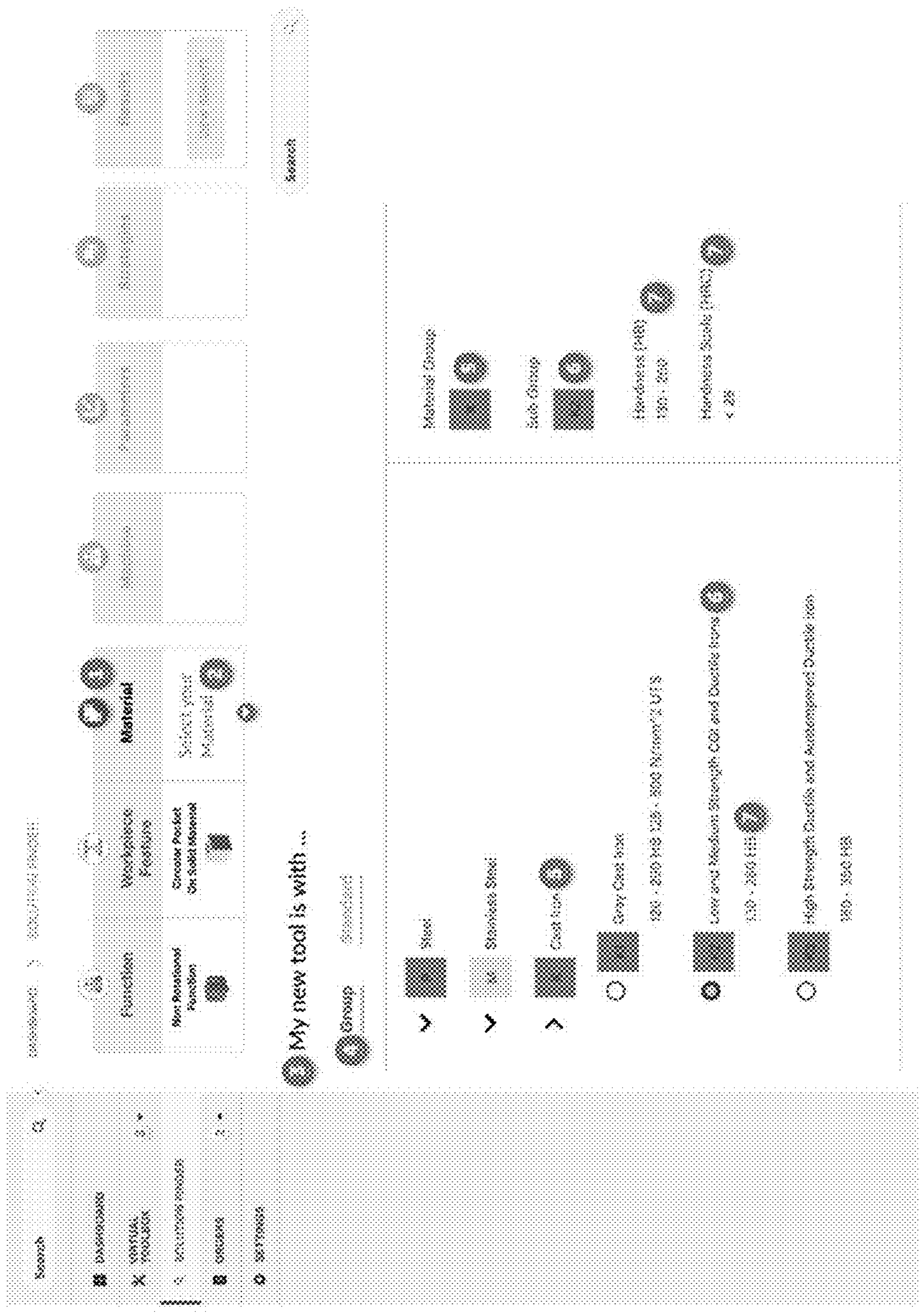
Figure 79:
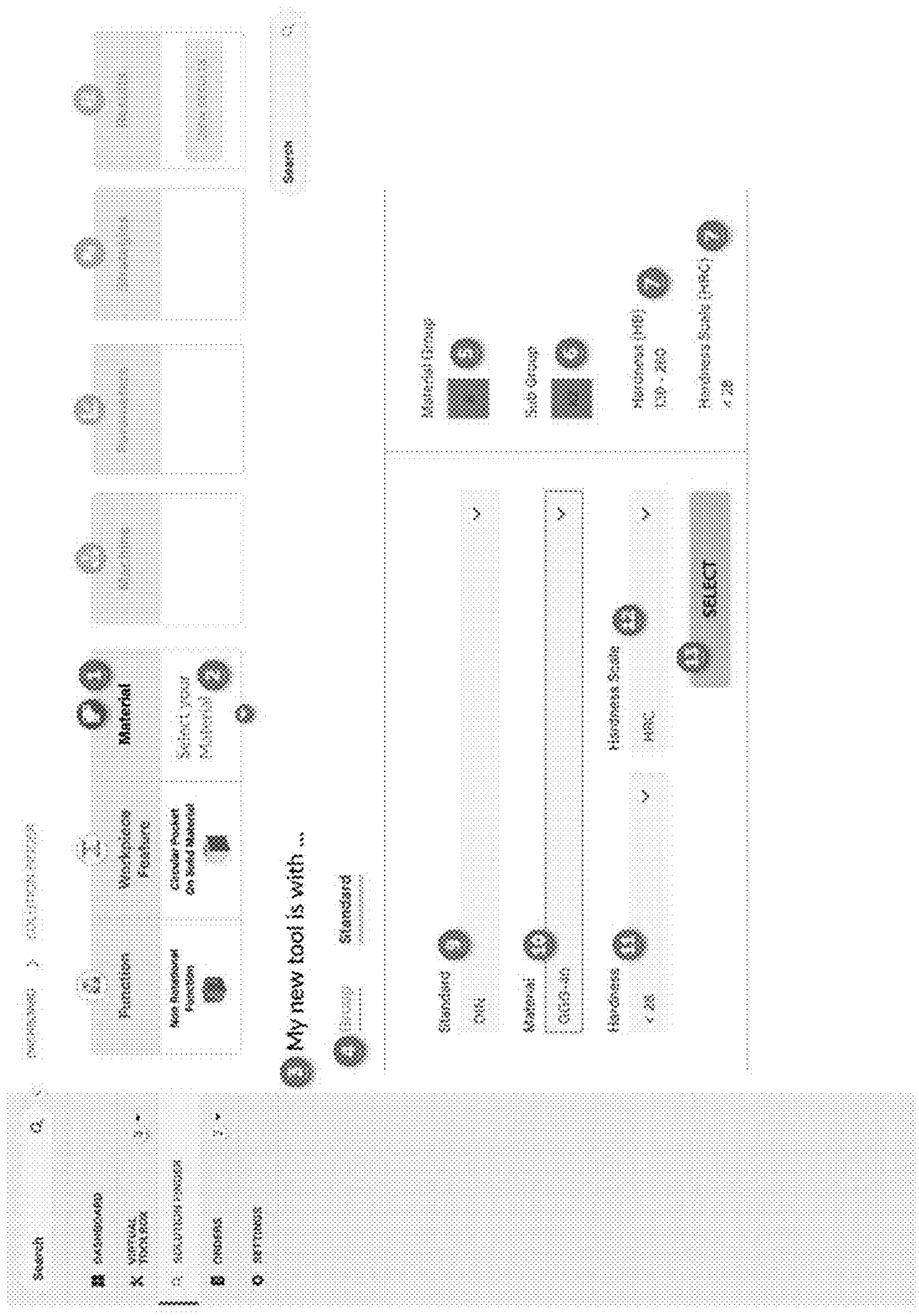
Figure 80:
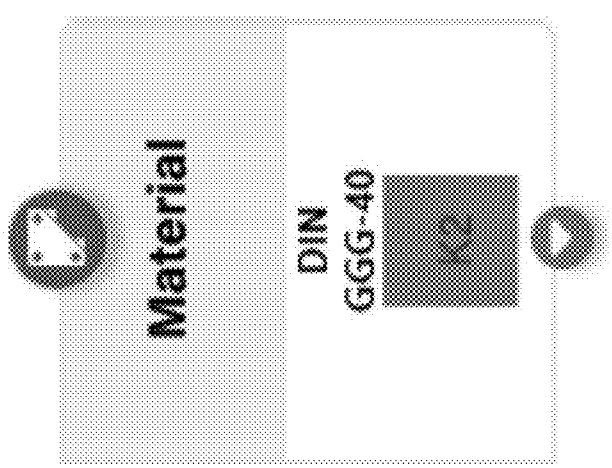
Figure 81:
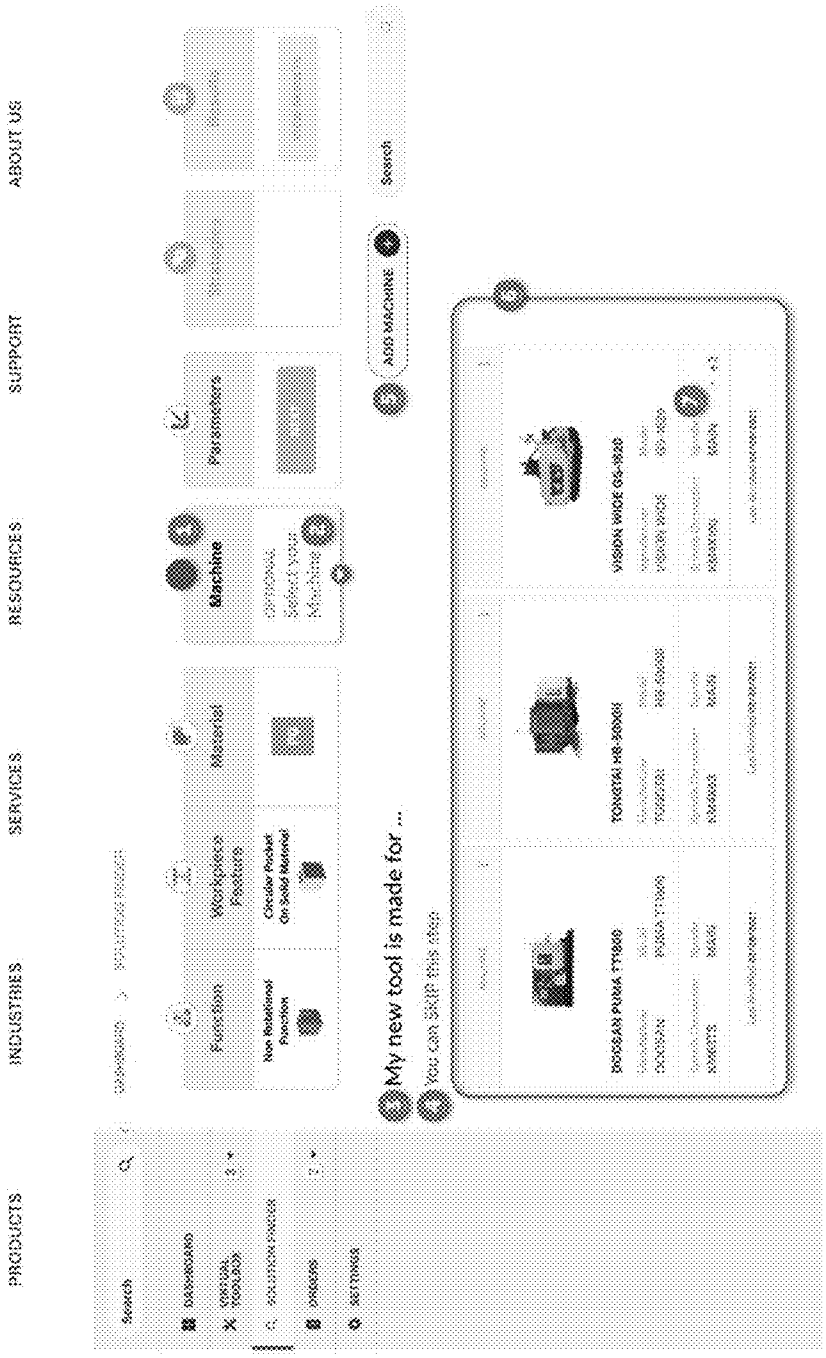
Figure 82:
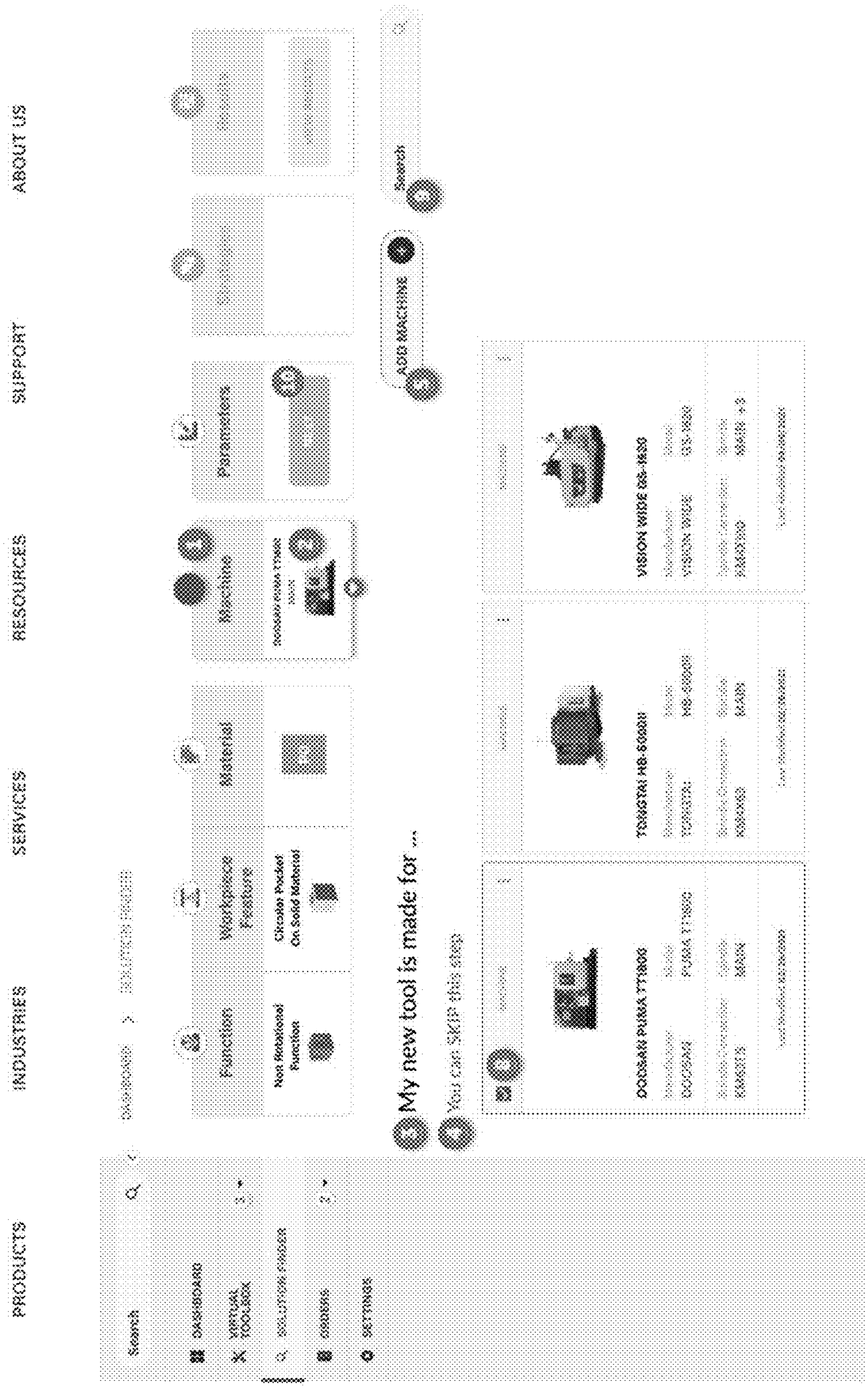
Figure 83:
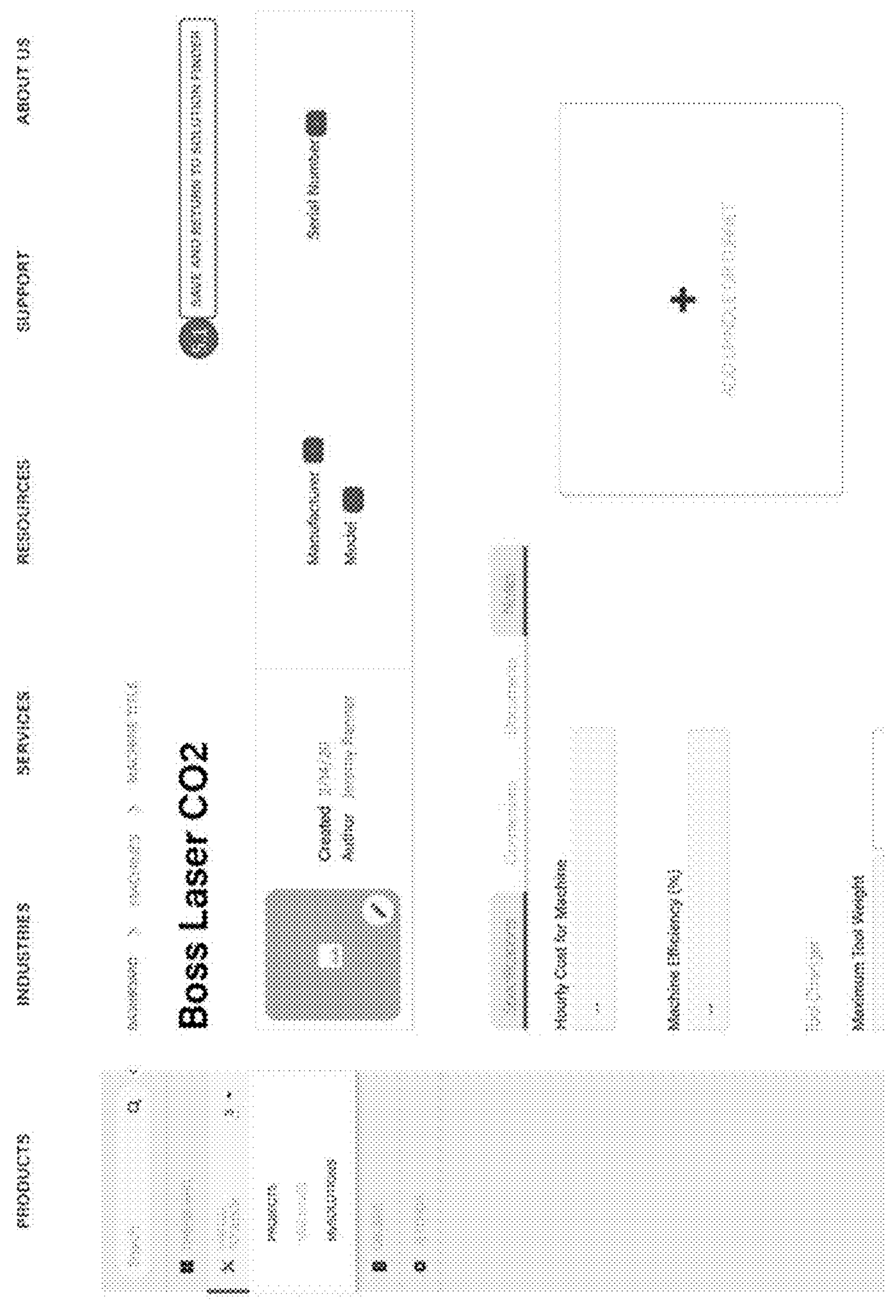
Figure 84:
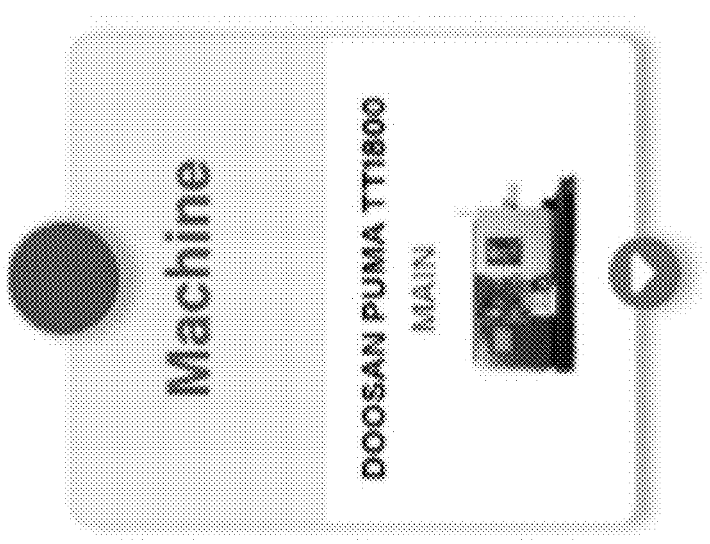
Figure 85:
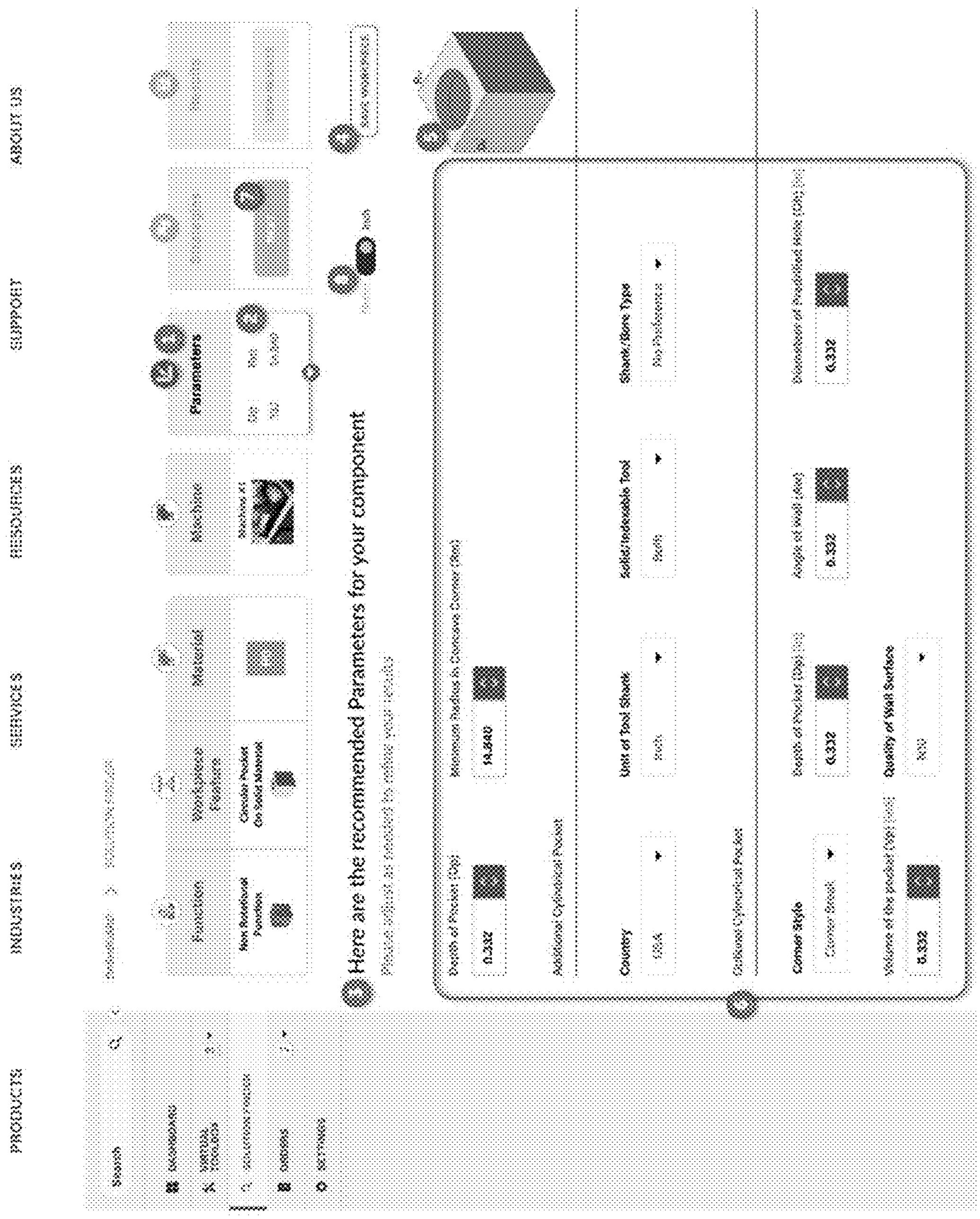
Figure 86:
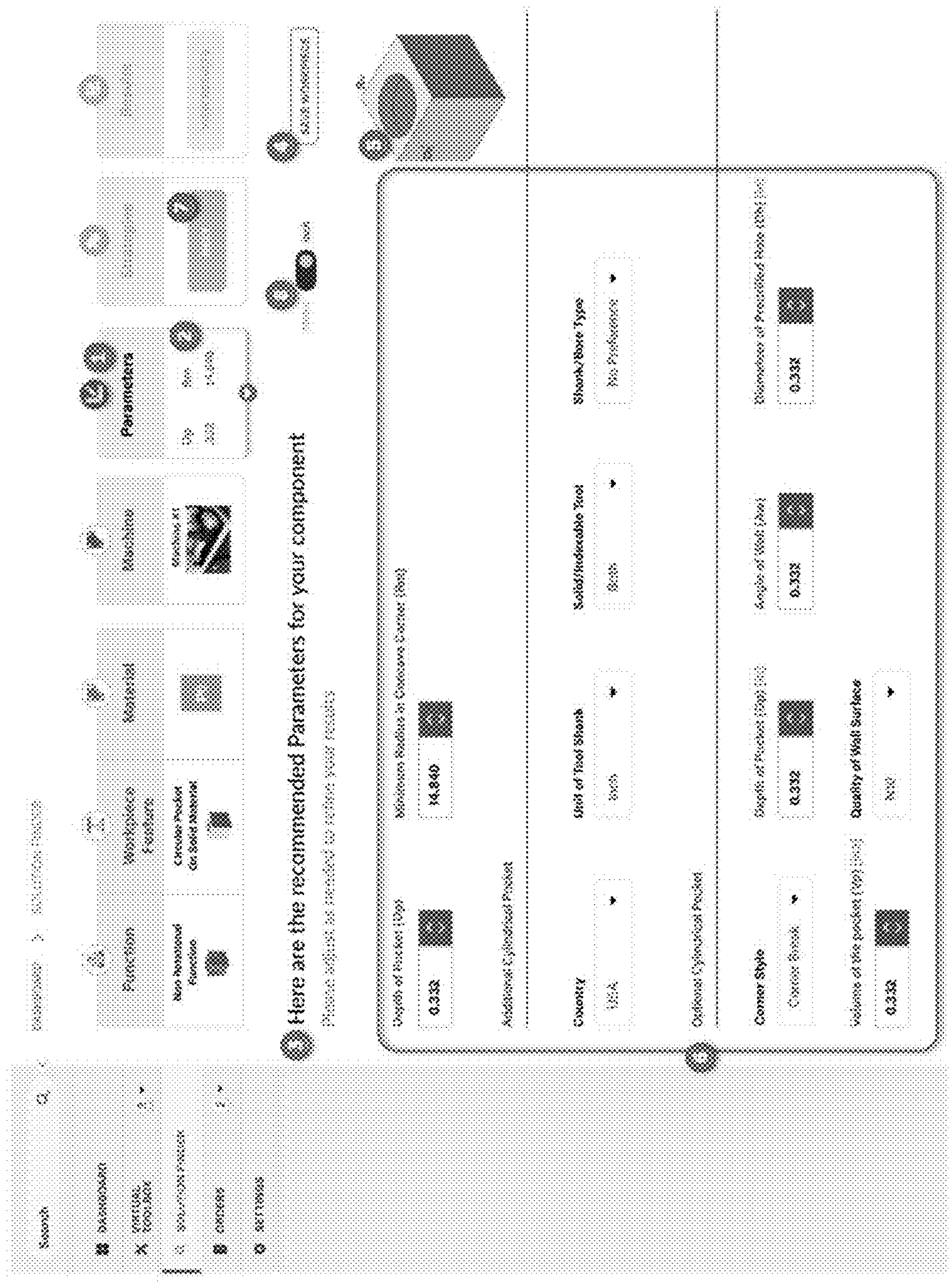
Figure 87:
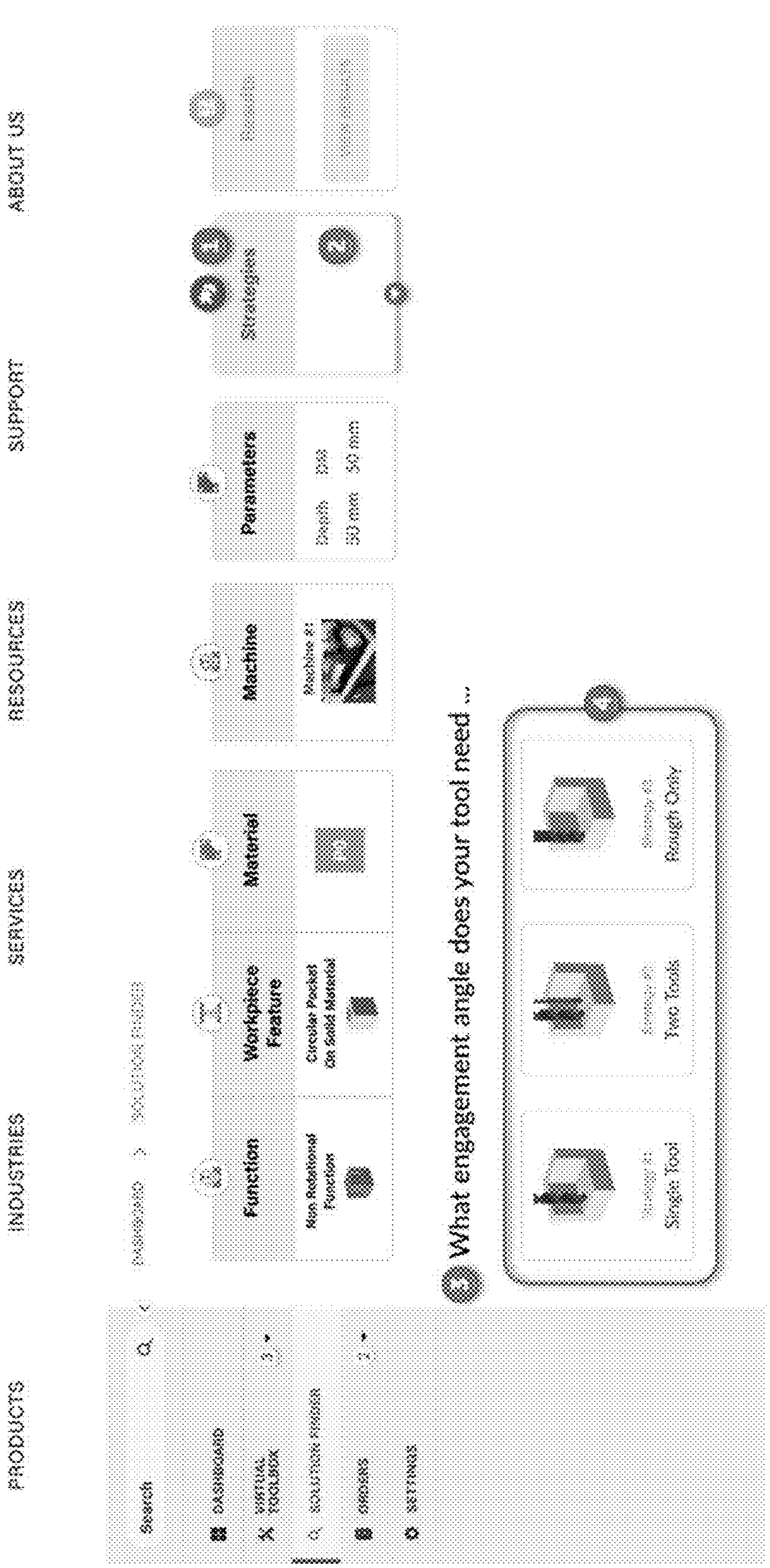
Figure 88:
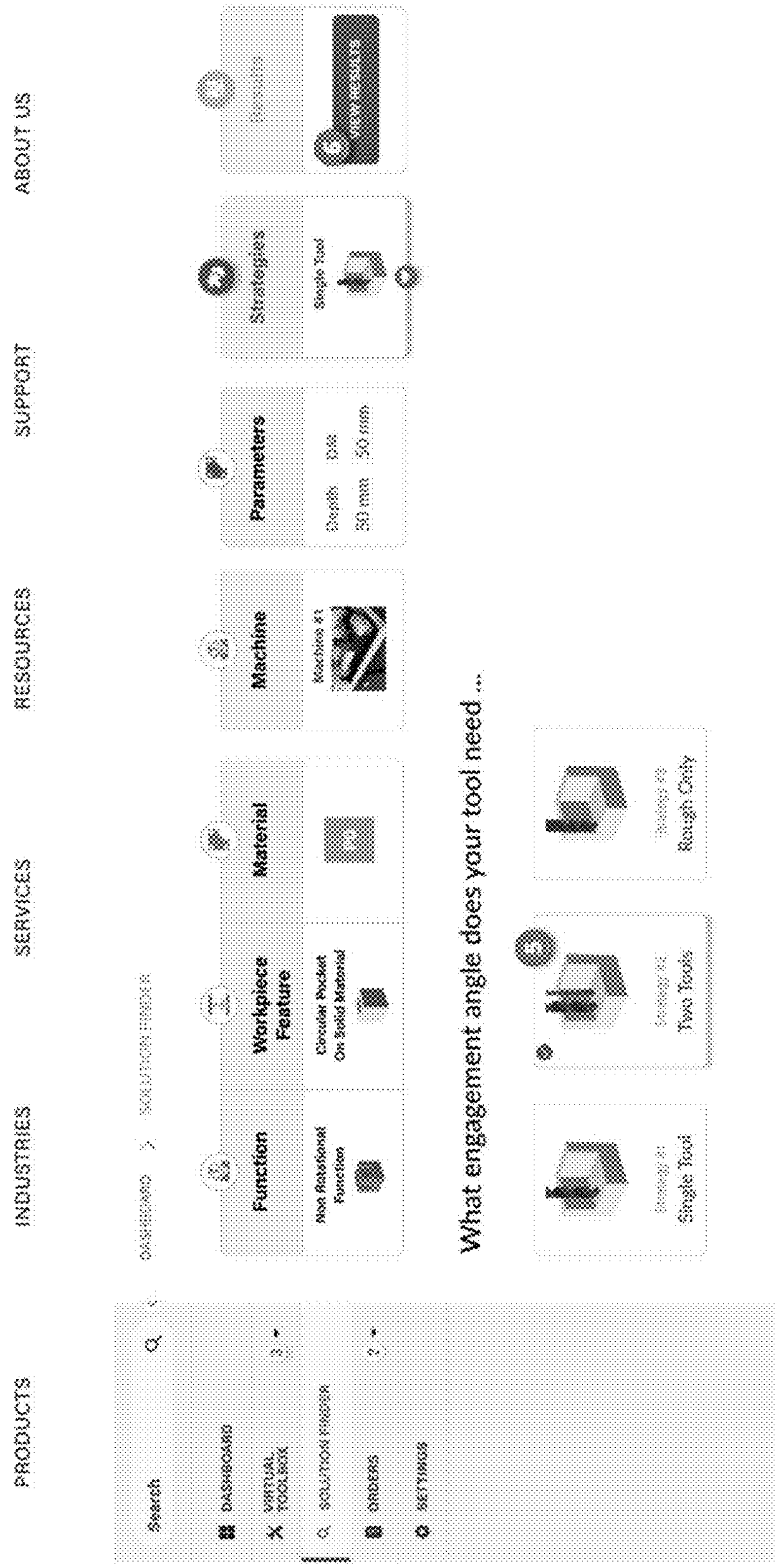
Figure 89:
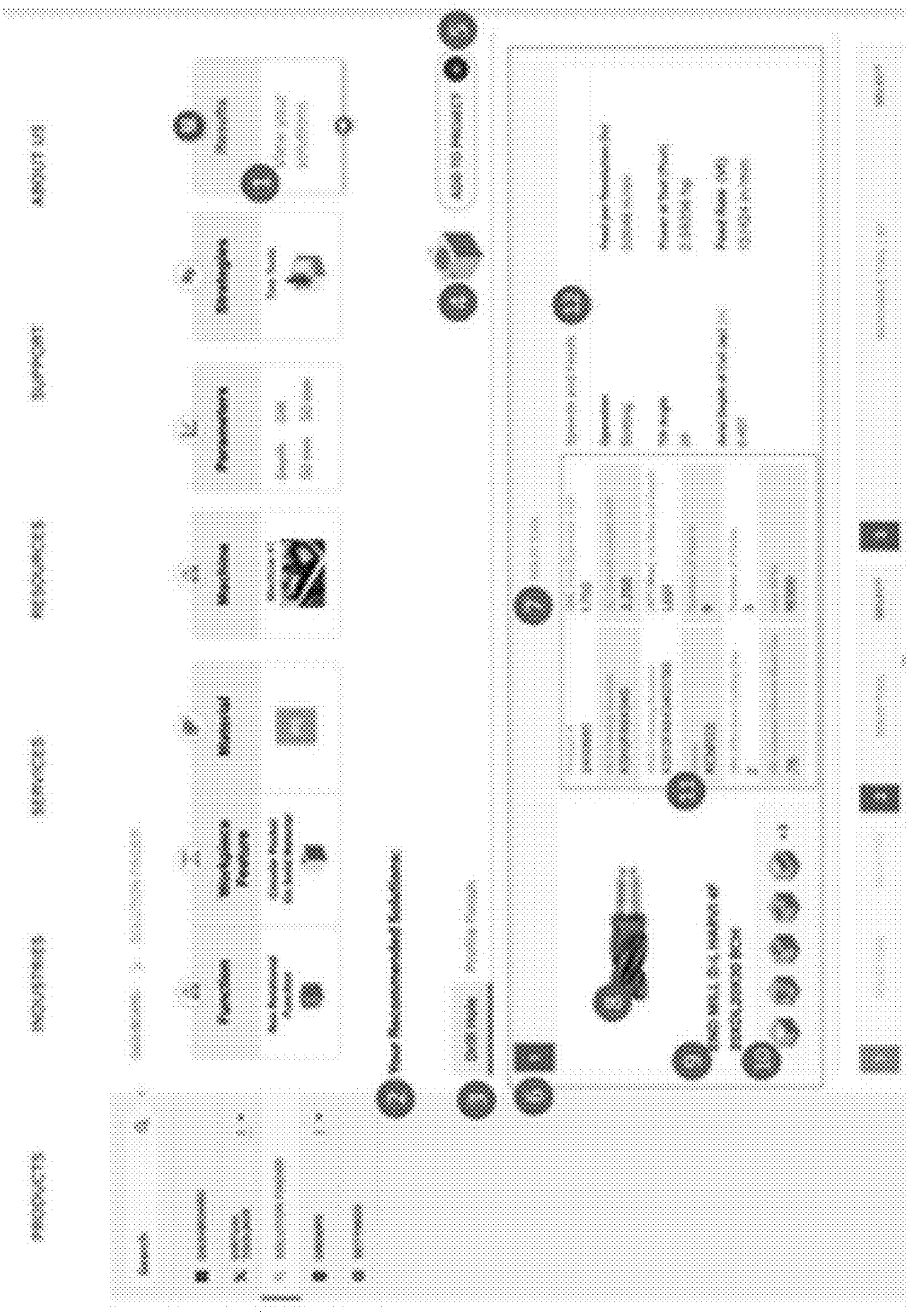
Figure 90:
Figure 91:
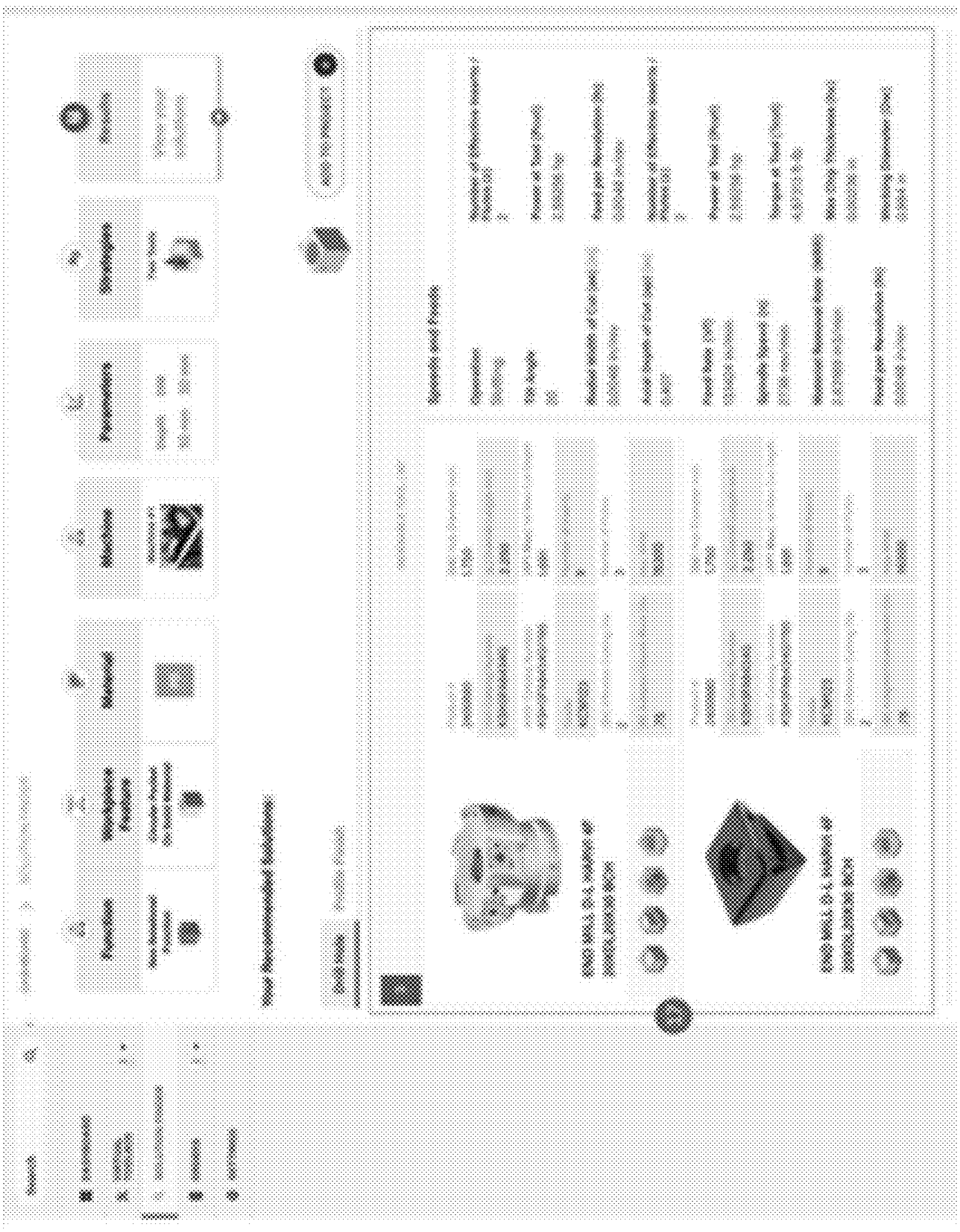
Figure 92:
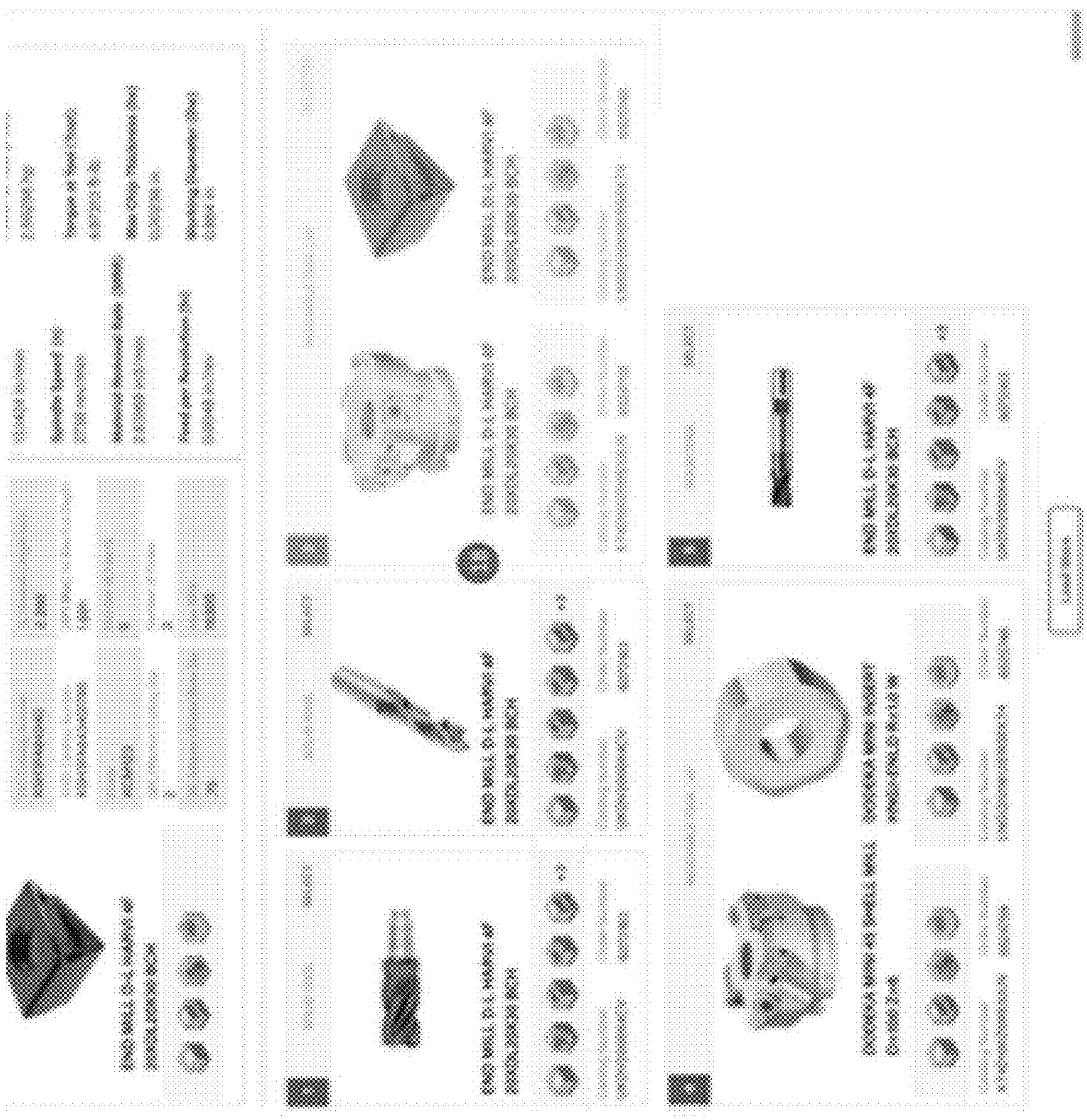
Figure 93:
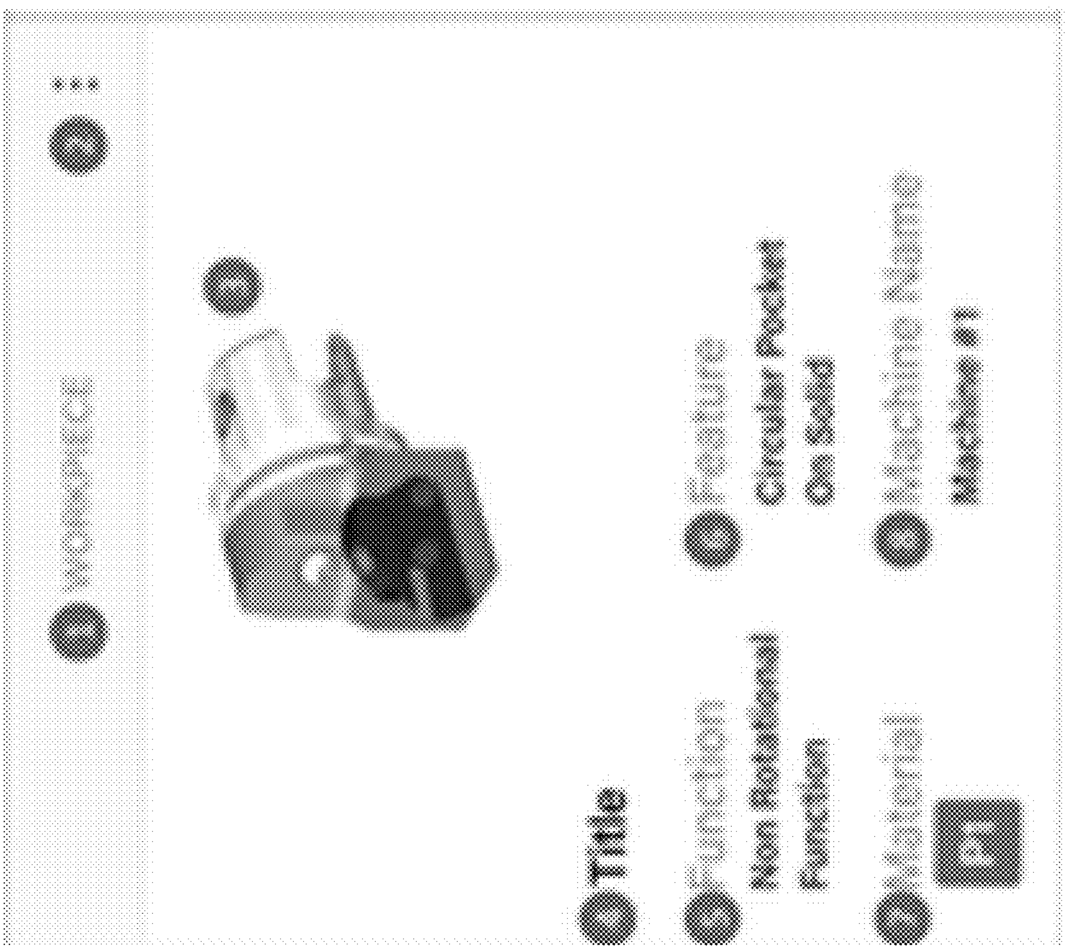

FIGS. 47 through 60 illustrate additional examples of screen displays and computer-implemented tools configured for accessing and implementing the collaboration teams features and functions of the platform 102. In one aspect, FIGS. 47 and 48 include examples of how to create and name a collaboration team within the platform 102. FIGS. 49 through 60 demonstrate examples of how items, components, or elements shared to a created collaboration team (e.g., machines, projects, solutions, or workpiece features) can be added to a dashboard for members of the created collaboration team.

In the examples shown, a user can search for collaboration team names with which the user has been associated. Collaboration teams can be collected and displayed by modified date (e.g., with the most recently modified displaying first in the list), by team name, by creation date, and/or other team attributes. If the user selects a particular collaboration team card through the user interface, details of the particular team can be displayed. The details of the collaboration team card may include: team title, team image or logo, and/or a list of components associated with or linked to the collaboration team, among other data fields or information. Examples of such components may include members, projects, solutions, machines, and/or workpiece features, among others. Various data filters can be applied by users within the collaboration team dashboard, including data filters for team name, machine name, project name, solution name, member name, workpiece feature, creation date, and/or last modified date, among others.

Team members may be permitted to invite other users to be part of the collaboration team. The member-user can enter an email address to invite a new user to the Collaboration Team. A notification can also be sent to the recipient-user. This notification can be displayed as a numbered balloon in the collaboration space navigation menu (see, e.g., FIG. 55) in the collaboration team management of the dashboard. Such invitations can be displayed as a sub menu to the collaboration team management menu in the collaboration space navigation menu. The invitations may be displayed as collaboration team cards, where a call-to-action button provides an option to "Accept" or to "Decline" the invitation.

In other aspects, users can share information from their profiles with the collaboration team. This shared information may be related to projects, solutions, machines, workpiece features, and/or other aspects of the collaborative team effort. The information may be conveniently organized in a card-like format for ease of organization and movement within the dynamic dashboard landscape. In one example, a default sequence or layout for these informational cards may be organized, from top to bottom, as projects, solutions, machines, workpiece features. For example, a list of the user's projects can be displayed in a list, and each project to be shared can be selected by use of a checkbox. Selecting a project shares the selected project with the collaboration team, and the user can be identified as the one who shared the project (or projects). In certain embodiments, information cards can be reorganized or rearranged in the collaboration team section, for example, subject to the user's preferences for viewing the presented information. When an element has been shared with a collaboration team, the card may display a collaboration team icon on the card, for example.

In other aspects of collaboration team features and functionality, components and other information can be shared to multiple collaboration teams. Notifications in the form of e-mail communications, for example, can be sent in response to users taking actions as part of the collaboration team (e.g., sharing a workpiece feature with the collaboration team) and may identify which user took the action. Elements shared to a collaboration team can be shared by the user who has the element in their virtual toolbox. Shared projects may be configured to be editable by multiple members at the same time. However, editing capability for shared solutions, machines, and workpiece feature kinds of elements may be access-restricted for editing by multiple team members at the same time. Such elements or components may be displayed as greyed out or locked, for example, while being edited by one collaboration team member.

FIGS. 61 through 64 include various user interface screens illustrating different examples of various features and aspects of the "Similar To" functionality. A user can choose to view products that are similar to their selected product from the variant table or a product detail page (PDP), for example. In another aspect, a user can modify or remove attributes from the original product and display search results for similar-to products. A user can view the original product name from the similar to search results. In one embodiment, a user can navigate back to the original product PDP or variant table from the search results page. A user can open the similar to module, modify the attributes as desired, and then apply the modifications to new search results. In another aspect, a user can choose to replace a product in a selected solution by using the "Similar To" function in conjunction with a solution compatibility feature.

In various embodiments, a product name and default image can be displayed for a selected product, and the product may be associated with a product family. Application icons may be displayed to reference applications associated with the product. Materials icons may be displayed to reference materials associated with the product. Data for the product may be displayed in the form of a product data table derived from the PDP.

Filters can be applied for the "Similar To" function which correspond to attributes of the original product. Users can remove or add individual filters or clear all filters, as desired. The filter section of the user interface screen can be pre-populated with the attributes from the original product. Attributes displayed in this section can be predefined as "Similar To" attributes. The user can be permitted to reset an individual attribute to the corresponding value of the original product. With regard to the solution compatibility feature, the platform 102 can be programmed to confirm that a user selection maintains "fits-with" compatibility with a given Solution. When selected and the "Find Similar Items" button is clicked, the user remains in the existing tab when viewing the results, and the chosen product can be added to the existing solution. When deselected and the "Find Similar Items" button is clicked, a new tab is created to render the results. The user can be directed to the new tab to view the results. If the choice is not compatible with the solution, then the platform 102 may be programmed to not allow the results to be added to the solution.

FIGS. 65 through 93 include various user interface screens illustrating different examples of various features and aspects of the solution finder functionality. In various embodiments, a CPQ/FPX solution finder session can be created, which can be initiated from a task-based navigation widget, from within a project, or from a collaboration space left navigation menu or dropdown menu. The solution finder allows for selection of available parameters for different features or sub features selected by the user, such that the user can enter appropriate parameter values for a workpiece feature to be machined, for example. The parameters in solution finder may be returned to the user each time that changes are made, so that the parameters shown are as accurate and up to date as possible. Parameter values, workpiece materials, and a machine/spindle can be specified by the user to return results which, as determined by the solution finder, meet the needs of the workpiece feature to be machined. Also, the user is able to select from different available machining strategies for a workpiece feature, based on the input data provided. The solution finder then generates and displays recommended solutions that correspond with the selected strategy. Recommended solutions can be generated and displayed for each operation and pre-condition in the selected strategy, and these recommended solutions can be ranked from highest to lowest. After a recommended solution has been selected, perhaps in association with each operation and pre-condition required for the workpiece feature, it can be added to a project.

Different phases or stages of the processing performed by the solution finder can be graphically represented as process step cards, for example. Each of the cards (e.g., for Function, Workpiece Feature, Material, Machine, Parameters, Strategies, and Results) represents a step along the solution finder process flow. User input data and product information can be saved and sent to a CPQ/FPX module. This module can also be used to retrieve parameter information, product images, or solution-related information, among other types of data.

Figure 94:
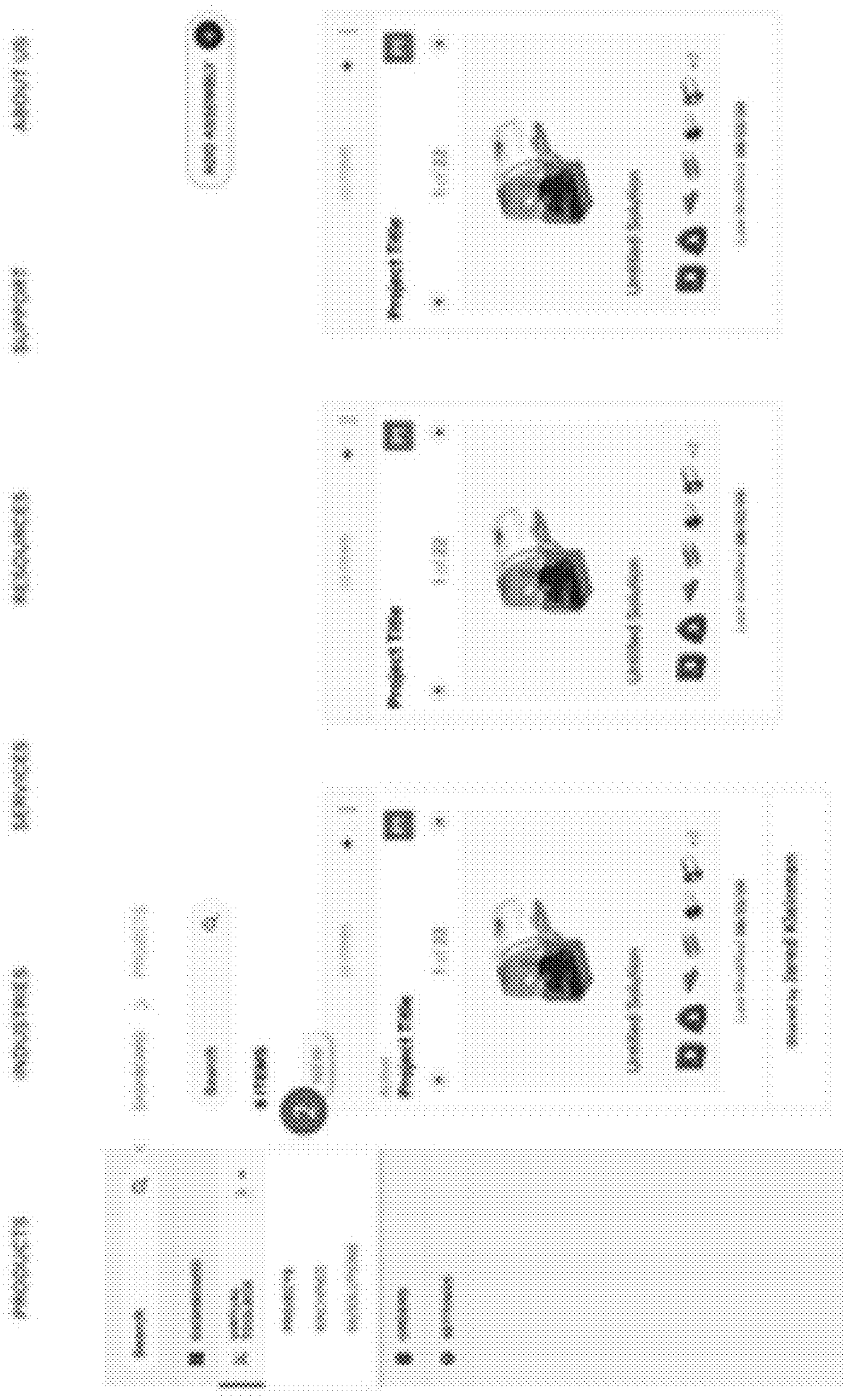
FIGS. 94 and 95 include user interface screens illustrating examples of various features and aspects of a notification functionality provided in accordance with certain embodiments of the industrial tool solution platform described herein.
Figure 95:
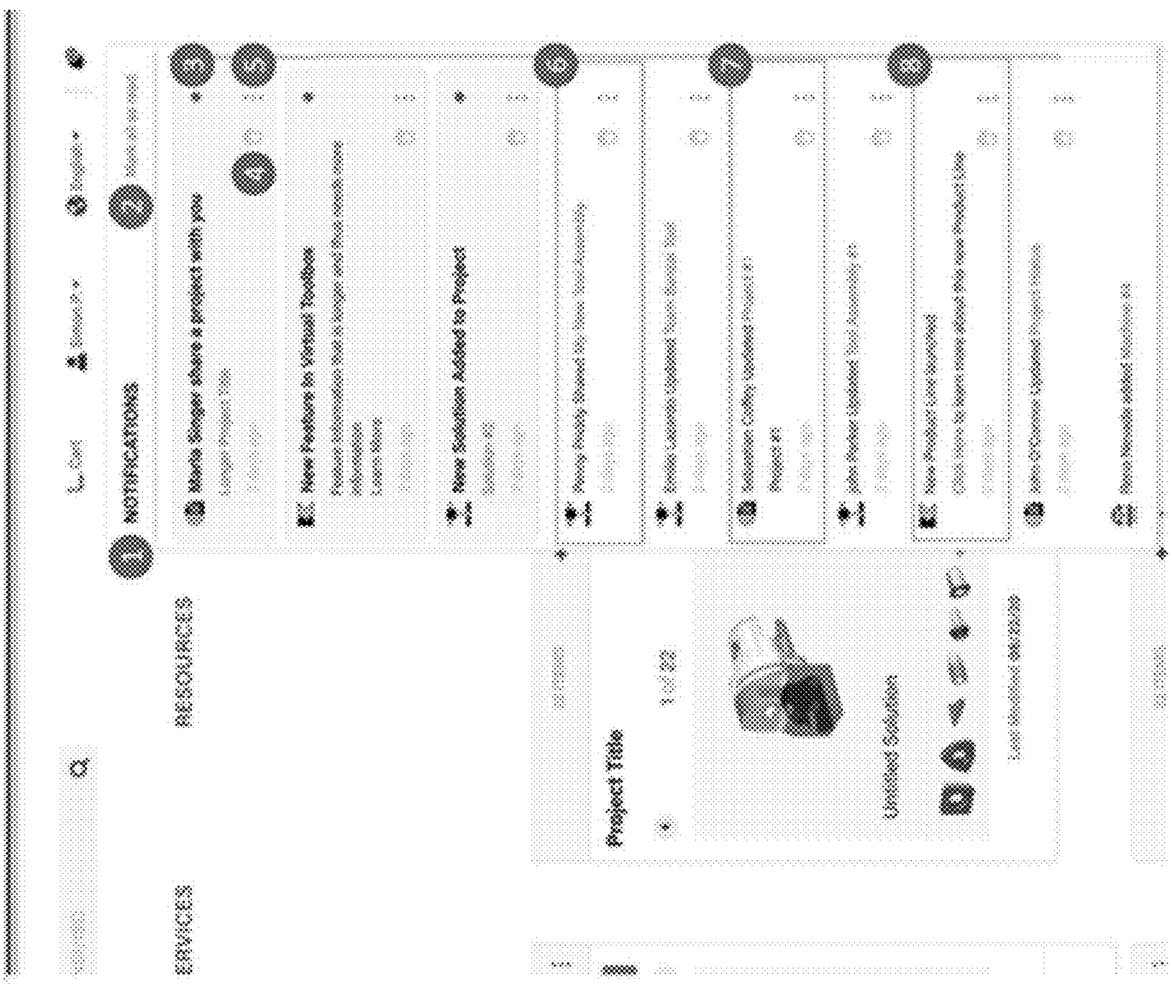

FIGS. 94 and 95 include user interface screens illustrating different examples of various features and aspects of a notification functionality provided in accordance with certain embodiments of the platform 102 described herein. A notifications menu may be accessed to display the user's notifications. The number on the notification bell icon indicates how many unread messages the user has in the menu. When a solution, project, machine, or workpiece is shared with a user, a "NEW" icon can be displayed on the shared item, until the user accesses or opens the item for the first time. The "NEW" icon will persist until the user has opened the shared item. Once the user has opened the Notification, the "NEW" icon will disappear. Once the user has opened the notification on solution, project or machine, the notification will be updated to show the notification as read. A time stamp can be generated in response to user activity which indicates how long ago the action was performed. In certain embodiments, notifications can be generated in response to the name of the user that interacted with a project, the action the user performed with the solution, and/or the project name and a link to the project.

In the collaboration space, if a first user shares a project, solution, machine, workpiece feature, or other element, and another user clicks on the link, then the first user can be directed to the information for that element. When an element is shared with another user, the receiver may receive a notification when the element is visible in their collaboration space. A timeline or date may be set by the user to remind them to re-order a product or saved shopping cart. Accessing the notification may direct the user to the PDP page for that product. Other notifications may advise the user when a quote is available to be viewed by the user, to adjust browser security settings for viewing certain content, when drawings are ready for review or approval, or other reasons.

Figure 96:
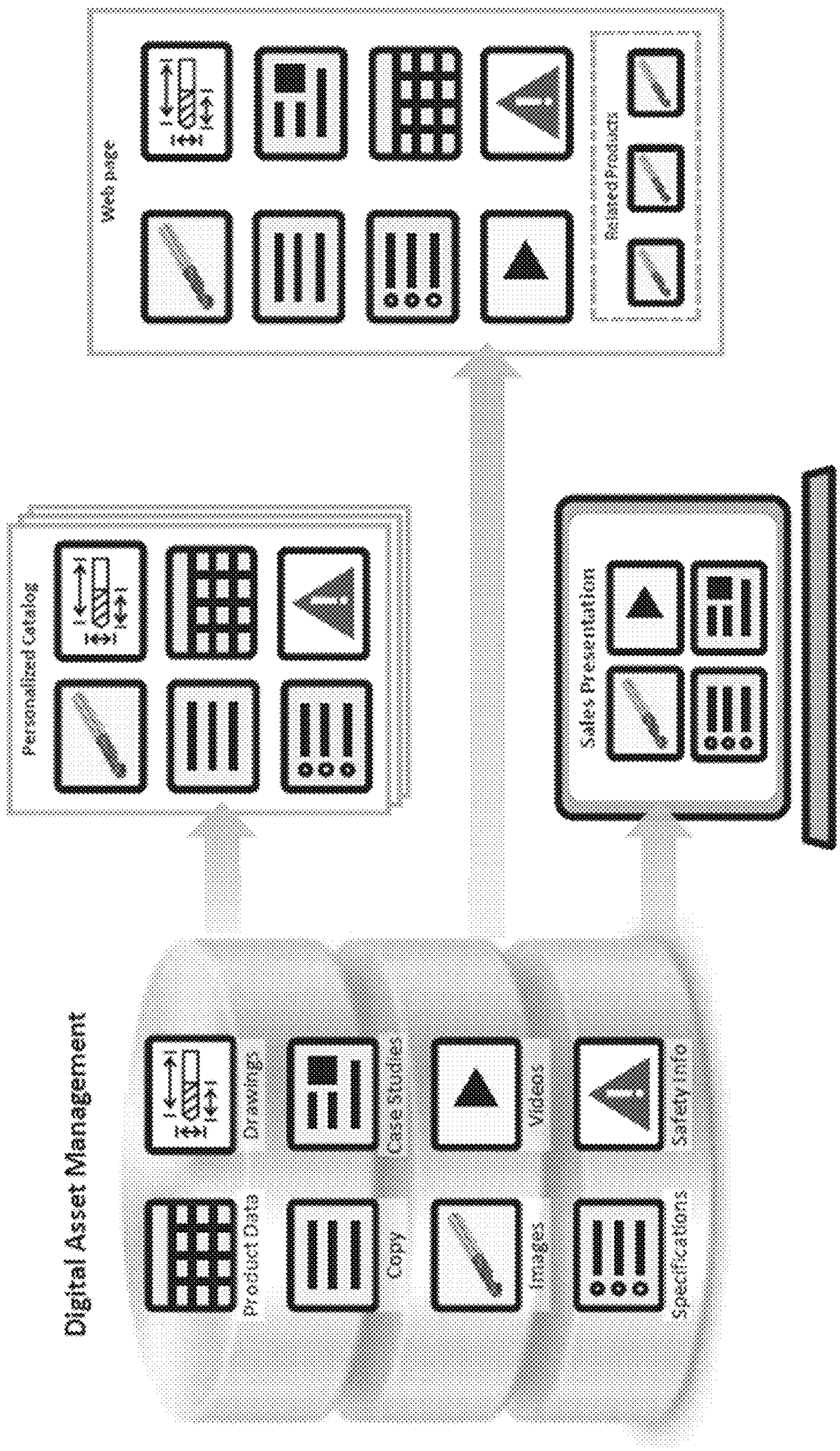
FIG. 96 schematically illustrates how digital assets can be implemented in a variety of different applications.

FIG. 96 schematically illustrates how digital assets, such as those managed by embodiments of the platform 102 described herein, can be implemented in a variety of different applications. For example, digital assets can be used to generate personalized product catalogs, to generate sales presentations, or to assist with development of industrial tool solutions accessible via web pages.

Figure 97:
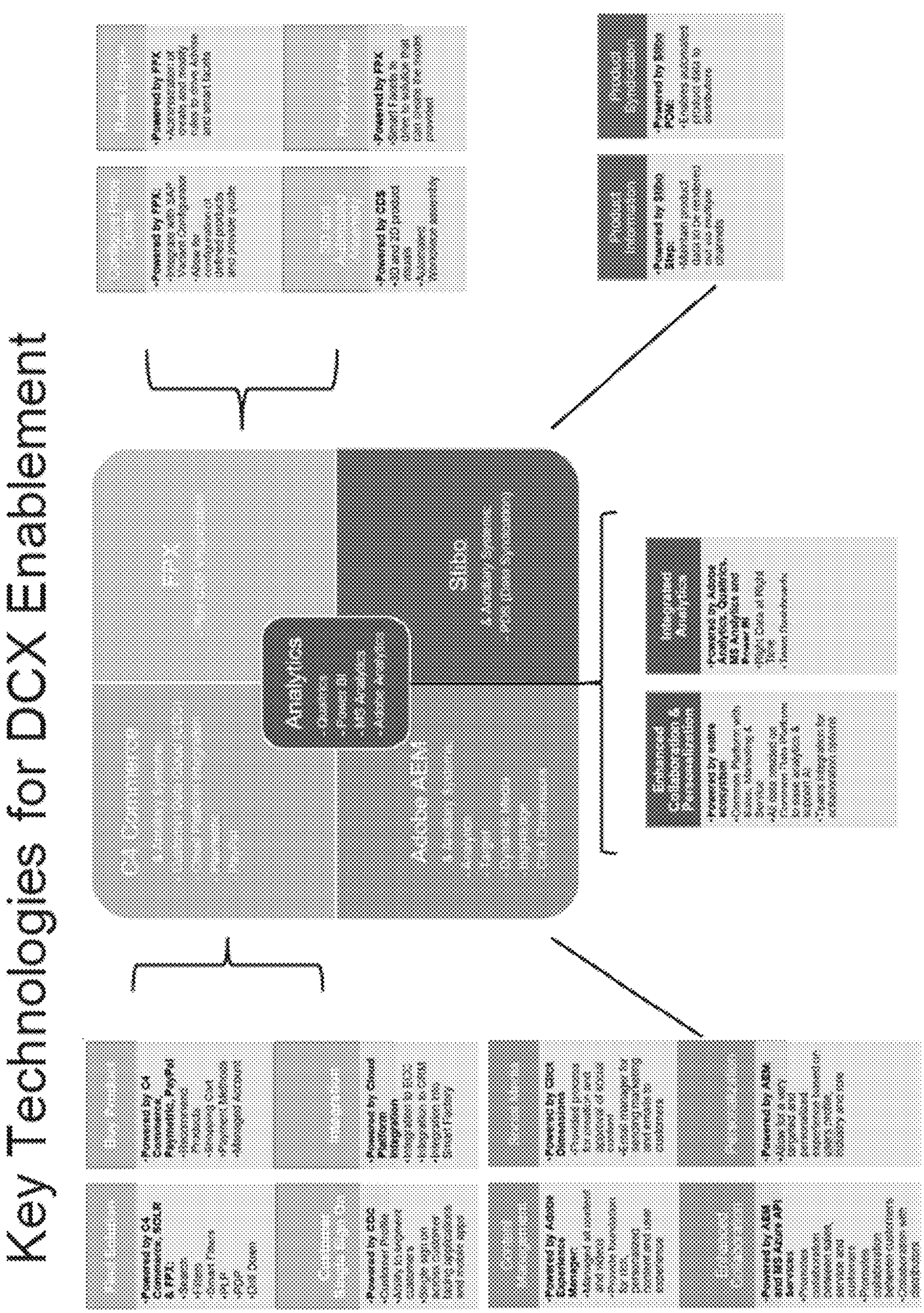
FIG. 97 includes a schematic illustrating a computer architecture and process flow for examples of various tools, features, and functionality which enable the functionality and features of different technical aspects of industrial tool solution platform embodiments described herein.

FIG. 97 includes a schematic illustrating a computer architecture and process flow for examples of various tools, features, and functionality which enable the functionality and features of different technical embodiments of the DCX platform 102 described herein.

Figure 98:
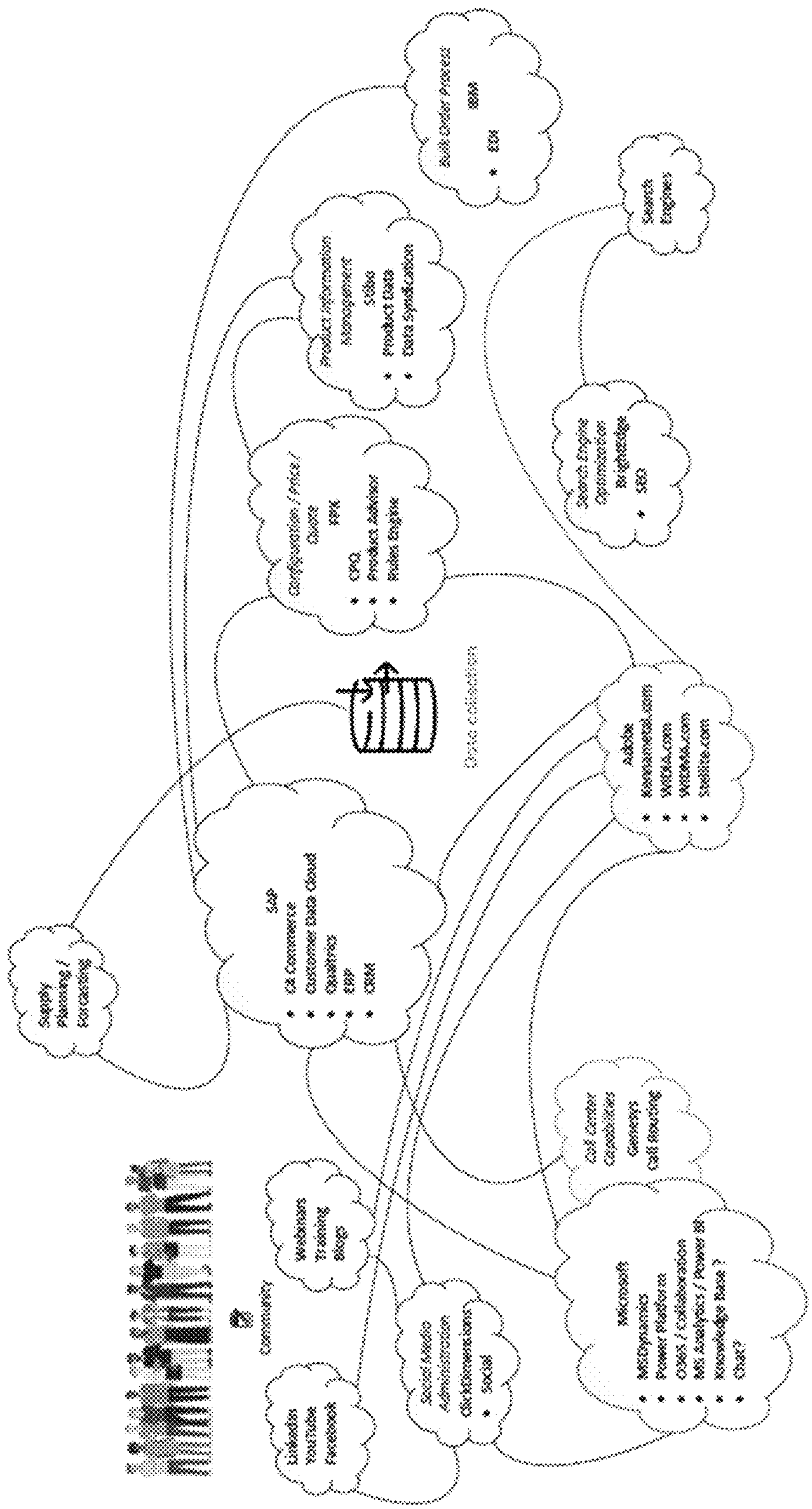
FIG. 98 includes a schematic illustrating process flows and interconnected relationships for examples of various tools, features, and functionality which enable the functionality and features of different technical and operational aspects of industrial tool solution platform embodiments described herein.

FIG. 98 includes a schematic illustrating process flows and interconnected relationships for examples of various tools, features, and functionality which enable the functionality and features of different technical and operational embodiments of the DCX platform 102 described herein.

Figure 99:
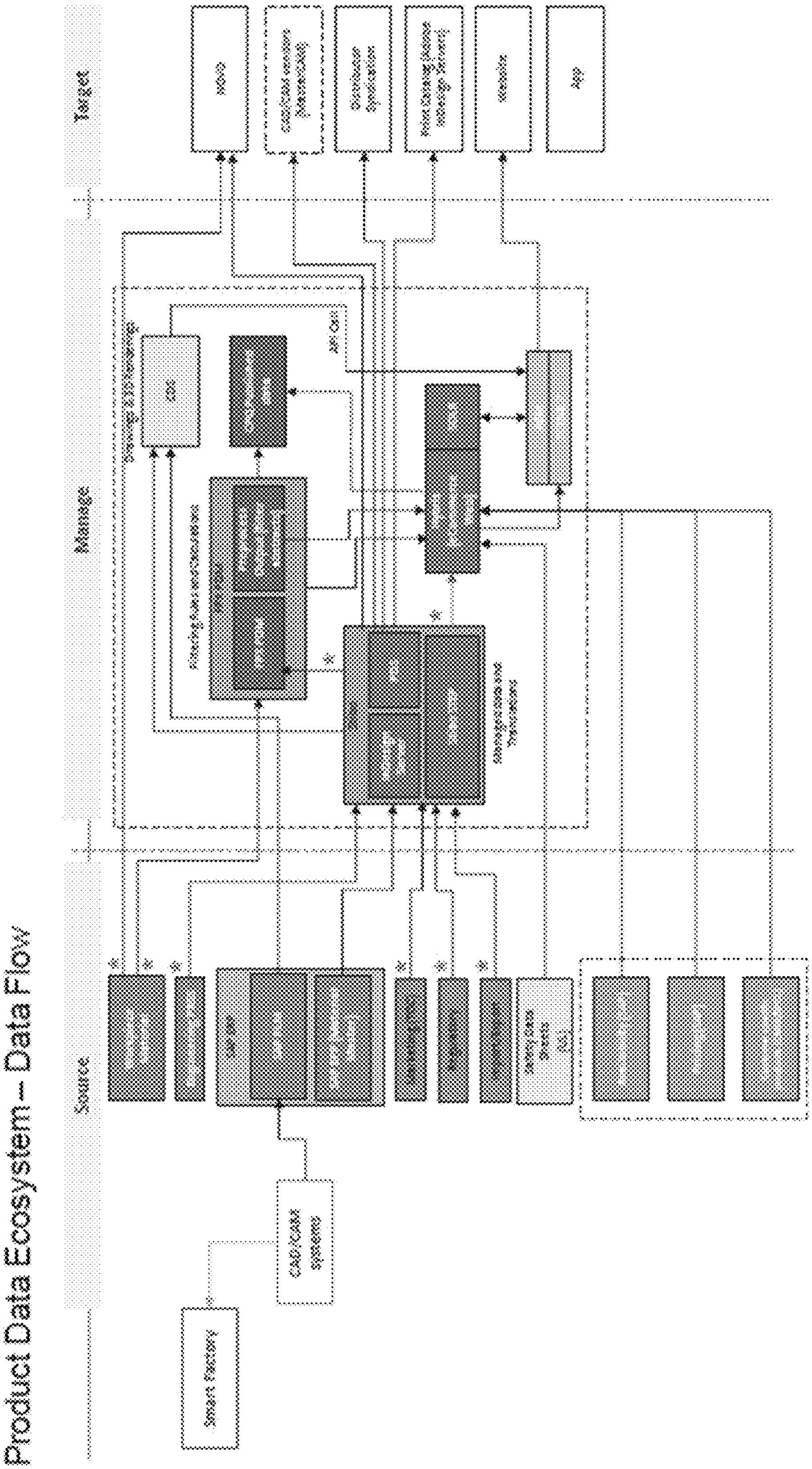
FIG. 99 includes a schematic illustrating a computer architecture and data process flow for examples of various tools, features, and functionality which enable the functionality and features of the operational environment for certain industrial tool solution platform embodiments.

FIG. 99 includes a schematic illustrating a computer architecture and process flow for examples of various tools, features, and functionality which enable the functionality and features of different embodiments of the DCX platform 102 described herein.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, algorithm use cases, or screen displays described herein can be necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal; and examples of scripting languages include Bourne script, JavaScript, Python, R, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "com1ected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, can be not described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

In various embodiments of the present invention, different types of artificial intelligence tools and techniques can be incorporated and implemented. Search and optimization tools including search algorithms, mathematical optimization, and evolutionary computation methods can be used for intelligently searching through many possible solutions. For example, logical operations can involve searching for a path that leads from premises to conclusions, where each step is the application of an inference rule. Planning algorithms can search through trees of goals and subgoals, attempting to find a path to a target goal, in a process called means-ends analysis.

Heuristics can be used that prioritize choices in favor of those more likely to reach a goal and to do so in a shorter number of steps. In some search methodologies heuristics can also serve to eliminate some choices unlikely to lead to a goal. Heuristics can supply a computer system with a best estimate for the path on which the solution lies. Heuristics can limit the search for solutions into a smaller sample size, thereby increasing overall computer system processing efficiency.

Propositional logic can be used which involves truth functions such as "or" and "not" search terms, and first-order logic can add quantifiers and predicates, and can express facts about objects, their properties, and their relationships with each other. Fuzzy logic assigns a degree of truth (e.g., between 0 and 1) to vague statements which may be too linguistically imprecise to be completely true or false. Default logics, non-monotonic logics and circumscription are forms of logic designed to help with default reasoning and the qualification problem. Several extensions of logic can be used to address specific domains of knowledge, such as description logics, situation calculus, event calculus and fluent calculus (for representing events and time), causal calculus, belief calculus (belief revision); and modal logics. Logic for modeling contradictory or inconsistent statements arising in multi-agent systems can also be used, such as paraconsistent logics.

Probabilistic methods can be applied for uncertain reasoning, such as Bayesian networks, hidden Markov models, Kalman filters, particle filters, decision theory, and utility theory. These tools and techniques help the system execute algorithms with incomplete or uncertain information. Bayesian networks are tools that can be used for various problems: reasoning (using the Bayesian inference algorithm), learning (using the expectation-maximization algorithm), planning (using decision networks), and perception (using dynamic Bayesian networks). Probabilistic algorithms can be used for filtering, prediction, smoothing and finding explanations for streams of data, helping perception systems to analyze processes that occur over time (e.g., hidden Markov models or Kalman filters). Artificial intelligence can use the concept of utility as a measure of how valuable something is to an intelligent agent. Mathematical tools can analyze how an agent can make choices and plan, using decision theory, decision analysis, and information value theory. These tools include models such as Markov decision processes, dynamic decision networks, game theory and mechanism design.

The artificial intelligence techniques applied to embodiments of the invention may leverage classifiers and controllers. Classifiers are functions that use pattern matching to determine a closest match. They can be tuned according to examples known as observations or patterns. In supervised learning, each pattern belongs to a certain predefined class which represents a decision to be made. All of the observations combined with their class labels are known as a data set. When a new observation is received, that observation is classified based on previous experience. A classifier can be trained in various ways; there are many statistical and machine learning approaches. The decision tree is one kind of symbolic machine learning algorithm. The naive Bayes classifier is one kind of classifier useful for its scalability, in particular. Neural networks can also be used for classification. Classifier performance depends in part on the characteristics of the data to be classified, such as the data set size, distribution of samples across classes, dimensionality, and the level of noise. Model-based classifiers perform optimally when the assumed model is an optimized fit for the actual data. Otherwise, if no matching model is available, and if accuracy (rather than speed or scalability) is a primary concern, then discriminative classifiers (e.g., SVM) can be used to enhance accuracy.

A neural network is an interconnected group of nodes which can be used in connection with various embodiments of the invention, such as execution of various methods, processes, or algorithms disclosed herein. Each neuron of the neural network can accept inputs from other neurons, each of which when activated casts a weighted vote for or against whether the first neuron should activate. Learning achieved by the network involves using an algorithm to adjust these weights based on the training data. For example, one algorithm increases the weight between two connected neurons when the activation of one triggers the successful activation of another. Neurons have a continuous spectrum of activation, and neurons can process inputs in a non-linear way rather than weighing straightforward votes. Neural networks can model complex relationships between inputs and outputs or find patterns in data. They can learn continuous functions and even digital logical operations. Neural networks can be viewed as a type of mathematical optimization which performs a gradient descent on a multi-dimensional topology that was created by training the network. Another type of algorithm is a backpropagation algorithm. Other examples of learning techniques for neural networks include Hebbian learning, group method of data handling (GMDH), or competitive learning. The main categories of networks are acyclic or feedforward neural networks (where the signal passes in only one direction), and recurrent neural networks (which allow feedback and short-term memories of previous input events). Examples of feedforward networks include perceptrons, multi-layer perceptrons, and radial basis networks.

Deep learning techniques applied to various embodiments of the invention can use several layers of neurons between the network's inputs and outputs. The multiple layers can progressively extract higher-level features from the raw input. For example, in image processing, lower layers may identify edges, while higher layers may identify the concepts relevant to a human such as digits or letters or faces. Deep learning may involve convolutional neural networks for many or all of its layers. In a convolutional layer, each neuron receives input from only a restricted area of the previous layer called the neuron's receptive field. This can substantially reduce the number of weighted connections between neurons. In a recurrent neural network, the signal will propagate through a layer more than once. A recurrent neural network (RNN) is another example of a deep learning technique which can be trained by gradient descent, for example.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as claimed herein.

What is claimed is:

1. A computer-based system for processing information associated with industrial tool solutions including at least one industrial tool, the system comprising:
- a digital platform comprising at least one computer processor programmed for executing at least the following modules:
  - a solutions module programmed for:
    - receiving information associated with multiple configurations of different industrial tool solutions, and
    - displaying graphical representations associated with each of the industrial tool solutions;
  - a machines module programmed for:
    - receiving information associated with at least one machine associated with use of the industrial tool solution, and
    - displaying a digital replica of each machine;
  - a project module programmed for receiving and displaying project information comprising at least a combination of industrial tool solution information and machine information, the project module further programmed for:
    - connecting at least a portion of the project information to multiple industrial tool solutions,
    - connecting at least a portion of the industrial tool solution information to a project from a list of pre-existing industrial tool solutions, and
    - connecting at least a portion of the industrial tool solution information to a project from a list of user customized industrial tool solutions;
  - a workpiece features module programmed for receiving and displaying at least one parameter or attribute of a workpiece to be processed in association with a given industrial tool solution; and
  - a download function programmed for:
    - generating at least one of a two-dimensional model or a three-dimensional model associated with at least a portion of the industrial tool solution information, and
    - communicating the generated model to a computer system independent of the digital platform.

2. The system of claim 1, further comprising the solutions module programmed for generating an industrial tool solution comprising an assembly comprising at least one machine tool and at least one adaptive item.

3. The system of claim 1, further comprising a rules engine having at least one analysis algorithm programmed for assessing at least one parameter of an industrial tool solution configuration.

4. The system of claim 1, wherein the parameters include at least one of a geometry, a dimension, a part fit, or a mating condition associated with the industrial tool solution.

5. The system of claim 1, further comprising the solutions module programmed for generating a user interface for receiving feed data for at least one aspect of the industrial tool solution.

6. The system of claim 1, further comprising the solutions module programmed for generating a user interface for receiving speed data for at least one aspect of the industrial tool solution.

7. The system of claim 1, further comprising the solutions module programmed for generating a user interface for adjusting at least one preset present associated with at least one aspect of the industrial tool solution.

8. The system of claim 1, further comprising the solutions module programmed for generating and displaying a three-dimensional view of at least one aspect of the industrial tool solution.

9. The system of claim 1, further comprising a shopping cart function for adding the industrial tool solution to a shopping cart for ordering the industrial tool solution.

10. The system of claim 1, further comprising the solutions module programmed for communicating information associated with multiple industrial tool solutions among different entities.

11. The system of claim 1, further comprising the machines module programmed for facilitating selection of a machine from a list of pre-configured machines supplied by the digital platform.

12. The system of claim 1, further comprising the machines module programmed for facilitating customizing machine information in response to at least one machine specification or machine parameter.

13. The system of claim 1, further comprising the machines module programmed for associating information with each machine, including specification information, the industrial tool solutions associated with the machine, documentation information, notes information, or a combination thereof.

14. The system of claim 1, wherein a workpiece feature information includes at least one of material type, geometric configuration, physical dimension, or a combination thereof.

15. The system of claim 1, further comprising a rules engine having at least one analysis algorithm programmed for:
- assessing at least one parameter of an industrial tool solution configuration, and
- confirming whether the industrial tool solution is capable of being implemented on a given machine.

16. The system of claim 1, further comprising the rules engine programmed for:

receiving an adjustment to at least one parameter of the industrial tool configuration, and confirming whether the adjusted industrial tool solution is capable of being implemented on the machine.

17. The system of claim 1, further comprising the digital platform programmed for executing a module programmed for facilitating selection of at least one commercial transaction in connection with the industrial tool solution.

18. The system of claim 1, further comprising the digital platform programmed for executing a module programmed for identifying at least one industrial tool solution similar to a previously generated industrial tool solution.

19. The system of claim 1, further comprising the digital platform programmed for executing a module programmed for automatically generating and displaying at least one filter applicable to the industrial tool solution.

20. The system of claim 19, further comprising the digital platform programmed for executing a module programmed for receiving a user selection to remove at least one of the filters in association with identifying at least one industrial tool solution similar to a previously generated industrial tool solution.

21. The system of claim 19, further comprising the digital platform programmed for executing a module programmed for receiving a user selection to add at least one additional filter in association with identifying at least one industrial tool solution similar to a previously generated industrial tool solution.

* * * * *